US008478914B2

(12) United States Patent
Sato et al.

(10) Patent No.: US 8,478,914 B2
(45) Date of Patent: Jul. 2, 2013

(54) DISPLAY APPARATUS, VIDEO SIGNAL TRANSMISSION METHOD FOR DISPLAY APPARATUS, TRANSMITTING APPARATUS, AND TRANSMISSION METHOD OF VIDEO SIGNAL

(75) Inventors: Ichiro Sato, Barcelona (ES); Yasuhisa Nakajima, Kanagawa (JP)

(73) Assignees: Sony Espana S.A. (ES); Sony Corporation (JP)

( * ) Notice: Subject to any disclaimer, the term of this patent is extended or adjusted under 35 U.S.C. 154(b) by 394 days.

(21) Appl. No.: 12/734,307

(22) PCT Filed: Nov. 13, 2008

(86) PCT No.: PCT/JP2008/070688
§ 371 (c)(1),
(2), (4) Date: Apr. 22, 2010

(87) PCT Pub. No.: WO2009/063944
PCT Pub. Date: May 22, 2009

(65) Prior Publication Data
US 2010/0253856 A1 Oct. 7, 2010

(30) Foreign Application Priority Data
Nov. 13, 2007 (JP) ................................ P2007-294876

(51) Int. Cl.
G06F 13/12 (2006.01)
G06F 13/38 (2006.01)
G06F 3/00 (2006.01)
(52) U.S. Cl.
USPC ................................ 710/68; 710/17; 710/18

(58) Field of Classification Search
USPC ............................................... 710/68, 17, 18
See application file for complete search history.

(56) References Cited

U.S. PATENT DOCUMENTS
6,914,903 B1 * 7/2005 Miyazaki et al. ............. 370/389
7,150,032 B1 * 12/2006 Sadanaka et al. ............... 725/80
(Continued)

FOREIGN PATENT DOCUMENTS
EP 1816868 A1 8/2007
EP 2152001 A1 2/2010
(Continued)

OTHER PUBLICATIONS
High-Definition Multimedia Interface—Wikipedia, the free encyclopedia, Jan. 4, 2006, http://web.archive.org/web/20060104104911/http://en.wikipedia.org/wiki/HDMI.*
(Continued)

*Primary Examiner* — Farley Abad
(74) *Attorney, Agent, or Firm* — Lerner, David, Littenberg, Krumholz & Mentlik, LLP

(57) ABSTRACT

Provided is a display apparatus including a first signal receiving unit that receives a non-compressed video signal from an external device via a first transmission path through a plurality of channels by means of a differential signal, an image display unit that displays images by processing the video signal received by the first signal receiving unit, a second signal receiving unit that receives a compressed video signal of a same video source as the non-compressed video signal by using a bi-directional communication path configured by predetermined lines of the first transmission path, and a signal transmitting unit that transmits a compressed video signal corresponding to the compressed video signal received by the second signal receiving unit to another external device different from the external device.

9 Claims, 26 Drawing Sheets

U.S. PATENT DOCUMENTS

| | | |
|---|---|---|
| 7,394,499 B2 | 7/2008 | Okamoto et al. |
| 2003/0056051 A1* | 3/2003 | Burke et al. ............... 710/302 |
| 2006/0291569 A1 | 12/2006 | Kabuto et al. |
| 2007/0143801 A1 | 6/2007 | Madonna et al. |

FOREIGN PATENT DOCUMENTS

| | | |
|---|---|---|
| EP | 2166763 A1 | 3/2010 |
| JP | 2007-006298 A | 1/2007 |
| WO | WO-02/078336 A1 | 10/2002 |
| WO | WO-2009/001880 A1 | 12/2008 |

OTHER PUBLICATIONS

Communication from EP Application 08850012, dated Aug. 3, 2011.

Supplementary European Search Report, EP 08850012, dated Nov. 30, 2010.

Office Action from Japanese Application No. 2007-294876, dated Feb. 19, 2013. (JP 2007-006298 & WO2009-001880, were previously cited on Apr. 22, 2010).

* cited by examiner

FIG. 8

HDMI PINOUT (TYPE A)

| PIN | Signal Assignment | PIN | Signal Assignment |
|---|---|---|---|
| 1 | TMDS Data2+ | 2 | TMDS Data2 Shield |
| 3 | TMDS Data2- | 4 | TMDS Data1+ |
| 5 | TMDS Data1 Shield | 6 | TMDS Data1- |
| 7 | TMDS Data0+ | 8 | TMDS Data0 Shield |
| 9 | TMDS Data0- | 10 | TMDS Clock+ |
| 11 | TMDS Clock Shield | 12 | TMDS Clock- |
| 13 | CEC | 14 | Reserved (N.C. on device) |
| 15 | SCL | 16 | SDA |
| 17 | DDC/CEC Ground | 18 | +5V Power |
| 19 | Hot Plug Detect | | |

E-EDID DATA STRUCTURE

FIG. 16

E-EDID VENDOR SPECIFIC DATA BLOCK STRUCTURE

| Byte# | 7 | 6 | 5 | 4 | 3 | 2 | 1 | 0 |
|---|---|---|---|---|---|---|---|---|
| 0 | Vendor-specific tag code (=3) | | | | | Length (=N) | | |
| 1...3 | 24bit IEEE Registration Identifier (0x000003) LSB first | | | | | | | |
| 4 | A | | | | | B | | |
| 5 | C | | | | | D | | |
| 6 | Supports-AI | DC_48bit | DC_36bit | DC_30bit | DC_Y444 | Reserved (0) | Reserved (0) | DVI-Dual |
| 7 | Max_TMDS_Clock | | | | | | | |
| 8 | Latency | Full Duplex | Half Duplex | | Reserved (0) | | | |
| 9 | Video Latency | | | | | | | |
| 10 | Audio Latency | | | | | | | |
| 11 | Interlaced Video Latency | | | | | | | |
| 12 | Interlaced Audio Latency | | | | | | | |
| 13...N | Reserved (0) | | | | | | | |

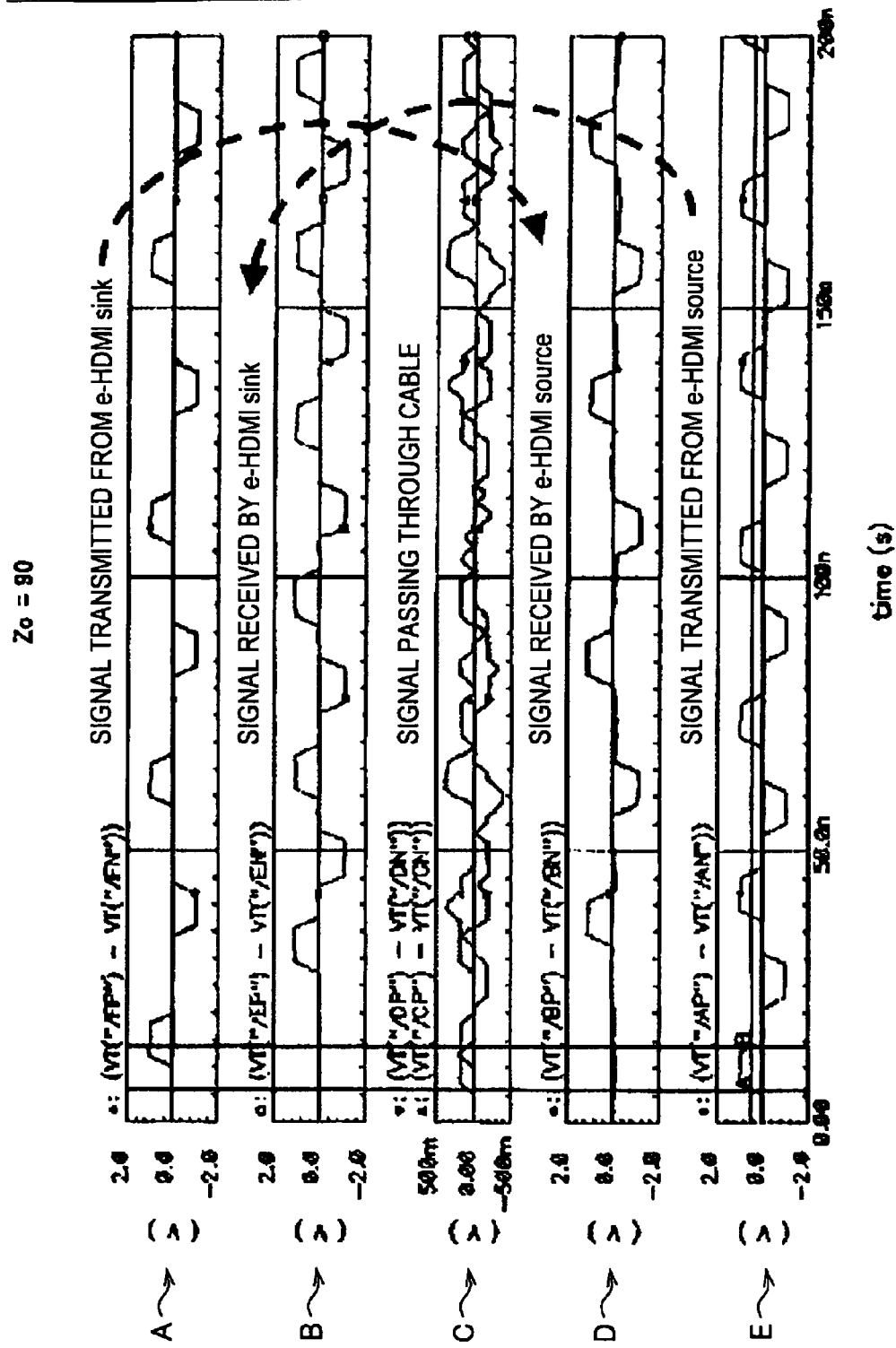

DISPLAY APPARATUS, VIDEO SIGNAL TRANSMISSION METHOD FOR DISPLAY APPARATUS, TRANSMITTING APPARATUS, AND TRANSMISSION METHOD OF VIDEO SIGNAL

CROSS-REFERENCES TO RELATED APPLICATIONS

The present application is a national phase entry under 35 U.S.C. §371 of International Application No. PCT/JP2008/070688 filed Nov. 13, 2008, published on May 22, 2009 as WO 2009/063944 A1, which claims priority from Japanese Patent Application No. JP 2007-294876 filed in the Japanese Patent Office on Nov. 13, 2007.

TECHNICAL FIELD

The present invention relates to a display apparatus, a video signal transmission method for the display apparatus, a transmitting apparatus, and a transmission method of a video signal.

In particular, the present invention relates to a display apparatus enabled to record a video signal corresponding to a display image by receiving a non-compressed video signal from an external device to display images and, at the same time, receiving a compressed video signal of the same video source as that of the non-compressed video signal from the external device to transmit the compressed video signal to another external device without causing prices of a transmitting apparatus of the video signal and the display apparatus to rise.

The present invention also relates to a transmitting apparatus enabled to record a video signal corresponding to a display image using a compressed video signal by transmitting a non-compressed video signal to an external device and also transmitting the compressed video signal of the same video source as that of the non-compressed video signal to the external device without causing prices of the transmitting apparatus and a display apparatus to rise.

BACKGROUND ART

In recent years, an HDMI (High Definition Multimedia Interface) is becoming increasingly popular as a communication interface to transmit a digital video signal, that is, a non-compressed (baseband) video signal (hereinafter, referred to as "image data") and a digital audio signal (hereinafter, referred to as "audio data") accompanying the video signal at high speed from, for example, a DVD (Digital Versatile Disc) recorder, set top box, or other AV sources (Audio Visual sources) to a TV receiver, projector, or other displays. For example, WO2002/078336 contains a detailed description of the HDMI standard.

SUMMARY OF INVENTION

Technical Problem

To record a video signal received by a set top box connected to a TV receiver, it was necessary in the past, for example, for the set top box to contain a recording unit such as an HDD (Hard Disk Drive) or to separately connect a recording device to the set top box. If a recording unit is contained in the set top box, the price of the set top box rises, causing an economic burden of the user to increase. If a recording device is separately connected to the set top box, the configuration thereof becomes complicated, making operations thereof complicated as well. It is also conceivable that the TV receiver will contain a recording unit such as an HDD, but this means that the price of the TV receiver rises, causing an economic burden of the user to increase.

The present invention is made in view of the above-mentioned issue, and aims to enable recording of a video signal corresponding to a display image without causing prices of a transmitting apparatus of the video signal and a display apparatus to rise.

Solution to Problem

According to the first aspect of the present invention in order to achieve the above-mentioned object, there is provided a display apparatus, including: a first signal receiving unit that receives a non-compressed video signal from an external device via a first transmission path through a plurality of channels by means of a differential signal; an image display unit that displays images by processing the video signal received by the first signal receiving unit; a second signal receiving unit that receives a compressed video signal of a same video source as the non-compressed video signal by using a bi-directional communication path configured by predetermined lines of the first transmission path; and a signal transmitting unit that transmits a compressed video signal corresponding to the compressed video signal received by the second signal receiving unit to another external device different from the external device.

According to the second aspect of the present invention in order to achieve the above-mentioned object, there is provided a transmitting apparatus, including: a first signal transmitting unit that transmits a non-compressed video signal to an external device via a transmission path through a plurality of channels by means of a differential signal; and a second signal transmitting unit that transmits a compressed video signal of a same video source as the non-compressed video signal to the external device by using a bi-directional communication path configured by predetermined lines of the transmission path.

A transmitting apparatus transmits a non-compressed video signal to an external device (display apparatus) via a transmission path. The transmitting apparatus also transmits a compressed video signal of the same video source as the non-compressed video signal to the external device (display apparatus) by using a bi-directional communication path configured by predetermined lines of the transmission path. For example, the transmitting apparatus is connected with the external device (display apparatus) via an HDMI cable and the predetermined lines are a reserved line and an HPD line constituting the HDMI cable.

Transmission of the compressed video signal to the external device (display apparatus) described above takes place when, for example, a transmission request is transmitted from the external device via a control data line or the bi-directional communication path. For example, the external device (display apparatus) transmits a transmission request to the transmitting apparatus when a user provides instructions to record a video signal corresponding to a display image.

The display apparatus receives the non-compressed video signal from the external device (transmitting apparatus) such as a set top box via a first transmission path and displays images by the non-compressed video signal. The display apparatus also receives the compressed video signal of the same video source as the non-compressed video signal from the external device (transmitting apparatus) by using the bi-directional communication path configured by predetermined lines of the first transmission path. For example, the predetermined lines are the reserved line and the HPD line constituting the HDMI cable.

The display apparatus transmits a compressed video signal corresponding to the compressed video signal received from the external device (transmitting apparatus) through the bi-directional communication path to another external device. In this case, if the other external device is a recording device such as a disk recorder, a video signal corresponding to a display image can be recorded by the recording device. For example, when instructions of recording are provided by a user's operation unit, transmission of the compressed video signal to the other external device takes place. Accordingly, recording of the compressed video signal in the other external device takes place only when instructions of recording are provided by the user.

For example, reception of the non-compressed video signal from the above other external device, for example, a recording device such as a disk recorder via a second transmission path is enabled. Accordingly, the display apparatus can receive a video signal reproduced by the recording device so that reproduced images by the video signal can be displayed. Transmission of the compressed video signal to the above other external device takes places by using, for example, the bi-directional communication path configured by predetermined lines of the second transmission path. For example, the predetermined lines are the reserved line and the HPD line constituting the HDMI cable.

In the display apparatus, for example, the compressed video signal transmitted from the external device (transmitting apparatus) via the bi-directional communication path configured by predetermined lines of the first transmission path is supplied to a signal transmitting unit directly as a transmission signal by a path changeover switch before being transmitted to the other external device via the bi-directional communication path configured by predetermined lines of the second transmission path. In this case, processing of decryption and recoding and processing of decryption of re-encryption of cipher become unnecessary, leading to reduced processing loads.

Thus, the display apparatus displays images by receiving the non-compressed video signal from the transmitting apparatus and at the same time, receives the compressed video signal of the same video source as the non-compressed video signal from the transmitting apparatus to transmit the compressed video signal to the other external device so that a video signal corresponding to a display image can be recorded without causing prices of the transmitting apparatus and the display apparatus to rise.

Advantageous Effects of Invention

According to a display apparatus of the present invention, the display apparatus displays images by receiving a non-compressed video signal from an external device and at the same time, receives a compressed video signal of the same video source as the non-compressed video signal from the external device to transmit the compressed video signal to the other external device so that a video signal corresponding to a display image can be recorded without causing prices of the transmitting apparatus of the video signal and the display apparatus to rise.

According to a transmitting apparatus of the present invention, the transmitting apparatus transmits a non-compressed video signal to an external device and also transmits a compressed video signal of the same video source as the non-compressed video signal to the external device so that a video signal corresponding to a display image can be recorded by using the compressed video signal without causing prices of the transmitting apparatus of the video signal and the display apparatus to rise.

BRIEF DESCRIPTION OF DRAWINGS

FIG. 8 is a diagram showing pinouts (type A) of HDMI terminals;

FIG. 16 is a diagram showing an E-EDID Vendor Specific Data Block structure;

FIG. 26 is a diagram showing bi-directional communication waveforms.

REFERENCE SIGNS LIST

Figure 1:
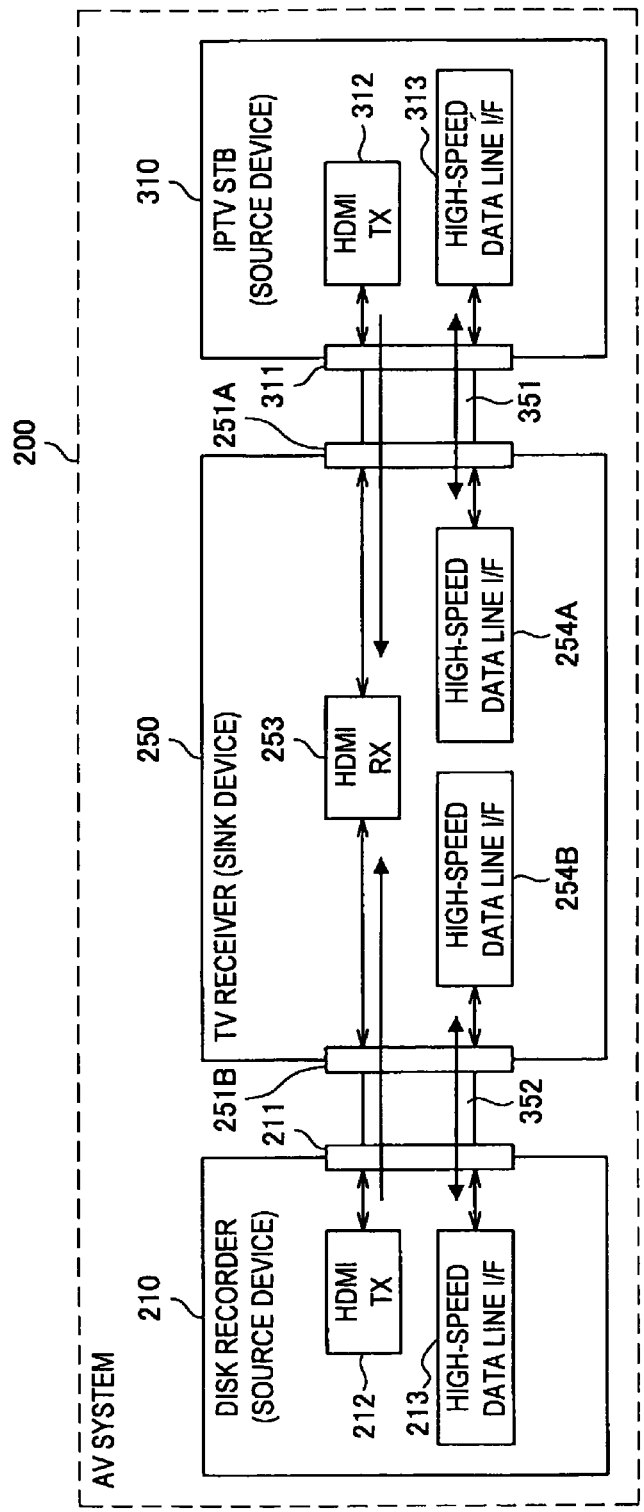
FIG. 1 is a block diagram showing a configuration example of an AV system as an embodiment of the present invention.

200 AV system
210 Disk recorder
211 HDMI terminal
212 HDMI transmitting unit
213 High-speed data line interface
218 Recording unit interface
219 DVD/BD drive
220 HDD
221 CPU
224 Ethernet (registered trademark) interface
250 TV receiver
251A, 251B HDMI terminal
252 TMDS signal switch
253 HDMI receiving unit
254A, 254B High-speed data line interface
255 Path changeover switch
263 Display panel
271 CPU
274 Ethernet (registered trademark) interface
276 Remote control receiving unit
277 Remote control transmitting unit
310 Set top box for IPTV
311 HDMI terminal
312 HDMI transmitting unit
313 High-speed data line interface
314 CPU
322 Ethernet (registered trademark) interface
323 Network terminal
351, 352 HDMI cable

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

FIG. 1 shows a configuration example of an AV (Audio Visual) system 200 as an embodiment. The AV system 200 has a disk recorder 210 as a source device, a TV receiver 250 as a sink device, and a set top box (STB) 310 for satellite broadcast reception, cable broadcast reception, or IPTV as a source device.

The set top box 310 and the TV receiver 250 are connected via an HDMI cable 351. The set top box 310 is provided with an HDMI terminal 311 to which an HDMI transmitting unit (HDMITX) 312 and a high-speed data line interface (I/F) 313 are connected. The TV receiver 250 is provided with HDMI terminals 251A and 251B to which an HDMI receiving unit (HDMIRX) 253 and high-speed data line interfaces (I/F) 254A and 254B are connected respectively. One end of the HDMI cable 351 is connected to the HDMI terminal 311 of the set top box 310 and the other end of the HDMI cable 351 to the HDMI terminal 251A of the TV receiver 250.

The TV receiver 250 and the disk recorder 210 are connected via an HDMI cable 352. The disk recorder 210 is provided with an HDMI terminal 211 to which an HDMI transmitting unit (HDMITX) 212 and a high-speed data line interface (I/F) 213 are connected. One end of the HDMI cable 352 is connected to the HDMI terminal 211 of the disk recorder 210 and the other end of the HDMI cable 352 to the HDMI terminal 251B of the TV receiver 250.

Figure 2:
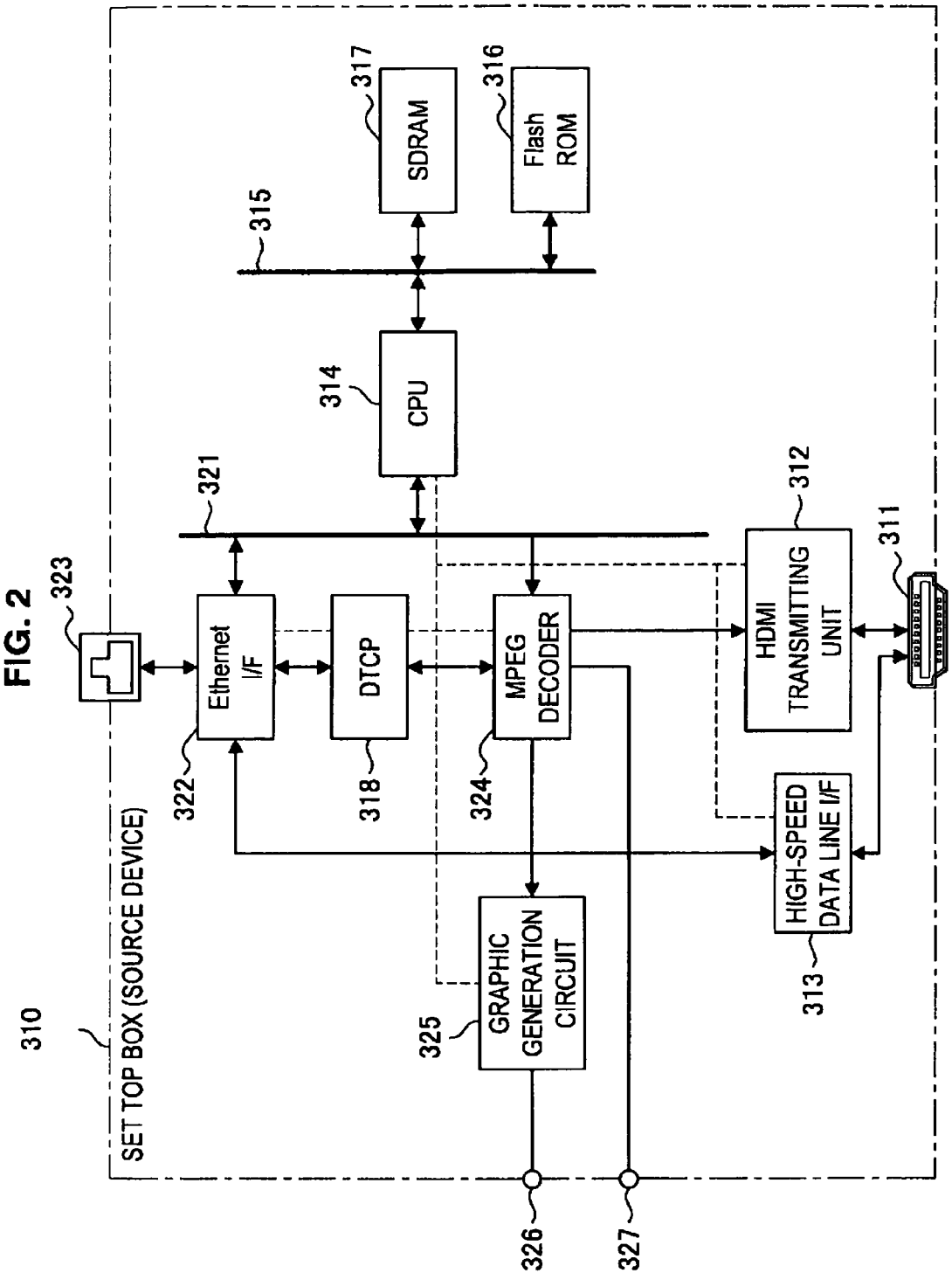
FIG. 2 is a block diagram showing a configuration example of a set top box (source device) configuring the AV system.

FIG. 2 shows a configuration example of the set top box 310 for IPTV. The set top box 310 has the HDMI terminal 311, the HDMI transmitting unit 312, the high-speed data line interface (I/F) 313, a CPU (Central Processing Unit) 314, a CPU bus 315, a flash ROM (Read Only Memory) 316, an SDRAM (Synchronous Dynamic Random Access Memory) 317, a DTCP (Digital Transmission Content Protection) circuit 318, an internal bus 321, an Ethernet (registered trademark) interface (Ethernet I/F) 322, a network terminal 323, an MPEG (Moving Picture Expert Group) decoder 324, a graphic generation circuit 325, a video output terminal 326, and an audio output terminal 327. "Ethernet" is a registered trademark.

The HDMI transmitting unit (HDMI source) 312 transmits baseband video (image) and audio data from the HDMI terminal 311 to an HDMI cable by communication conforming to the HDMI. Details of the HDMI transmitting unit 312 will be described later. The high-speed data line interface 313 is an interface for bi-directional communication configured by predetermined lines (in the present embodiment, a reserved line and HPD line) of HDMI cable. Details of the high-speed data line interface 313 will be described later.

The CPU 314, the flash ROM 316, and the SDRAM 317 are connected to the CPU bus 315. The CPU 314, the Ethernet (registered trademark) interface 322, and the MPEG decoder 324 are connected to the internal bus 321.

The CPU 314 controls the operation of each unit of the set top box 310. The flash ROM 316 stores control software and keeps data. The SDRAM 317 configures a work area of the CPU 314. The CPU 314 controls the operation of each unit of the set top box 310 by expanding software or data read from the flash ROM 316 on the SDRAM 317 to cause the software to activate.

The MPEG decoder 324 obtains video data or audio data by performing decode processing on an MPEG2 stream, which is, for example, download data (streaming data) from a VOD (Video On Demand) server. The DTCP circuit 318 decrypts encrypted data supplied from the network terminal 323 or the high-speed data line interface 313 to the Ethernet (registered trademark) interface 322.

The graphic generation circuit 325 performs superposition processing of graphic data on video (image) data obtained by the MPEG decoder 324 when necessary. The video output terminal 326 outputs video data output from the graphic generation circuit 325. The audio output terminal 327 outputs audio data obtained by the MPEG decoder 324.

The operation of the set top box 310 shown in FIG. 2 will briefly be described.

Encrypted streaming data obtained from the network terminal 323 via the Ethernet (registered trademark) interface 322 is decrypted by the DTCP circuit 318 and then supplied to the MPEG decoder 324 before being decoded. Then, the MPEG decoder 324 performs decode processing on video PES packets including TS packets of video data to obtain video data. Superposition processing of graphic data is performed by the graphic generation circuit 325 on the video data, which is then output to the video output terminal 326. The MPEG decoder 324 also performs decode processing on audio PES packets including TS packets of audio data to obtain audio data. The audio data is output to the audio output terminal 327.

When the streaming data from the network terminal 323 is received, video (image) data and audio data obtained by the MPEG decoder 324 are supplied to the HDMI transmitting unit 312 before being sent to the HDMI cable connected to the HDMI terminal 311 when necessary.

The streaming data from the network terminal 323 is supplied to the high-speed data line interface 313 via the Ethernet (registered trademark) interface 322 as transmission data when necessary. The streaming data is transmitted to a device on a remote side as Ethernet IP packets through a bi-directional communication path including predetermined lines of HDMI cable connected to the HDMI terminal 311. Here, the streaming data is obtained by, for example, encrypting a partial TS (TS packets of video data and TS packets of audio data).

The high-speed data line interface 313 receives IP packets containing remote control code transmitted through the bi-directional communication path including predetermined lines of HDMI cable connected to the HDMI terminal 311. The IP packets are supplied to the CPU 314 via the Ethernet (registered trademark) interface 322. If remote control code contained in the IP packets is related to control of the set top box 310, the CPU 314 controls each unit of the set top box 310 based on the remote control code.

Figure 3:
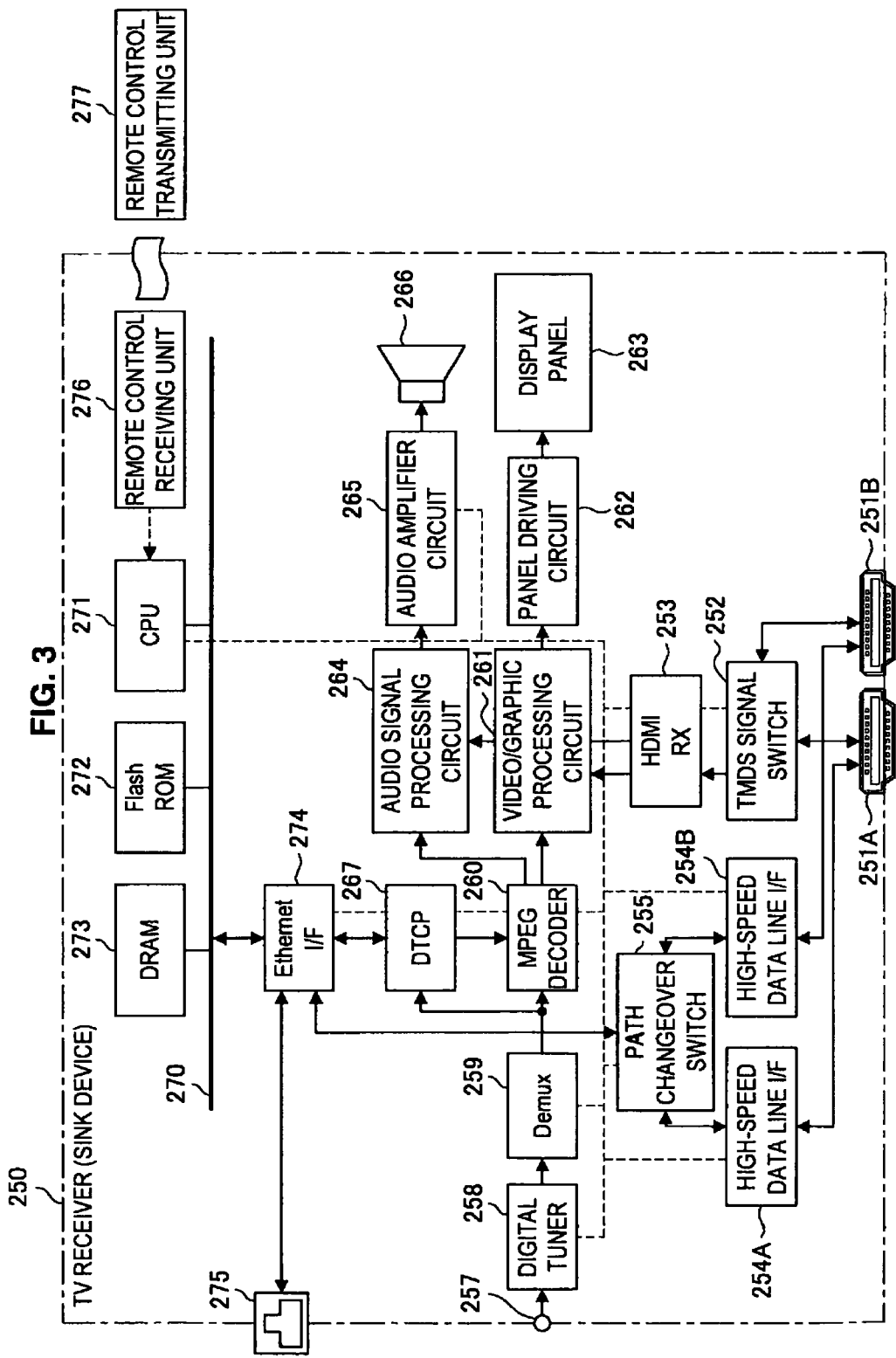
FIG. 3 is a block diagram showing a configuration example of a TV receiver (sink device) configuring the AV system.

FIG. 3 shows a configuration example of the TV receiver 250. The TV receiver 250 has the HDMI terminals 251A and 251B, a TMDS signal switch 252, the HDMI receiving unit 253, the high-speed data line interfaces 254A and 254B, a path changeover switch 255, an antenna terminal 257, a digital tuner 258, a demultiplexer 259, an MPEG decoder 260, a video/graphic processing circuit 261, a panel driving circuit 262, a display panel 263, an audio processing circuit 264, an audio amplifier circuit 265, a speaker 266, a DTCP circuit 267, an internal bus 270, a CPU 271, a flash ROM 272, a DRAM 273, an Ethernet (registered trademark) interface (Ethernet I/F) 274, a network terminal 275, a remote control receiving unit 276, and a remote control transmitting unit 277.

The HDMI receiving unit (HDMI sink) 253 receives baseband video (image) and audio data (non-compressed video and audio signal) supplied to the HDMI terminal 251A or the HDMI terminal 251B by communication conforming to the HDMI. Details of the HDMI receiving unit 253 will be described later. The TMDS signal switch 252 selectively supplies a TMDS signal input into the HDMI terminal 251A or a TMDS signal input into the HDMI terminal 251B to the HDMI receiving unit 253.

The high-speed data line interfaces 254A and 254B are interfaces of a bi-directional communication path including predetermined lines (in the present embodiment, a reserved line and HPD line) of HDMI cable. Details of the high-speed data line interfaces 254A and 254B will be described later. The path changeover switch 255 switches the data path between the high-speed data line interfaces 254A and 254B and the Ethernet (registered trademark) interface 274. For example, the path changeover switch 255 selectively supplies received data of the high-speed data line interface 254A to the Ethernet (registered trademark) interface 274 or the high-speed data line interface 254B.

The antenna terminal 257 is a terminal used to input a TV broadcast signal received by a receiving antenna (not shown). The digital tuner 258 processes a TV broadcast signal input into the antenna terminal 257 to output a predetermined transport stream corresponding to the user-selected channel. The demultiplexer 259 extracts a partial TS (Transport Stream) (TS packets of video data and TS packets of audio data) corresponding to the user-selected channel from the transport stream obtained by the digital tuner 258.

The demultiplexer 259 also extracts PSI/SI (Program Specific Information/Service Information) from the transport stream obtained by the digital tuner 258 and outputs the PSI/SI to the CPU 271. In the transport stream obtained by the digital tuner 258, a plurality of channels is multiplexed. Processing to extract a partial TS of an arbitrary channel from the transport stream by the demultiplexer 259 is enabled by obtaining information about the packet ID (PID) of the arbitrary channel from the PSI/SI (PAT/PMT).

The MPEG decoder 260 obtains video data by performing decode processing on video PES (Packetized Elementary Stream) packets including TS packets of video data obtained by the demultiplexer 259. The MPEG decoder 260 also obtains audio data by performing decode processing on audio PES packets including TS packets of audio data obtained by the demultiplexer 259. The MPEG decoder 260 obtains video data and audio data by performing decode processing on video and audio PES packets obtained by decryption performed by the DTCP circuit 267 when necessary.

The video/graphic processing circuit 261 performs multi-screen processing or superposition processing of graphic data on video data obtained by the MPEG decoder 260 when necessary. The panel driving circuit 262 drives the display panel 263 based on video data output from the video/graphic processing circuit 261. The display panel 263 includes, for example, a LCD (Liquid Crystal Display) or PDP (Plasma Display Panel).

The audio signal processing circuit 264 performs processing necessary for D/A conversion on audio data obtained by the MPEG decoder 260 when necessary. The audio amplifier circuit 265 supplies an audio signal output from the audio signal processing circuit 264 after amplifying the audio signal.

The DTCP circuit 267 encrypts a partial TS extracted by the demultiplexer 259 when necessary. The DTCP circuit 267 also decrypts encrypted data supplied from the network terminal 275 or the high-speed data line interface 254A, 254B to the Ethernet (registered trademark) interface 274 when necessary.

The CPU 271 controls the operation of each unit of the TV receiver 250. The flash ROM 272 stores control software and keeps data. The DRAM 273 configures a work area of the CPU 271. The CPU 271 controls the operation of each unit of the TV receiver 250 by expanding software or data read from the flash ROM 272 on the DRAM 273 to cause the software to activate.

The remote control receiving unit 276 receives a remote control signal (remote control code) transmitted from the remote control transmitting unit 277 and supplies the remote control signal to the CPU 271. The CPU 271, the flash ROM 272, the DRAM 273, and the Ethernet (registered trademark) interface 274 are connected to the internal bus 270. If remote control code is related to control of the TV receiver 250, the CPU 271 controls each unit of the TV receiver 250 based on the remote control code.

The CPU 271 also generates an IP packet containing remote control code supplied from the remote control receiving unit 276 and outputs the IP packet to the HDMI terminals 251A and 251B via the Ethernet (registered trademark) interface 274 and the high-speed data line interface 254A, 254B. Accordingly, the remote control code transmitted from the remote control transmitting unit 277 is transmitted to an external device connected to the TV receiver 250 through a bi-directional communication path including predetermined lines of HDMI cable. Thus, the external device can also be operated by operating the remote control transmitting unit 277.

The operation of the TV receiver 250 shown in FIG. 3 will briefly be described.

A TV broadcast signal input into the antenna terminal 257 is supplied to the digital tuner 258. The digital tuner 258 processes the TV broadcast signal to output a predetermined transport stream corresponding to the user-selected channel and the predetermined transport stream is supplied to the demultiplexer 259. The demultiplexer 259 extracts a partial TS (TS packets of video data and TS packets of audio data) corresponding to the user-selected channel from the transport stream and the partial TS is supplied to the MPEG decoder 260.

The MPEG decoder 260 obtains video data by performing decode processing on video PES packets including TS packets of video data. The video data is supplied to the panel driving circuit 262 after multi-screen processing or superposition processing of graphic data being performed by the video/graphic processing circuit 261 thereon when necessary. Thus, an image corresponding to the user-selected channel is displayed in the display panel 263.

The MPEG decoder 260 also obtains audio data by performing decode processing on audio PES packets including TS packets of audio data. The audio data is supplied to the speaker 266 after necessary processing such as D/A conversion being performed thereon by the audio signal processing circuit 264 and further being amplified by the audio amplifier circuit 265. Thus, a sound corresponding to the user-selected channel is output from the speaker 266.

When a partial TS extracted by the demultiplexer 259 is supplied to a device on the remote side connected by an HDMI cable while the above TV broadcast signal is received, the partial TS is encrypted by the DTCP circuit 267 and then supplied to the high-speed data line interface 254A, 254B via the Ethernet (registered trademark) interface 274 as transmission data. Thus, the partial TS is transmitted to a device on the remote side as Ethernet IP packets through a bi-directional communication path including predetermined lines of HDMI cable connected to the HDMI terminal 251A/251B.

When a partial TS extracted by the demultiplexer 259 is sent out to a network while the above TV broadcast signal is received, the partial TS is encrypted by the DTCP circuit 267 and then output to the network terminal 275 via the Ethernet (registered trademark) interface 274.

An encrypted partial TS supplied to the network terminal 275 or received by the high-speed data line interface 254A, 254B from the HDMI terminal 251A/251B respectively is supplied to the DTCP circuit 267 via the Ethernet (registered trademark) interface 274 before being decrypted when necessary. Then, the partial TS is supplied to the MPEG decoder 260 before being decoded so that video (image) data and audio data are acquired. Hereinafter, the operation is the same as that when the above TV broadcast signal is received and thus, an image is displayed in the display panel 263 and a sound is output from the speaker 266.

Moreover, for example, the encrypted partial TS received by the high-speed data line interface 254A, 254B from the HDMI terminal 251A/251B is supplied to the mutually different high-speed data line interface 254B/254A respectively via the path changeover switch 255 as transmission data when necessary. In this case, the partial TS received from some device connected to the HDMI terminal 251A/251B through an HDMI cable is directly transmitted to another device connected to the other HDMI terminal 251B/251A through an HDMI cable. In this case, processing of decryption and encryption is made unnecessary, reducing the processing load in the TV receiver 250.

The HDMI receiving unit 253 acquires baseband video (image) and audio data input into the HDMI terminal 251A or the HDMI terminal 251B through an HDMI cable. The video and audio data is supplied to the video/graphic processing circuit 261 and the audio signal processing circuit 264 respectively. Hereinafter, the operation is the same as that when the above TV broadcast signal is received and thus, an image is displayed in the display panel 263 and a sound is output from the speaker 266.

The remote control receiving unit 276 receives remote control code (remote control signal) transmitted from the remote control transmitting unit 277 and supplies the remote control code to the CPU 271. The remote control code is related to control of the TV receiver 250, the CPU 271 controls each unit of the TV receiver 250 based on the remote control code.

The CPU 271 also generates an IP packet containing remote control code supplied from the remote control receiving unit 276. The IP packet is output to the HDMI terminal 251A/251B via the Ethernet (registered trademark) interface 274 and the high-speed data line interface 254A, 254B. Thus, the IP packet is transmitted to a device on the remote side through an HDMI cable connected to the HDMI terminal 251A/251B. The IP packet is sent out to a network when necessary. In such a case, the IP packet is output to the network terminal 275 via the Ethernet (registered trademark) interface 274. Accordingly, the operation of another device can be controlled by the remote control transmitting unit 277 of the TV receiver 250.

Figure 4:
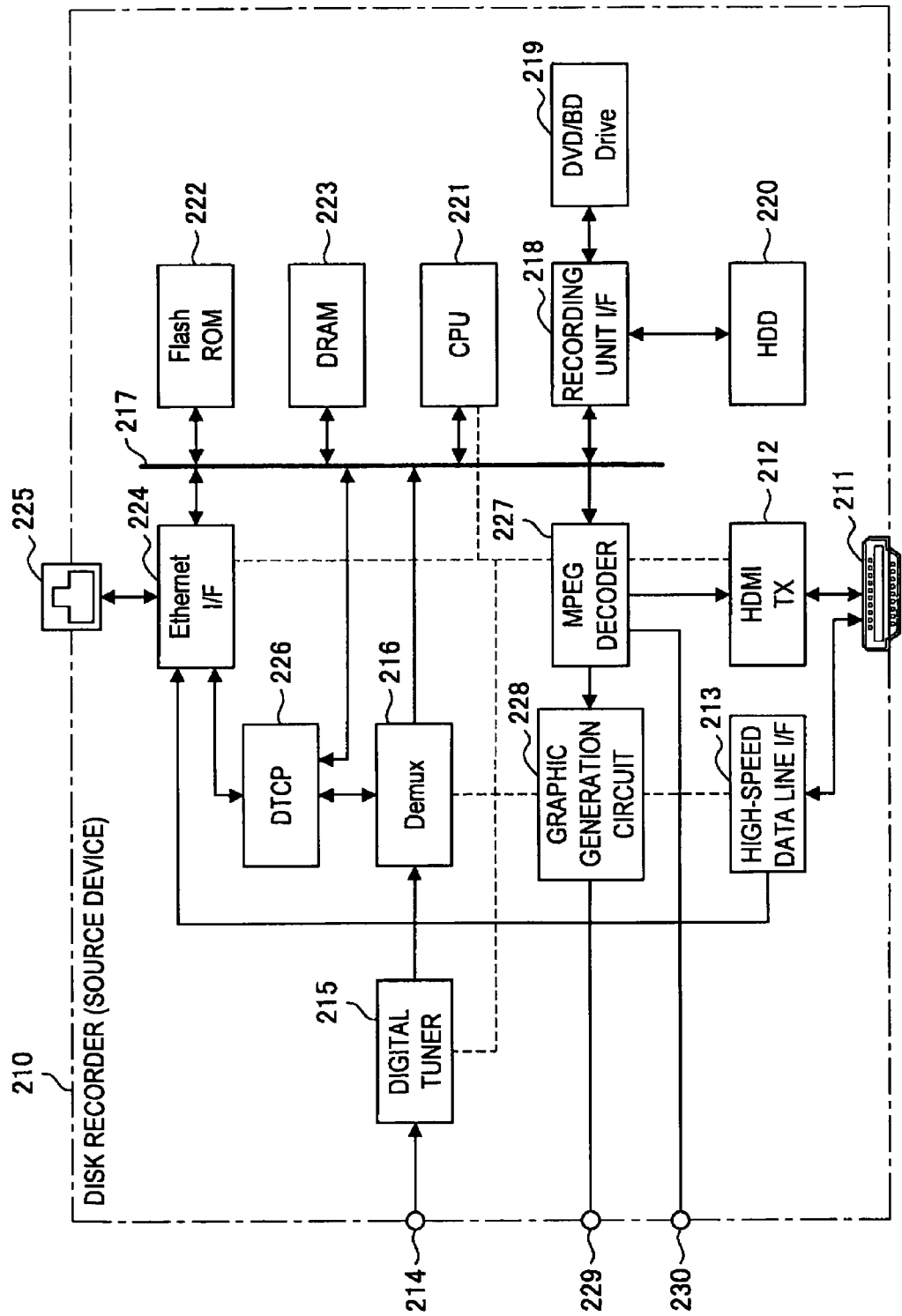
FIG. 4 is a block diagram showing a configuration example of a disk recorder (source device) configuring the AV system.

FIG. 4 shows a configuration example of the disk recorder 210. The disk recorder 210 has the HDMI terminal 211, the HDMI transmitting unit 212, the high-speed data line interface 213, an antenna terminal 214, a digital tuner 215, a demultiplexer 216, an internal bus 217, a recording unit interface 218, a DVD/BD drive 219, an HDD (Hard Disk Drive) 220, a CPU 221, a flash ROM 222, a DRAM 223, an Ethernet (registered trademark) interface (Ethernet I/F) 224, a network terminal 225, a DTCP circuit 226, an MPEG decoder 227, a graphic generation circuit 228, a video output terminal 229, and an audio output terminal 230.

The HDMI transmitting unit (HDMI source) 212 transmits baseband video (image) and audio data from the HDMI terminal 211 by communication conforming to the HDMI. Details of the HDMI transmitting unit 212 will be described later. The high-speed data line interface 213 is an interface for bi-directional communication path configured by predetermined lines (in the present embodiment, a reserved line and HPD line) of HDMI cable. Details of the high-speed data line interface 213 will be described later.

The antenna terminal 214 is a terminal to input a TV broadcast signal received by a receiving antenna (not shown). The digital tuner 215 processes the TV broadcast signal input into the antenna terminal 214 to output a predetermined transport stream. The demultiplexer 216 extracts a partial TS (TS packets of video data and TS packets of audio data) corresponding to a predetermined selected channel from the transport stream obtained by the digital tuner 215.

The demultiplexer 216 extracts PSI/SI from the transport stream obtained by the digital tuner 215 and outputs the PSI/SI to the CPU 221. In the transport stream obtained by the digital tuner 215, a plurality of channels is multiplexed. Processing to extract a partial TS of an arbitrary channel from the transport stream by the demultiplexer 216 is enabled by obtaining information about the packet ID (PID) of the arbitrary channel from the PSI/SI (PAT/PMT).

The CPU 221, the flash ROM 222, the DRAM 223, the demultiplexer 216, the Ethernet (registered trademark) interface 224, and the recording unit interface 218 are connected to the internal bus 217. The DVD/BD drive 219 and the HDD 220 are connected to the internal bus 217 via the recording unit interface 218. The DVD/BD drive 219 and the HDD 220 record a partial TS extracted by the demultiplexer 216. The DVD/BD drive 219 and the HDD 220 each reproduce the partial TS recorded in a recording medium.

The MPEG decoder 227 obtains video data by performing decode processing on video PES packets constituting a partial TS extracted by the demultiplexer 216 or reproduced by the DVD/BD drive 219 or the HDD 220. The MPEG decoder 227 also obtains audio data by performing decode processing on audio PES packets including the partial TS.

The graphic generation circuit 228 performs superposition processing of graphic data on the video data obtained by the MPEG decoder 227 when necessary. The video output terminal 229 outputs the video data output from the graphic generation circuit 228. The audio output terminal 230 outputs the audio data obtained by the MPEG decoder 227.

The DTCP circuit 226 encrypts the partial TS extracted by the demultiplexer 216 or reproduced by the DVD/BD drive 219 or the HDD 220 when necessary. The DTCP circuit 226 also decrypts encrypted data supplied from the network terminal 225 or the high-speed data line interface 213 via the Ethernet (registered trademark) interface 224.

The CPU 221 controls the operation of each unit of the disk recorder 210. The flash ROM 222 stores control software and keeps data. The DRAM 223 configures a work area of the CPU 221. The CPU 221 controls the operation of each unit of the disk recorder 210 by expanding software or data read from the flash ROM 222 on the DRAM 223 to cause the software to activate.

The operation of the disk recorder 210 shown in FIG. 4 will briefly be described.

A TV broadcast signal input into the antenna terminal 214 is supplied to the digital tuner 215. The digital tuner 215 processes the TV broadcast signal to output a predetermined transport stream and the predetermined transport stream is supplied to the demultiplexer 216. The demultiplexer 216 extracts a partial TS (TS packets of video data and TS packets of audio data) corresponding to the predetermined channel from the transport stream. The partial TS is supplied to the DVD/BD drive 219 or the HDD 220 via the recording unit interface 218 and recorded therein based on recording instructions from the CPU 221.

As described above, the partial TS extracted by the demultiplexer 216 or reproduced by the DVD/BD drive 219 or the HDD 220 is supplied to the MPEG decoder 227. The MPEG decoder 227 obtains video data by performing decode processing on video PES packets including TS packets of video data. The video data is output to the video output terminal 229 after superposition processing of graphic data being performed thereon by the graphic generation circuit 228. The MPEG decoder 227 also obtains audio data by performing decode processing on audio PES packets including TS packets of audio data. The audio data is output to the audio output terminal 230.

The video (image) data and audio data obtained by the MPEG decoder 227 corresponding to the partial TS reproduced by the DVD/BD drive 219 or the HDD 220 are supplied to the HDMI transmitting unit 212 before being transmitted to an HDMI cable connected to the HDMI terminal 211 when necessary.

The partial TS extracted by the demultiplexer 216 or reproduced by the DVD/BD drive 219 or the HDD 220 is encrypted by the DTCP circuit 226 when necessary and then supplied to the high-speed data line interface 213 via the Ethernet (registered trademark) interface 224 as transmission data. Thus, the partial TS is transmitted to a device on the remote side via predetermined lines of an HDMI cable connected to the HDMI terminal 211.

When the partial TS extracted by the demultiplexer 216 or reproduced by the DVD/BD drive 219 or the HDD 220 is sent out to a network, the partial TS is encrypted by the DTCP circuit 226 and then output to the network terminal 225 via the Ethernet (registered trademark) interface 224.

The encrypted partial TS input into the network terminal 225 or received by the high-speed data line interface 213 from the HDMI terminal 211 is supplied to the DTCP circuit 226 via the Ethernet (registered trademark) interface 224 before being decrypted when necessary. Thus, the partial TS decrypted by the DTCP circuit 226 is supplied to the DVD/BD drive 219 or the HDD 220 via the recording unit interface 218 before being recorded based on recording instructions from the CPU 221.

The high-speed data line interface 213 receives an IP packet that is transmitted through predetermined lines of an HDMI cable connected to the HDMI terminal 211 and contains remote control code. The IP packet is supplied to the CPU 221 via the Ethernet (registered trademark) interface 224. If the remote control code contained in the IP packet is related to control of the disk recorder 210, the CPU 221 controls each unit of the disk recorder 210 based on the remote control code.

Figure 5:
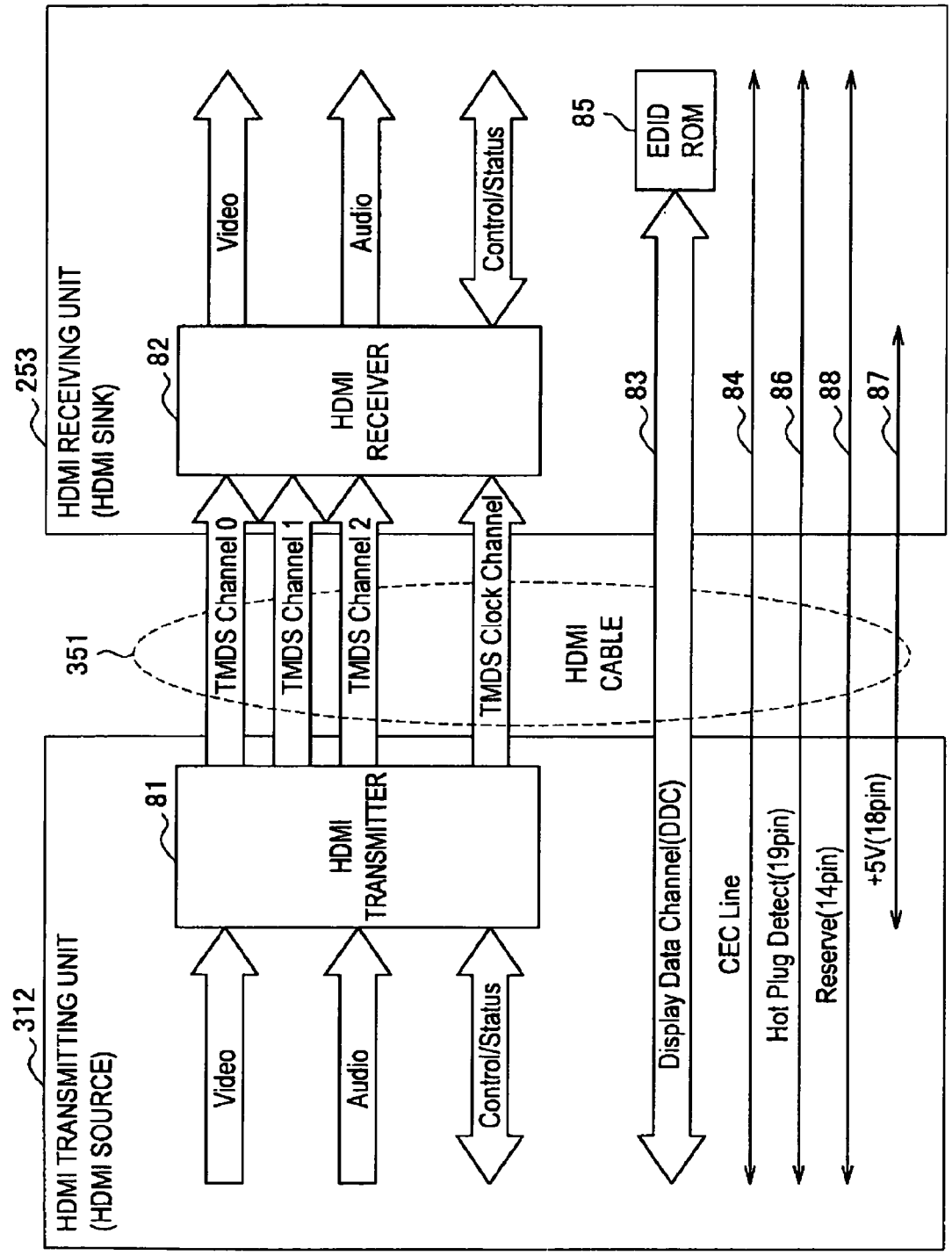
FIG. 5 is a block diagram showing a configuration example of an HDMI transmitting unit (HDMI source) and an HDMI receiving unit (HDMI sink)

FIG. 5 shows a configuration example of the HDMI transmitting unit (HDMI source) 312 of the set top box 310 and the HDMI receiving unit (HDMI sink) 253 of the TV receiver 250 in the AV system 200 in FIG. 1.

The HDMI source 312 transmits a differential signal corresponding to pixel data of an image for one non-compressed screen in one direction to the HDMI sink 253 through a plurality of channels in an effective image period (hereinafter, called an active video period when appropriate), which is a period obtained by removing a horizontal retrace period and a vertical retrace period from an period ranging from one vertical synchronization signal to the next vertical synchronization signal, and also transmits a differential signal corresponding to audio data, control data, and other auxiliary data accompanying at least images in one direction to the HDMI sink 253 through the plurality of channels in the horizontal retrace period or vertical retrace period.

That is, the HDMI source 312 has a transmitter 81. The transmitter 81 converts, for example, pixel data of a non-compressed image into a corresponding differential signal to serially transmit the differential signal in one direction to the HDMI sink 253 connected via the HDMI cable 351 through three TMDS channels #0, #1, and #2, which are the plurality of channels.

The transmitter 81 also converts audio data accompanying the non-compressed image and further necessary control data and other auxiliary data into a corresponding differential signal to serially transmit the differential signal in one direction to the HDMI sink 253 connected via the HDMI cable 351 through the three TMDS channels #0, #1, and #2.

Further, the transmitter 81 transmits a pixel clock synchronized with pixel data transmitted through the three TMDS channels #0, #1, and #2 to the HDMI sink 253 connected via the HDMI cable 351 through a TMDS clock channel. Here, 10 bits of pixel data are transmitted in a period of one clock of the pixel clock through one TMDS channel #i (i=0, 1, 2).

The HDMI sink 253 receives a differential signal transmitted in one direction from the HDMI source 312 through a plurality of channels in an active video period and corresponding to pixel data and also receives a differential signal transmitted in one direction from the HDMI source 312 through the plurality of channels in a horizontal retrace period or a vertical retrace period and corresponding to audio data or control data.

That is, the HDMI sink 253 has a receiver 82. The receiver 82 receives a differential signal transmitted in one direction from the HDMI source 312 connected via the HDMI cable 351 through the TMDS channels #0, #1, and #2 and corresponding to pixel data and a differential signal corresponding to audio data or control data in synchronization with a pixel clock similarly transmitted from the HDMI source 312 through the TMDS clock channel.

Transmission channels of the HDMI system including the HDMI source 312 and the HDMI sink 253 include, in addition to the three TMDS channels #0 to #2 as transmission channels to serially transmit pixel data and audio data in one direction in synchronization with the pixel clock and the TMDS clock channel as a transmission channel to transmit the pixel clock, transmission channels called a DDC (Display Data Channel) 83 and a CEC line 84.

The DDC 83 includes two signal lines (not shown) contained in the HDMI cable 351 and is used by the HDMI source 312 to read E-EDID (Enhanced Extended Display Identification Data) from the HDMI sink 253 connected via the HDMI cable 351.

That is, the HDMI sink 253 has, in addition to the receiver 82, an EDID ROM (Read Only Memory) 85 storing E-EDID, which is performance information of configuration/capability of the HDMI sink 253. The HDMI source 312 reads E-EDID of the HDMI sink 253 via the DDC 83 from the HDMI sink 253 connected via the HDMI cable 351 and recognizes, for example, the format (profile) of images supported by an electronic device holding the HDMI sink 253 as RGB, Y:Cb:Cr=4:4:4, or Y:Cb:Cr=4:2:2 based on the E-EDID.

The CEC line 84 includes one signal line (not shown) contained in the HDMI cable 351 and is used to perform bi-directional communication of data for control between the HDMI source 312 and the HDMI sink 253.

The HDMI cable 351 contains a line 86 connected to a pin called HPD (Hot Plug Detect). A source device can detect connection of a sink device by using the line 86. The HDMI cable 351 also contains a line 87 used to supply power from the source device to the sink device. Further, the HDMI cable 351 contains a reserved line 88.

Figure 6:
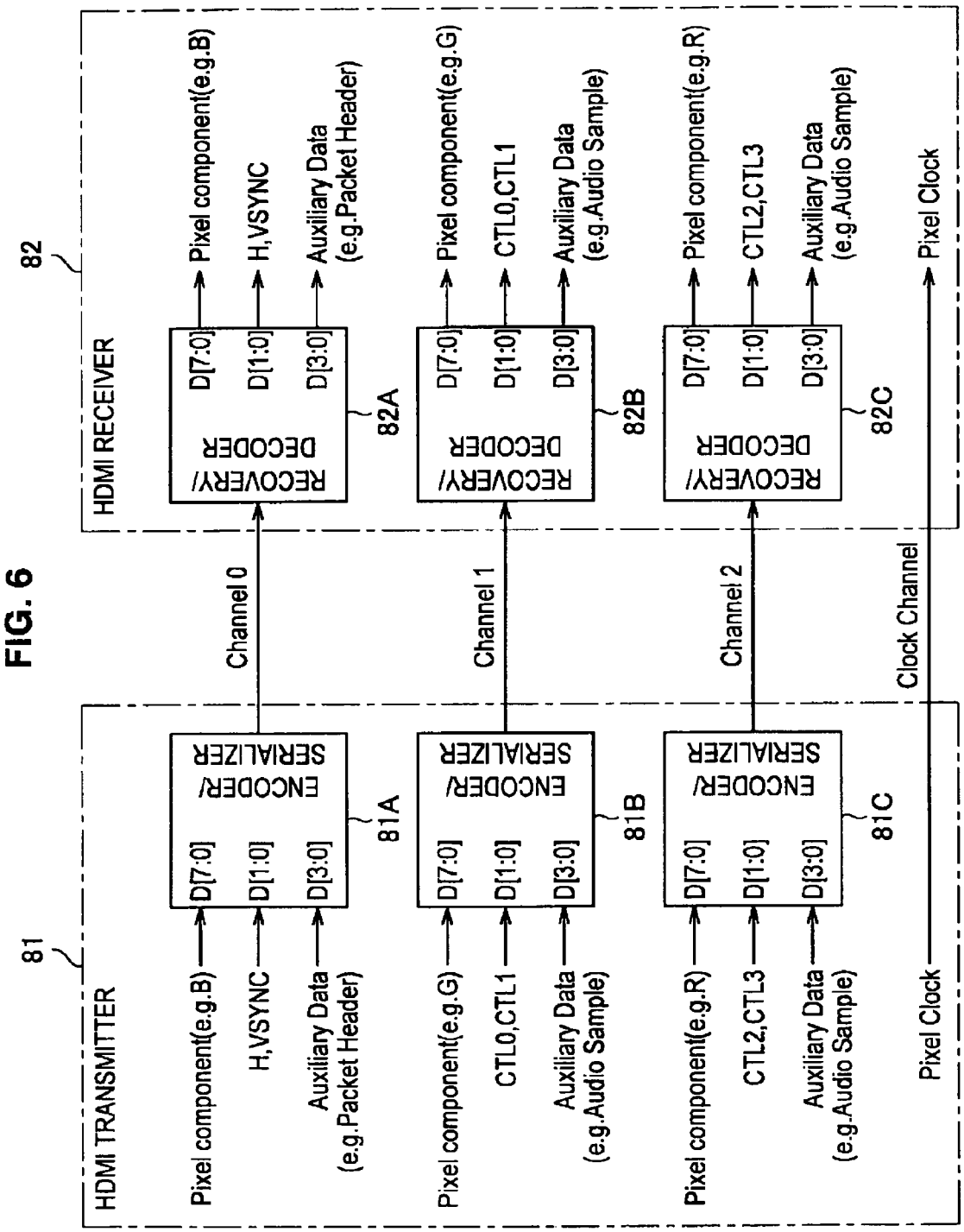
FIG. 6 is a block diagram showing a configuration example of an HDMI transmitter and an HDMI receiver.

FIG. 6 shows a configuration example of the HDMI transmitter 81 and the HDMI receiver 82 in FIG. 5.

The transmitter 81 has three encoders/serializers 81A, 81B, and 81C corresponding to the three TMDS channels #0, #1, and #2. Then, the encoders/serializers 81A, 81B, and 81C each encode image data, auxiliary data, and control data supplied thereto and convert parallel data into serial data to transmit the serial data as a differential signal. If image data has, for example, three components of R(red), G(green), and B(blue), the B component is supplied to the encoder/serializer 81A, the G component to the encoder/serializer 81B, and the R component to the encoder/serializer 81C.

Auxiliary data includes, for example, audio data and a control packet and the control packet is supplied to, for example, the encoder/serializer 81A and the audio data to the encoders/serializers 81B and 81C.

Further, control data includes a 1-bit vertical synchronization signal (VSYNC), a 1-bit horizontal synchronization signal (HSYNC), and 1-bit control bits CTL0, CTL1, CTL2, and CTL3. The vertical synchronization signal and horizontal synchronization signal are supplied to the encoder/serializer 81A. The control bits CTL0 and CTL1 are supplied to the encoder/serializer 81B and the control bits CTL2 and CTL3 to the encoder/serializer 81C.

The encoder/serializer 81A transmits the B component of image data supplied thereto, the vertical synchronization signal and horizontal synchronization signal, and auxiliary data in a time division fashion. That is, the encoder/serializer 81A converts the B component of image data supplied thereto into parallel data in 8 bits, which is the fixed number of bits. Further, the encoder/serializer 81A encodes and converts the parallel data into serial data to transmit the serial data through the TMDS channel #0.

The encoder/serializer 81A also encodes and converts 2 bits of parallel data of the vertical synchronization signal and horizontal synchronization signal supplied thereto into serial data to transmit the serial data through the TMDS channel #0. Further, the encoder/serializer 81A converts auxiliary data supplied thereto into parallel data in 4 bits. Then, the encoder/serializer 81A encodes and converts the parallel data into serial data to transmit the serial data through the TMDS channel #0.

The encoder/serializer 81B transmits the G component of image data supplied thereto, the control bits CTL0 and CTL1, and auxiliary data in a time division fashion. That is, the encoder/serializer 81B converts the G component of image data supplied thereto into parallel data in 8 bits, which is the fixed number of bits. Further, the encoder/serializer 81B encodes and converts the parallel data into serial data to transmit the serial data through the TMDS channel #1.

The encoder/serializer 81B also encodes and converts 2 bits of parallel data of the control bits CTL0 and CTL1 supplied thereto into serial data to transmit the serial data through the TMDS channel #1. Further, the encoder/serializer 81B converts auxiliary data supplied thereto into parallel data in 4 bits. Then, the encoder/serializer 81B encodes and converts the parallel data into serial data to transmit the serial data through the TMDS channel #1.

The encoder/serializer 81C transmits the R component of image data supplied thereto, the control bits CTL2 and CTL3, and auxiliary data in a time division fashion. That is, the encoder/serializer 81C converts the R component of image data supplied thereto into parallel data in 8 bits, which is the fixed number of bits. Further, the encoder/serializer 81C encodes and converts the parallel data into serial data to transmit the serial data through the TMDS channel #2.

The encoder/serializer 81C also encodes and converts 2 bits of parallel data of the control bits CTL2 and CTL3 supplied thereto into serial data to transmit the serial data through the TMDS channel #2. Further, the encoder/serializer 81C converts auxiliary data supplied thereto into parallel data in 4 bits. Then, the encoder/serializer 81C encodes and converts the parallel data into serial data to transmit the serial data through the TMDS channel #2.

The receiver 82 has three recovery/decoders 82A, 82B, and 82C corresponding to the three TMDS channels #0, #1, and #2 respectively. Then, the recovery/decoders 82A, 82B, and 82C receive image data, auxiliary data, and control data transmitted through the TMDS channels #0, #1, and #2 as a differential signal respectively. Further, the recovery/decoders 82A, 82B, and 82C each convert the image data, auxiliary data, and control data from serial data into parallel data and decodes the parallel data for output.

That is, the recovery/decoder 82A receives the B component of image data, the vertical synchronization signal and horizontal synchronization signal, and auxiliary data transmitted as a differential signal through the TMDS channel #0. Then, the recovery/decoder 82A converts the B component of image data, the vertical synchronization signal and horizontal synchronization signal, and auxiliary data from serial data into parallel data and decodes the parallel data for output.

The recovery/decoder 82B receives the G component of image data, the control bits CTL0 and CTL1, and auxiliary data transmitted as a differential signal through the TMDS channel #1. Then, the recovery/decoder 82B converts the G component of image data, the control bits CTL0 and CTL1, and auxiliary data from serial data into parallel data and decodes the parallel data for output.

The recovery/decoder 82C receives the R component of image data, the control bits CTL2 and CTL3, and auxiliary data transmitted as a differential signal through the TMDS channel #2. Then, the recovery/decoder 82C converts the R component of image data, the control bits CTL2 and CTL3, and auxiliary data from serial data into parallel data and decodes the parallel data for output.

Figure 7:
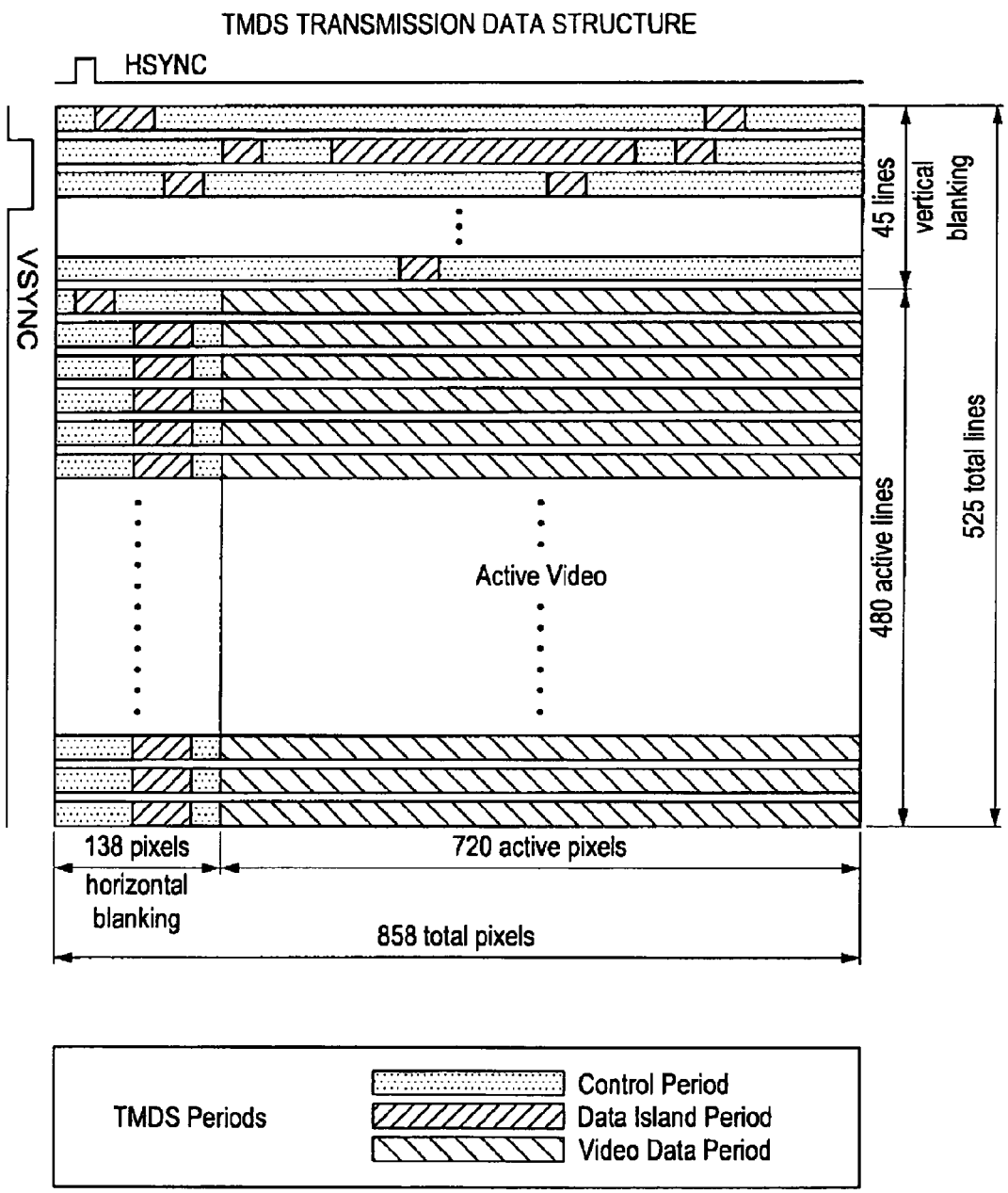
FIG. 7 is a diagram showing a structure of TMDS transmission data.

FIG. 7 shows an example of transmission periods in which various kinds of transmission data are transmitted through the three TMDS channels #0, #1, and #2 of HDMI. FIG. 7 shows periods of various kinds of transmission data when a progressive image of 720×480 pixels is transmitted through the TMDS channels #0, #1, and #2.

In a video field in which transmission data is transmitted through the three TMDS channels #0, #1, and #2 of HDMI, three types of periods, a video data period, a data island period, and a control period, are present depending on the type of transmission data.

The video field period is a period from an active edge of some vertical synchronization signal to the active edge of the next vertical synchronization signal and is divided into horizontal blanking, vertical blanking, and active video, which is a period obtained by removing the horizontal blanking and vertical blanking from the video field period.

The video data period is assigned to active video. In the video data period, data of active pixels for 720 pixels×480 lines constituting image data for one non-compressed screen is transmitted.

The data island period and the control period are assigned to the horizontal blanking and vertical blanking. In the data island period and control period, auxiliary data is transmitted.

That is, the data island period is assigned to a portion of the horizontal blanking and vertical blanking. In the data island period, data not related to control of auxiliary data such as packets of audio data is transmitted.

The control period is assigned to the other portion of the horizontal blanking and vertical blanking. In the control period, data related to control of auxiliary data such as a vertical synchronization signal, a horizontal synchronization signal, and control packets is transmitted.

In the currently used HDMI, the frequency of the pixel clock transmitted by the TMDS clock channel is, for example, 165 MHz and in this case, the transmission rate in the data island period becomes about 500 Mbps.

FIG. 8 shows pinouts of HDMI terminals 29 and 31. The pinouts are called the type A.

Two lines of differential lines through which differential signals of the TMDS channel #i, TMDS Data #1+ and TMDS Data #1−, are transmitted are connected to pins (pins whose pin numbers are 1, 4, and 7) to which TMDS Data #1+ is assigned and pins (pins whose pin numbers are 3, 6, and 9) to which TMDS Data #1− is assigned.

The CEC line 84 through which a CEC signal, which is data for control, is transmitted is connected to the pin whose pin number is 13 and the pin whose pin number is 14 is reserved. The line through which an SDA (Serial Data) signal such as E-EDID is transmitted is connected to the pin whose pin number is 16 and the line through which an SCL (Serial Clock) signal, which is a clock signal used for synchronization when an SDA (Serial Data) signal is received, is connected to the pin whose pin number is 15. The DDC 83 described above is constituted by a line through which an SDA signal is transmitted and a line through which an SCL signal is transmitted.

The aforementioned line 86 used by a source device to detect connection of a sink device is connected to the pin whose pin number is 19. The aforementioned line 87 to supply power is connected to the pin whose pin number is 18.

FIG. 5 shows a configuration example of the HDMI transmitting unit (HDMI source) 312 of the set top box 310 and the HDMI receiving unit (HDMI sink) 253 of the TV receiver 250 in the AV system 200 in FIG. 1. Though a detailed description is omitted, other HDMI transmitting units and HDMI receiving units in the AV system 200 in FIG. 1 are similarly configured.

Figure 9:
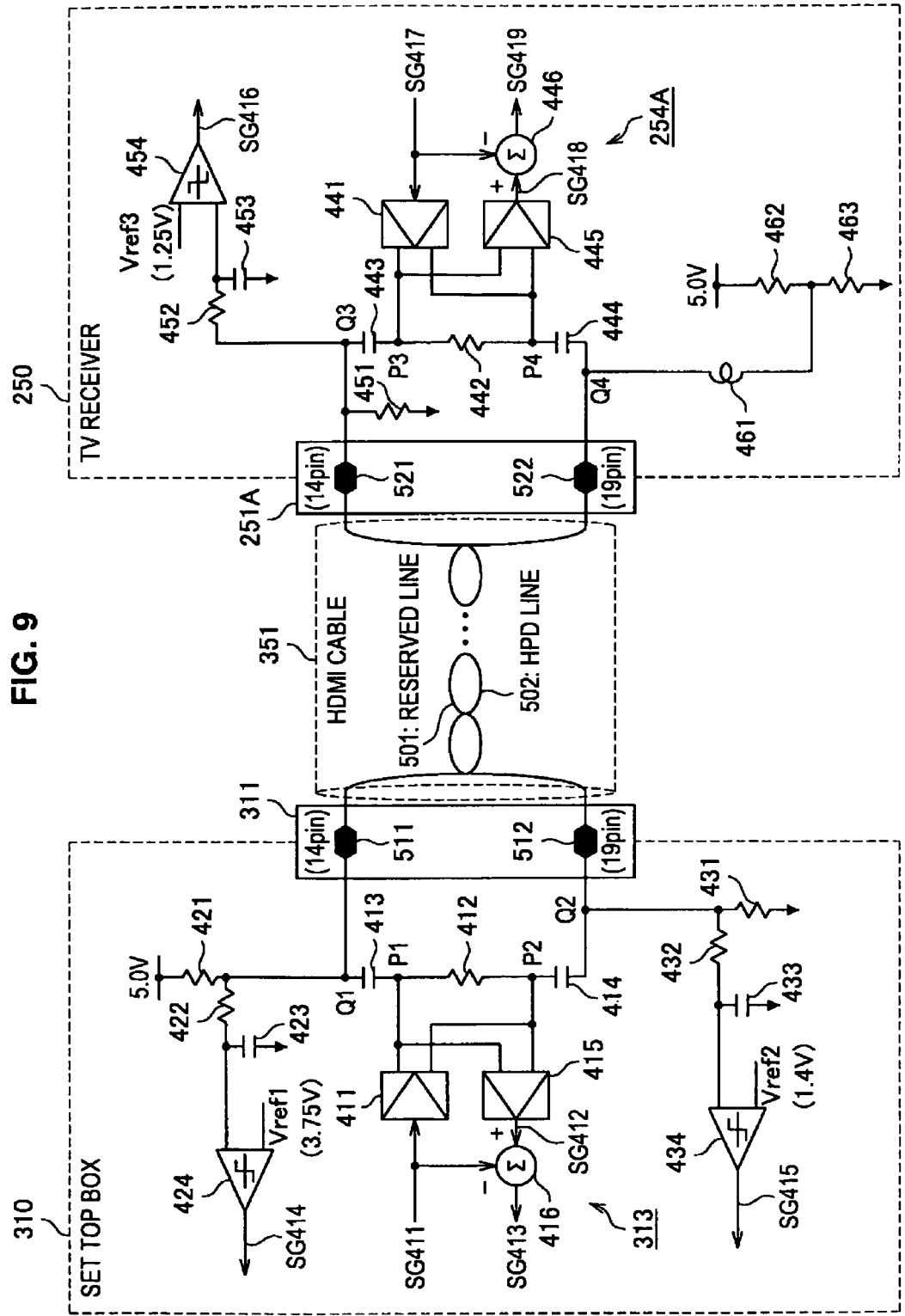
FIG. 9 is a connection diagram showing a configuration example of a high-speed data line interface between the set top box and TV receiver.

FIG. 9 shows a configuration example of the high-speed data line interface 313 of the set top box 310 and the high-speed data line interface 254A of the TV receiver 250 in the AV system 200 in FIG. 1. These interfaces 313 and 254A constitute a communication unit that performs LAN (Local Area Network) communication. The communication unit performs communication by using a bi-directional communication path configured by a pair of differential lines of a plurality of lines constituting the HDMI cable 351, in the present embodiment, configured by a reserved line (Etherline) corresponding to the reserved pin (14pin) and an HPD line (Ether+ line) corresponding to the HPD pin (19pin).

The set top box 310 has a LAN signal transmitting circuit 411, a terminating resistor 412, AC connecting capacitors 413 and 414, a LAN signal receiving circuit 415, a subtraction circuit 416, a pull-up resistor 421, a resistor 422 and a capacitor 423 configuring a low-pass filter, a comparator 424, a pull-down resistor 431, a resistor 432 and a capacitor 433 configuring a low-pass filter, and a comparator 434. Here, the high-speed data line interface 313 includes the LAN signal transmitting circuit 411, the terminating resistor 412, the AC connecting capacitors 413 and 414, the LAN signal receiving circuit 415, and the subtraction circuit 416.

A series circuit of the pull-up resistor 421, the AC connecting capacitor 413, the terminating resistor 412, the AC connecting capacitor 414, and the pull-down resistor 431 is connected between a power source line (+5.0 V) and a ground line. A mutual connection point P1 of the AC connecting capacitor 413 and the terminating resistor 412 is connected to the positive output side of the LAN signal transmitting circuit 411 and also to the positive input side of the LAN signal receiving circuit 415. A mutual connection point P2 of the AC connecting capacitor 414 and the terminating resistor 412 is connected to the negative output side of the LAN signal transmitting circuit 411 and also to the negative input side of the LAN signal receiving circuit 415. A transmission signal (transmission data) SG411 is supplied to the input side of the LAN signal transmitting circuit 411.

An output signal SG412 of the LAN signal receiving circuit 415 is supplied to a positive-side terminal of the subtraction circuit 416 and the transmission signal (transmission data) SG411 to a negative-side terminal of the subtraction circuit 416. The transmission signal SG411 is subtracted from the output signal SG412 of the LAN signal receiving circuit 415 by the subtraction circuit 416 to obtain a received signal (received data) SG413.

A mutual connection point Q1 of the pull-up resistor 421 and the AC connecting capacitor 413 is connected to the ground line via a series circuit of the resistor 422 and the capacitor 423. An output signal of the low-pass filter obtained at a mutual connection point of the resistor 422 and the capacitor 423 is supplied to one input terminal of the comparator 424. The comparator 424 compares the output signal of the low-pass filter with a reference voltage Vref1 (+3.75 V) supplied to the other input terminal. An output signal SG414 of the comparator 424 is supplied to the CPU 314.

A mutual connection point Q2 of the AC connecting capacitor 414 and the pull-down resistor 431 is connected to the ground line via a series circuit of the resistor 432 and the capacitor 433. An output signal of the low-pass filter obtained at a mutual connection point of the resistor 432 and the capacitor 433 is supplied to one input terminal of the comparator 434. The comparator 434 compares the output signal of the low-pass filter with a reference voltage Vref2 (+1.4 V) supplied to the other input terminal. An output signal SG415 of the comparator 434 is supplied to the CPU 314.

The TV receiver 250 has a LAN signal transmitting circuit 441, a terminating resistor 442, AC connecting capacitors 443 and 444, a LAN signal receiving circuit 445, a subtraction circuit 446, a pull-down resistor 451, a resistor 452 and a capacitor 453 configuring a low-pass filter, a comparator 454, a choke coil 461, a resistor 462, and a resistor 463. Here, the high-speed data line interface 254A includes the LAN signal transmitting circuit 441, the terminating resistor 442, the AC connecting capacitors 443 and 444, the LAN signal receiving circuit 445, and the subtraction circuit 446.

A series circuit of the resistor 462 and the resistor 463 is connected between the power source line (+5.0 V) and the ground line. Then, a series circuit of the choke coil 461, the AC connecting capacitor 444, the terminating resistor 442, the AC connecting capacitor 443, and the pull-down resistor 451 is connected between a mutual connection point of the resistor 462 and the resistor 463 and the ground line.

A mutual connection point P3 of the AC connecting capacitor 443 and the terminating resistor 442 is connected to the positive output side of the LAN signal transmitting circuit 441 and also to the positive input side of the LAN signal receiving circuit 445. A mutual connection point P4 of the AC connecting capacitor 444 and the terminating resistor 442 is connected to the negative output side of the LAN signal transmitting circuit 441 and also to the negative input side of the LAN signal receiving circuit 445. A transmission signal (transmission data) SG417 is supplied to the input side of the LAN signal transmitting circuit 441.

An output signal SG418 of the LAN signal receiving circuit 445 is supplied to a positive-side terminal of the subtraction circuit 446 and a transmission signal SG417 to a negative-side terminal of the subtraction circuit 446. The transmission signal SG417 is subtracted from the output signal SG418 of the LAN signal receiving circuit 445 by the subtraction circuit 466 to obtain a received signal (received data) SG419.

A mutual connection point Q3 of the pull-down resistor 451 and the AC connecting capacitor 443 is connected to the ground line via a series circuit of the resistor 452 and the capacitor 453. An output signal of the low-pass filter obtained at a mutual connection point of the resistor 452 and the capacitor 453 is supplied to one input terminal of the comparator 454. The comparator 454 compares the output signal of the low-pass filter with a reference voltage Vref3 (+1.25 V) supplied to the other input terminal. An output signal SG416 of the comparator 454 is supplied to the CPU 314.

A reserved line 501 and an HPD line 502 contained in the HDMI cable 351 constitute a differential twisted pair. A source-side end 511 of the reserved line 501 is connected to the 14pin of the HDMI terminal 311 and a sink-side end 521 of the reserved line 501 to the 14pin of the HDMI terminal 251A. A source-side end 512 of the HPD line 502 is connected to the 19pin of the HDMI terminal 311 and a sink-side end 522 of the HPD line 502 to the 19pin of the HDMI terminal 251A.

In the set top box 310, the aforementioned mutual connection point Q1 of the pull-up resistor 421 and the AC connecting capacitor 413 is connected to the 14pin of the HDMI terminal 311 and the aforementioned mutual connection point Q2 of the pull-down resistor 431 and the AC connecting capacitor 414 to the 19pin of the HDMI terminal 311. In the TV receiver 250, on the other hand, the aforementioned mutual connection point Q3 of the pull-down resistor 451 and the AC connecting capacitor 443 is connected to the 14pin of the HDMI terminal 251A and the aforementioned mutual connection point Q4 of the choke coil 461 and the AC connecting capacitor 444 to the 19pin of the HDMI terminal 251A.

Next, the operation of LAN communication by the high-speed data line interfaces 313 and 254A configured as described above will be described.

In the set top box 310, the transmission signal (transmission data) SG411 is supplied to the input side of the LAN signal transmitting circuit 411 and a differential signal (positive output signal/negative output signal) corresponding to the transmission signal SG411 is output from the LAN signal transmitting circuit 411. Then, the differential signal output from the LAN signal transmitting circuit 411 is supplied to the connection points P1 and P2 before being transmitted to the TV receiver 250 through a pair of lines (the reserved line 501 and the HPD line 502) of the HDMI cable 351.

In the TV receiver 250, the transmission signal (transmission data) SG417 is supplied to the input side of the LAN signal transmitting circuit 441 and a differential signal (positive output signal/negative output signal) corresponding to the transmission signal SG417 is output from the LAN signal transmitting circuit 441. Then, the differential signal output from the LAN signal transmitting circuit 441 is supplied to the connection points P3 and P4 before being transmitted to the set top box 310 through the pair of lines (the reserved line 501 and the HPD line 502) of the HDMI cable 351.

The input side of the LAN signal receiving circuit 415 is connected to the connection points P1 and P2 in the set top box 310 and thus, a sum signal of a transmission signal corresponding to the differential signal (electric signal) output from the LAN signal transmitting circuit 411 and the aforementioned received signal corresponding to the differential signal transmitted from the TV receiver 250 is obtained as the output signal SG412 of the LAN signal receiving circuit 415. The transmission signal SG411 is subtracted from the output signal SG412 of the LAN signal receiving circuit 415 by the subtraction circuit 416. Thus, the output signal SG413 of the subtraction circuit 416 corresponds to the transmission signal (transmission data) SG417 of the TV receiver 250.

The input side of the LAN signal receiving circuit 445 is connected to the connection points P3 and P4 in the TV receiver 250 and thus, a sum signal of a transmission signal corresponding to the differential signal (electric signal) output from the LAN signal transmitting circuit 441 and the aforementioned received signal corresponding to the differential signal transmitted from the set top box 310 is obtained as the output signal SG418 of the LAN signal receiving circuit 445. The transmission signal SG417 is subtracted from the output signal SG418 of the LAN signal receiving circuit 445 by the subtraction circuit 446. Thus, the output signal SG419 of the subtraction circuit 446 corresponds to the transmission signal (transmission data) SG411 of the set top box 310.

Thus, bi-directional LAN communication can be performed between the high-speed data line interface 313 of the set top box 310 and the high-speed data line interface 254A of the TV receiver 250.

In FIG. 9, in addition to the above LAN communication, the HPD line 502 notifies the set top box 310 that the HDMI cable 351 is connected to the TV receiver 250 at a DC bias level. That is, when the HDMI cable 351 is connected to the TV receiver 250, the resistors 462 and 463 and the choke coil 461 in the TV receiver 250 bias the HPD line 502 to about 4 V via the 19pin of the HDMI terminal 251A. The set top box 310 extracts a DC bias of the HPD line 502 by the low-pass filter including the resistor 432 and the capacitor 433 and the comparator 434 compares the DC bias with the reference voltage Vref2 (for example, 1.4 V).

If the HDMI cable 351 is not connected to the TV receiver 250, the voltage of the 19pin of the HDMI terminal 311 is lower than the reference voltage Vref2 due to the presence of the pull-down resistor 431 and conversely, if the HDMI cable 351 is connected to the TV receiver 250, the voltage of the 19pin of the HDMI terminal 311 is higher than the reference voltage Vref2. Thus, the output signal SG415 of the comparator 434 is at a high level when the HDMI cable 351 is connected to the TV receiver 250 and otherwise, the output signal SG415 is at a low level. Accordingly, the CPU 314 of the set top box 310 can recognize whether the HDMI cable 351 is connected to the TV receiver 250 based on the output signal SG415 of the comparator 434.

In FIG. 9, a function is provided to mutually recognize whether a device connected to both ends of the HDMI cable 351 is a LAN communication compatible device (hereinafter, referred to as an "e-HDMI compatible device") or a LAN communication incompatible device (hereinafter, referred to as an "e-HDMI incompatible device") based on a DC bias potential of the reserved line 501.

As described above, the set top box 310 pulls up (+5 V) the reserved line 501 by the resistor 421 and the TV receiver 250 pulls down the reserved line 501 by the resistor 451. The resistors 421 and 451 are not present in an e-HDMI incompatible device.

The set top box 310 compares, as described above, the DC potential of the reserved line 501 passed through the low-pass filter including the resistor 422 and the capacitor 423 with the reference voltage Vref1 by means of the comparator 424. If the TV receiver 250 is an e-HDMI compatible device and the pull-down resistor 451 is present, the voltage of the reserved line 501 becomes 2.5 V. If, however, the TV receiver 250 is an e-HDMI incompatible device and the pull-down resistor 451 is not present, the voltage of the reserved line 501 becomes 5 V due to the presence of the pull-up resistor 421.

Thus, with the reference voltage Vref1 set to, for example, 3.75 V, the output signal SG414 of the comparator 424 is at a low level when the TV receiver 250 is an e-HDMI compatible device and otherwise, the output signal SG414 is at a high level. Accordingly, the CPU 314 of the set top box 310 can recognize whether the TV receiver 250 is an e-HDMI compatible device based on the output signal SG414 of the comparator 424.

Similarly, the TV receiver 250 compares, as described above, the DC potential of the reserved line 501 passed through the low-pass filter including the resistor 452 and the capacitor 453 with the reference voltage Vref3 by means of the comparator 454. If the set top box 310 is an e-HDMI compatible device and the pull-up resistor 421 is present, the voltage of the reserved line 501 becomes 2.5 V. If, however, the set top box 310 is an e-HDMI incompatible device and the pull-up resistor 421 is not present, the voltage of the reserved line 501 becomes 0 V due to the presence of the pull-down resistor 451.

Thus, with the reference voltage Vref3 set to, for example, 1.25 V, the output signal SG416 of the comparator 454 is at a high level when the set top box 310 is an e-HDMI compatible device and otherwise, the output signal SG416 is at a low level. Accordingly, the CPU 271 of the TV receiver 250 can recognize whether the set top box 310 is an e-HDMI compatible device based on the output signal SG416 of the comparator 454.

According to the configuration example shown in FIG. 9, LAN communication is performed as bi-directional communication via a pair of differential transmission paths in an interface that performs data transmission of video and audio by a single line of the HDMI cable 351, exchange and authentication of connected device information, communication of device control data, and LAN communication and the connection state of the interface is notified by the DC bias potential of at least one of the transmission paths and thus, spatial separation becomes possible in which SCL and SDA lines are physically not used for LAN communication. As a result, a circuit for LAN communication can be formed due to division thereof regardless of electrical specifications specified for DDC so that stable and reliable LAN communication can be realized at low cost.

Incidentally, the pull-up resistor 421 shown in FIG. 9 may be provided, instead of inside the set top box 310, inside the HDMI cable 351. In such a case, terminals of the pull-up resistor 421 are each connected to the reserved line 501 and the line (signal line) connected to the power supply (power supply potential) of lines provided inside the HDMI cable 351.

Further, the pull-down resistor 451 and the resistor 463 shown in FIG. 9 may be provided, instead of inside the TV receiver 250, inside the HDMI cable 351. In such a case, terminals of the pull-down resistor 451 are each connected to the reserved line 501 and the line (ground line) connected to the ground (reference potential) of lines provided inside the HDMI cable 351. Terminals of the resistor 463 are each connected to the HPD line 502 and the line (ground line) connected to the ground (reference potential) of lines provided inside the HDMI cable 351.

FIG. 9 shows a configuration example of the high-speed data line interface 313 of the set top box 310 and the high-speed data line interface 254A of the TV receiver 250 in the AV system 200 in FIG. 1. Though a detailed description is omitted, other high-speed data line interfaces in the AV system 200 in FIG. 1 are also similarly configured.

Next, the operation of the AV system 200 shown in FIG. 1 will be described.

Figure 10:
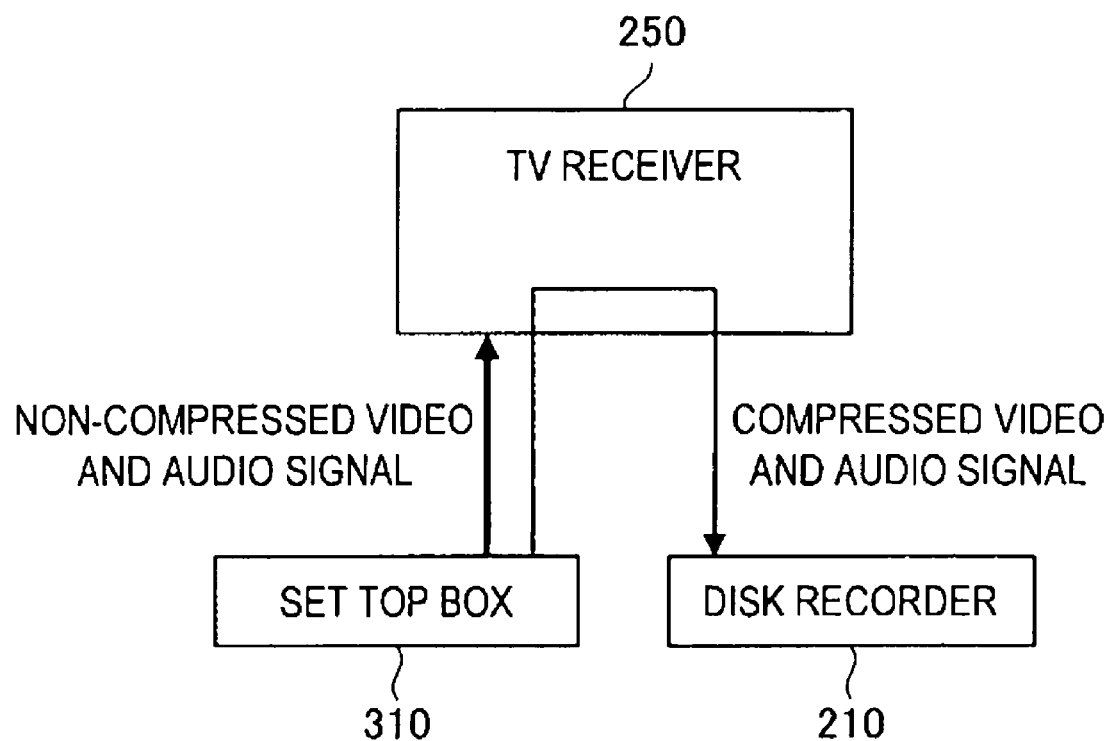
FIG. 10 is a diagram showing a transmission path of streaming data (compressed video and audio signal) and baseband video and audio data (non-compressed video and audio signal) from the set top box in the AV system.

In the AV system 200, as shown in FIG. 10, baseband video (image) and audio data (non-compressed video and audio signal) corresponding to streaming data (partial TS) received by the set top box 310 is transmitted from the set top box 310 to the TV receiver 250 by using the TMDS channel of HDMI. Then, the TV receiver 250 displays images and outputs sound based on the baseband video and audio data.

If the user provides instructions to record a video signal corresponding to a display image in the TV receiver 250, streaming data (compressed video and audio signal) is supplied from the set top box 310 to the TV receiver 250 via a high-speed data line (bi-directional communication path). The streaming data (compressed video and audio signal) is also supplied from the TV receiver 250 to the disk recorder 210 for recording via the high-speed data line (bi-directional communication path).

The above operation will be described in more detail.

The set top box 310 acquires streaming data (encrypted partial TS) of predetermined video content from the network terminal 323 via the Ethernet (registered trademark) interface 322. After being decrypted by the DTCP circuit 318, the streaming data is supplied to the MPEG decoder 324 before being decoded. The MPEG decoder 324 performs decode processing on video PES packets including TS packets of video data to obtain video data and also performs decode processing on audio PES packets including TS packets of audio data to obtain audio data.

Thus, the video (image) and audio data (non-compressed video and audio signal) obtained by the MPEG decoder 324 is supplied to the HDMI transmitting unit 312 and then transmitted to the TV receiver 250 by the TMDS channel of HDMI via the HDMI cable 351.

In the TV receiver 250, the HDMI receiving unit 253 acquires video (image) and audio data (non-compressed video and audio signal) input into the HDMI terminal 251A through the HDMI cable 351. The video data received by the HDMI receiving unit 253 is supplied to the panel driving circuit 262 via the video/graphic processing circuit 261. Thus, images of video content received by the set top box 310 are displayed in the display panel 263. The audio data received by the HDMI receiving unit 253 is supplied to the speaker 266 via the audio signal processing circuit 264 and the audio amplifier circuit 265. Thus, sound of video content received by the set top box 310 is output from the speaker 266.

Thus, it is assumed that while predetermined video content received by the set top box 310 being viewed in the TV receiver 250, recording instructions of a video signal (hereinafter, referred to simply as "recording instructions") corresponding to a display image are provided by the remote control transmitting unit 277 being operated by the user. In this case, an IP packet containing remote control code of recording instructions is supplied from the CPU 271 of the TV receiver 250 to the high-speed data line interface 254A via the Ethernet (registered trademark) interface 274 as transmission data before being transmitted to the set top box 310 via a high-speed data line (bi-directional communication path).

In the set top box 310, the high-speed data line interface 313 receives the IP packet containing remote control code of recording instructions transmitted from the TV receiver 250. The IP packet is supplied to the CPU 314 via the Ethernet (registered trademark) interface 322. The IP packet contains remote control code of recording instructions and thus, the CPU 314 exercises control so that streaming data (compressed video and audio signal) from the network terminal 323 is transmitted to the TV receiver 250 via a high-speed data line (bi-directional communication path).

That is, streaming data from the network terminal 323 is supplied to the high-speed data line interface 313 via the Ethernet (registered trademark) interface 322 as transmission data in the set top box 310 and then transmitted to the TV receiver 250 via a high-speed data line (bi-directional communication path).

As described above, remote control code of recording instructions transmitted from the TV receiver 250 via a high-speed data line (bi-directional communication path) functions in the set top box 310 as a transmission request of streaming data (compressed video and audio signal).

If the user operates the remote control transmitting unit 277 to provide recording instructions to the TV receiver 250 as described above, received data received by the high-speed data line interface 254A is supplied to the high-speed data line interface 254B as transmission data under the control of the CPU 271 so that path changeover by the path changeover switch 255 occurs.

In the TV receiver 250, the high-speed data line interface 254A receives streaming data transmitted from the set top box 310. The streaming data is supplied to the high-speed data line interface 254B via the path changeover switch 255 as transmission data before being transmitted to the disk recorder 210 via a high-speed data line (bi-directional communication path).

In the disk recorder 210, the high-speed data line interface 213 receives the streaming data (compressed video and audio signal) transmitted from the TV receiver 250. The streaming data is supplied to the DTCP circuit 226 via the Ethernet (registered trademark) interface 224 before being decrypted. A partial TS obtained by the DTCP circuit 226 is supplied to the DVD/BD drive 219 or the HDD 220 via the recording unit interface 218 before being recorded based on recording instructions from the CPU 221.

If the user operates the remote control transmitting unit 277 to provide recording instructions to the TV receiver 250 as described above, an IP packet containing remote control code of recording instructions is supplied from the CPU 271 to the high-speed data line interface 254B via the Ethernet (registered trademark) interface 274 as transmission data before being transmitted to the disk recorder 210 via a high-speed data line (bi-directional communication path).

In the disk recorder 210, the high-speed data line interface 213 receives the IP packet containing remote control code of recording instructions transmitted from the TV receiver 250. The IP packet is supplied to the CPU 221 via the Ethernet (registered trademark) interface 224. The IP packet contains remote control code of recording instructions and thus, as described above, recording instructions are issued by the CPU 221 so that a partial TS transmitted from the TV receiver 250 is recorded in the DVD/BD drive 219 or the HDD 220.

In the AV system 200 shown in FIG. 1, baseband video (image) and audio data (non-compressed video and audio signal) corresponding to a partial TS recorded in the disk recorder 210 is transmitted from the disk recorder 210 to the TV receiver 250 by using the TMDS channel of HDMI. Then, the TV receiver 250 displays images and outputs sound based on the baseband video and audio data.

That is, the partial TS reproduced by the DVD/BD drive 219 or the HDD 220 in the disk recorder 210 is supplied to the MPEG decoder 227. The MPEG decoder 227 performs decode processing on video PES packets including TS packets of video data to obtain video data and also performs decode processing on audio PES packets including TS packets of audio data to obtain audio data.

Thus, the video (image) and audio data (non-compressed video and audio signal) obtained by the MPEG decoder 227 is supplied to the HDMI transmitting unit 212 and then transmitted to the TV receiver 250 by the TMDS channel of HDMI via the HDMI cable 352.

In the TV receiver 250, the HDMI receiving unit 253 acquires video (image) and audio data (non-compressed video and audio signal) input into the HDMI terminal 251B through the HDMI cable 352. The video data received by the HDMI receiving unit 253 is supplied to the panel driving circuit 262 via the video/graphic processing circuit 261. Thus, images of predetermined video content reproduced by the disk recorder 210 are displayed in the display panel 263. The audio data received by the HDMI receiving unit 253 is supplied to the speaker 266 via the audio signal processing circuit 264 and the audio amplifier circuit 265. Thus, sound of the predetermined video content reproduced by the disk recorder 210 is output from the speaker 266.

Figure 11:
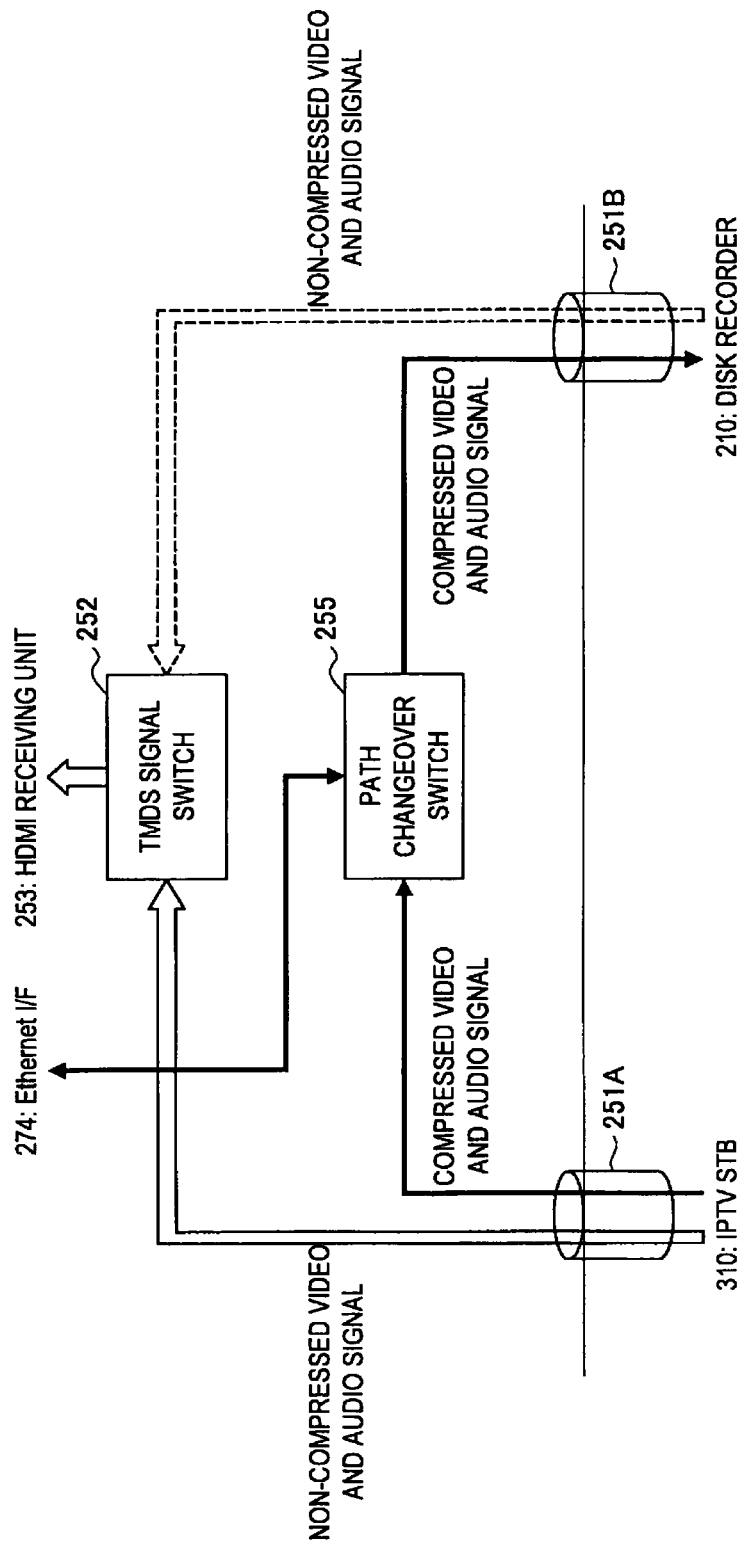
FIG. 11 is a diagram schematically showing a flow of streaming data (compressed video and audio signal) and baseband video and audio data (non-compressed video and audio signal) in the TV receiver.

FIG. 11 schematically shows the flow of signals (data) inside the TV receiver 250 when the aforementioned AV system 200 operates. That is, when predetermined video content is viewed, video (image) and audio data (non-compressed video and audio signal) transmitted from the set top box 310 through the TMDS channel is selected by the TMDS signal switch 252 and supplied to the HDMI receiving unit 253. When the predetermined video content is recorded, streaming data (compressed video and audio signal) transmitted from the set top box 310 via a high-speed data line (bi-directional communication path) passes through the path changeover switch 255 before being transmitted to the disk recorder 210 via a high-speed data line (bi-directional communication path).

In the AV system 200 shown in FIG. 1, as described above, while video (image) and audio data (non-compressed video and audio signal) of predetermined video content being transmitted from the set top box 310 to the TV receiver 250 through the TMDS channel for viewing of the predetermined video content in the TV receiver 250, streaming data (compressed video and audio data) of the predetermined video content can be transmitted from the set top box 310 through the TV receiver 250 to the disk recorder 210 via a high-speed data line (bi-directional communication path). That is, video content being viewed can be recorded without the set top box 310 and the TV receiver 250 having a recording unit, that is, without increasing prices of the set top box 310 and the TV receiver 250.

Figure 12:
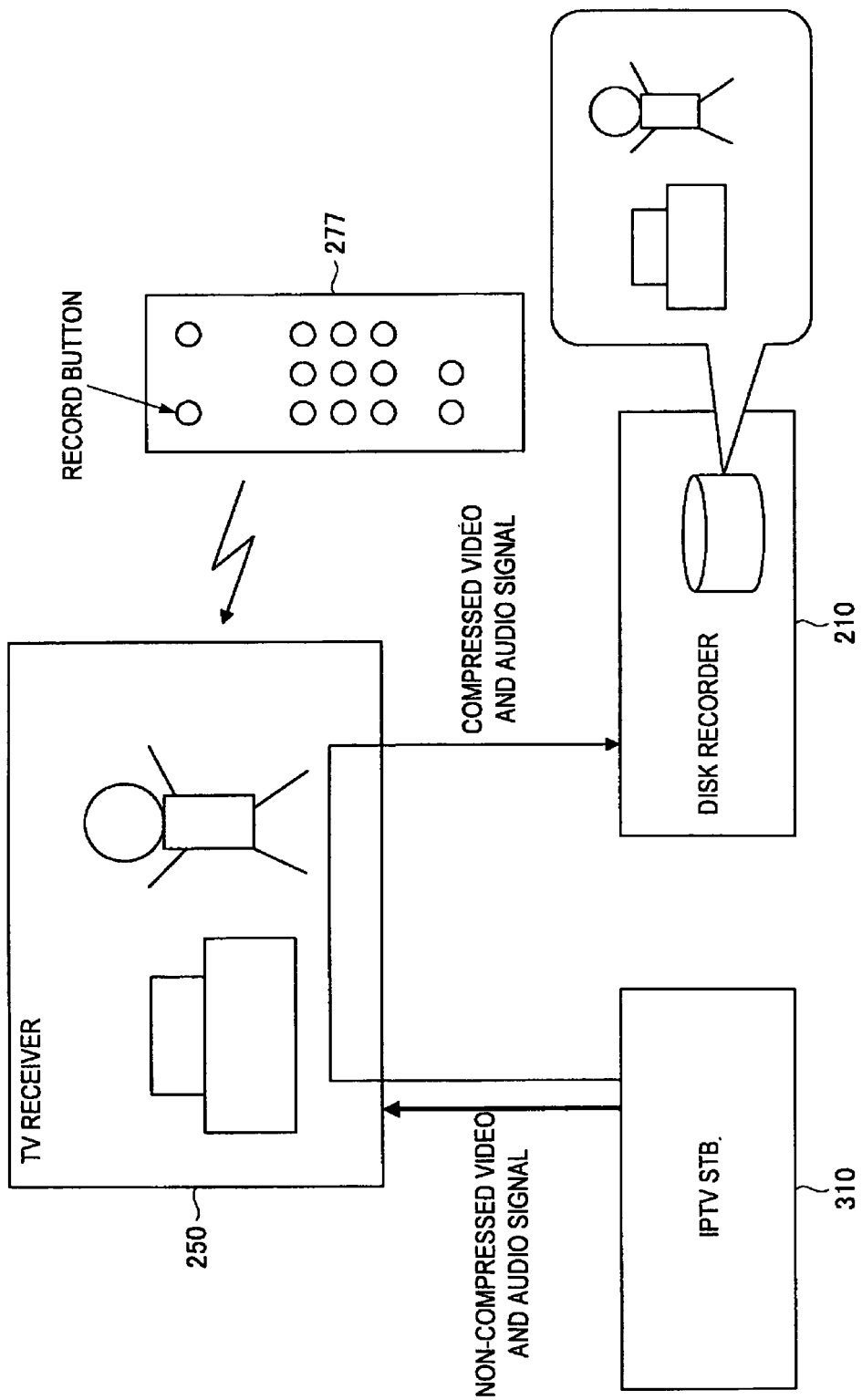
FIG. 12 is a diagram illustrating a recording operation by a user's operation using a remote control transmitter of the TV receiver.

Also in the AV system 200 shown in FIG. 1, as shown in FIG. 12, while predetermined video content being viewed in the TV receiver 250, an IP packet containing remote control code of recording instructions is transmitted from the TV receiver 250 to the set top box 310 and the disk recorder 210 via a high-speed data line (bi-directional communication path) and streaming data (compressed video and audio data) of predetermined video content is supplied from the set top box 310 through the TV receiver 250 to the disk recorder 210 before being recorded only by operating, for example, a record button of the remote control transmitting unit 277. Thus, a user's operation when recording video content being viewed is made easier.

Also in the AV system 200 shown in FIG. 1, streaming data (compressed video and audio data) from the set top box 310 received by the high-speed data line interface 254A of the TV receiver 250 via a high-speed data line (bi-directional communication path) is directly supplied to the high-speed data line interface 254B via the path changeover switch 255 as transmission data. Then, the streaming data (compressed video and audio data) from the set top box 310 is transmitted from the high-speed data line interface 254B to the disk recorder 210 via a high-speed data line (bi-directional communication path). Thus, processing of decryption and recoding on the streaming data (compressed video and audio data) in the TV receiver 250 is made unnecessary, leading to reduced processing loads.

Also in the AV system 200 shown in FIG. 1, when streaming data (compressed video and audio data) is transmitted from the set top box 310 to the TV receiver 250, a bi-directional communication path including predetermined lines (a reserved line and an HPD line) of the HDMI cable 351 is used so that it is only necessary to connect the set top box 310 and the TV receiver 250 by the HDMI cable 351, which makes connection settings by the user easier.

Similarly, when streaming data (compressed video and audio data) is transmitted from the TV receiver 250 to the disk recorder 210, a bi-directional communication path including predetermined lines (a reserved line and an HPD line) of the HDMI cable 352 is used so that it is only necessary to connect the TV receiver 250 and the disk recorder 210 by the HDMI cable 352, which makes connection settings by the user easier.

Incidentally, the AV system 200 shown in FIG. 1 shows a configuration in which the communication unit (communication path) that performs bi-directional communication includes the reserved line (Ether− line) and the HPD line (Ether+ line) of the HDMI cable, but the configuration of the communication unit that performs bi-directional communication is not limited to this. Other configuration examples will be described below. In the examples below, the set top box 310 is assumed to be a source device and the TV receiver 250 as a sink device.

Figure 13:
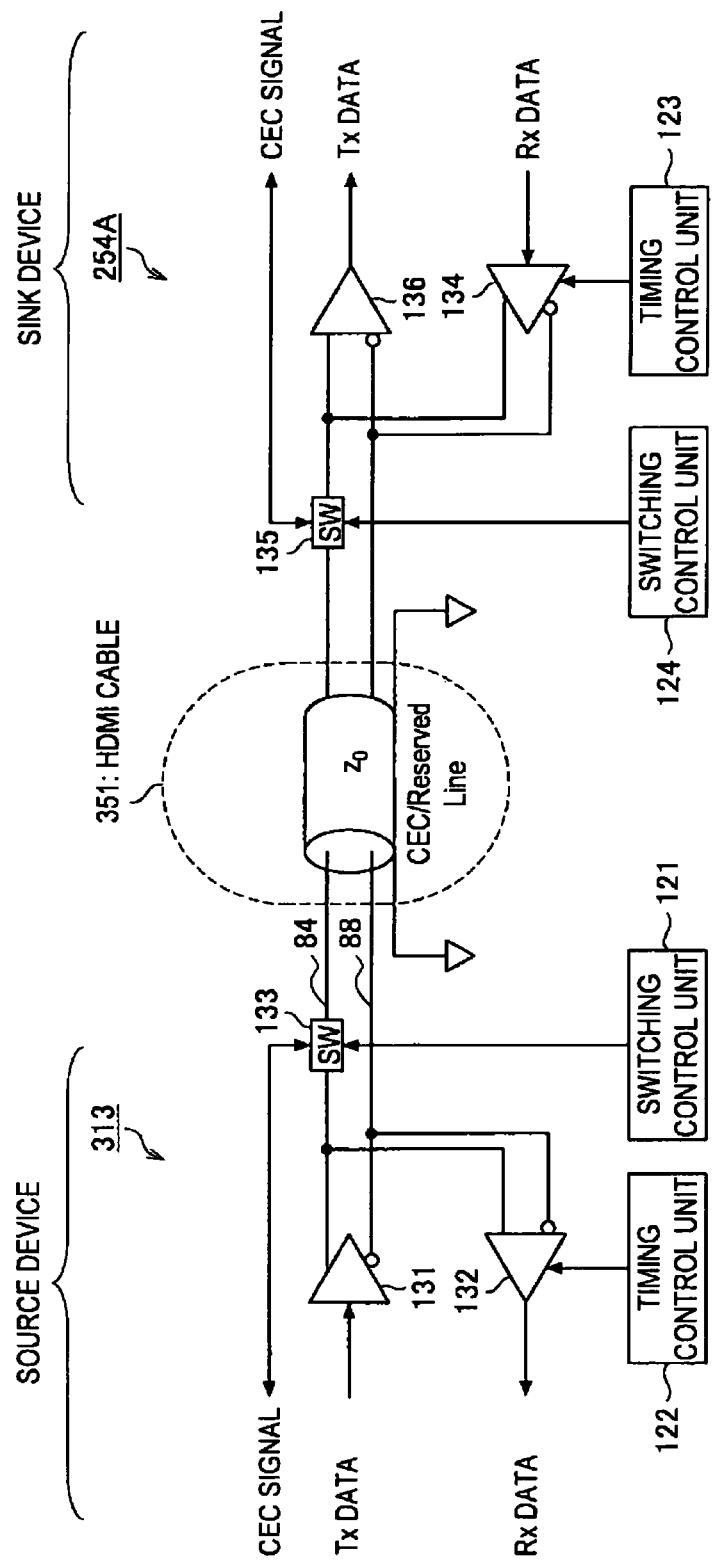
FIG. 13 is a connection diagram showing another configuration example of a high-speed data line interface between the set top box and TV receiver.

FIG. 13 is an example in which half duplex IP communication is performed by using the CEC line 84 and the reserved line 88. In FIG. 13, the same reference numerals are attached to units that correspond to those in FIG. 5 and a description thereof is omitted when relevant.

The high-speed data line interface 313 of the source device has a conversion unit 131, a decryption unit 132, a switch 133, a switching control unit 121, and a timing control unit 122. Tx data, which is data transmitted from the source device to the sink device by bi-directional IP communication between the source device and the sink device, is supplied to the conversion unit 131.

The conversion unit 131 includes, for example, a differential amplifier and converts the supplied Tx data into a differential signal having two partial signals. The conversion unit 131 also transmits the differential signal obtained by conversion to the sink device via the CEC line 84 or the reserved line 88. That is, the conversion unit 131 supplies one partial signal constituting a differential signal obtained by conversion to the switch 133 via the CEC line 84, more specifically, a signal line provided in the source device and connected to the CEC line 84 of the HDMI cable 351 and the other partial signal constituting the differential signal to the sink device via the reserved line 88, more specifically, a signal line provided in the source device and connected to the reserved line 88 of the HDMI cable 351 and the reserved line 88.

The decryption unit 132 includes, for example, a differential amplifier and an input terminal thereof is connected to the CEC line 84 and the reserved line 88. The decryption unit 132 receives a differential signal transmitted from the sink device via the CEC line 84 or the reserved line 88, that is, a differential signal including a partial signal on the CEC line 84 and a partial signal on the reserved line 88 based on control of the timing control unit 122 and decrypts the differential signal into Rx data, which is original data and is output. Here, the Rx data is data transmitted from the sink device to the source device by bi-directional IP communication between the source device and the sink device.

A CEC signal from the control unit (CPU) of the source device or a partial signal constituting a differential signal corresponding to Tx data from the conversion unit 131 is supplied to the switch 133 in the timing when data is transmitted and a CEC signal from the sink device or a partial signal constituting a differential signal corresponding to Rx data from the sink device is supplied to the switch 133 in the timing when data is received. The switch 133 selects and outputs the CEC signal from the control unit (CPU), the CEC signal from the sink device, the partial signal constituting a differential signal corresponding to Tx data, or the partial signal constituting a differential signal corresponding to Rx data based on control from the switching control unit 121.

That is, the switch 133 selects one of a CEC signal supplied from the control unit (CPU) and partial signals supplied by the conversion unit 131 and transmits the selected CEC signal or partial signal to the sink device via the CEC line 84 in the timing when the source device transmits data to the sink device.

The switch 133 also receives a CEC signal transmitted from the sink device via the CEC line 84 or a partial signal of a differential signal corresponding to Rx data and supplies the received CEC signal or partial signal to the control unit (CPU) or the decryption unit 132 in the timing when the source device receives data transmitted from the sink device.

The switching control unit 121 controls the switch 133 to change the switch 133 so that one of signals supplied to the switch 133 is selected. The timing control unit 122 controls the timing when a differential signal is received by the decryption unit 132.

The high-speed data line interface 254A of the sink device has a conversion unit 134, a decryption unit 136, a switch 135, a switching control unit 124, and a timing control unit 123. The conversion unit 134 includes, for example, a differential amplifier and Rx data is supplied to the conversion unit 134. The conversion unit 134 converts the supplied Rx data into a differential signal having two partial signals and transmits the differential signal obtained by conversion via the CEC line 84 or the reserved line 88 based on control of the timing control unit 123.

That is, the conversion unit 134 supplies one partial signal constituting a differential signal obtained by conversion to the switch 135 via the CEC line 84, more specifically, a signal line provided in the sink device and connected to the CEC line 84 of the HDMI cable 351 and the other partial signal constituting the differential signal to the source device via the reserved line 88, more specifically, a signal line provided in the sink device and connected to the reserved line 88 of the HDMI cable 351 and the reserved line 88.

A CEC signal from the source device or a partial signal constituting a differential signal corresponding to Tx data from source device is supplied to the switch 135 in the timing when data is received and a partial signal constituting a differential signal corresponding to Rx data from the conversion unit 134 or a CEC signal from the control unit (CPU) of the sink device is supplied to the switch 135 in the timing when data is transmitted. The switch 135 selects and outputs the CEC signal from the source device, the CEC signal from the control unit (CPU), the partial signal constituting a differential signal corresponding to Tx data, or the partial signal constituting the differential signal corresponding to Rx data based on control from the switching control unit 124.

That is, the switch 135 selects one of a CEC signal supplied from the control unit (CPU) of the sink device and partial signals supplied by the conversion unit 134 and transmits the selected CEC signal or partial signal to the source device via the CEC line 84 in the timing when the sink device transmits data to the source device.

The switch 135 also receives a CEC signal transmitted from the source device via the CEC line 84 or a partial signal of a differential signal corresponding to Tx data and supplies the received CEC signal or partial signal to the control unit (CPU) or the decryption unit 136 in the timing when the sink device receives data transmitted from the source device.

The decryption unit 136 includes, for example, a differential amplifier and an input terminal thereof is connected to the CEC line 84 and the reserved line 88. The decryption unit 136 receives a differential signal transmitted from the source device via the CEC line 84 or the reserved line 88, that is, a differential signal including a partial signal on the CEC line 84 and a partial signal on the reserved line 88 and decrypts the differential signal into Tx data, which is original data and is output.

The switching control unit 124 controls the switch 135 to change the switch 135 so that one of signals supplied to the switch 135 is selected. The timing control unit 123 controls the timing when a differential signal is transmitted by the conversion unit 134.

Figure 14:
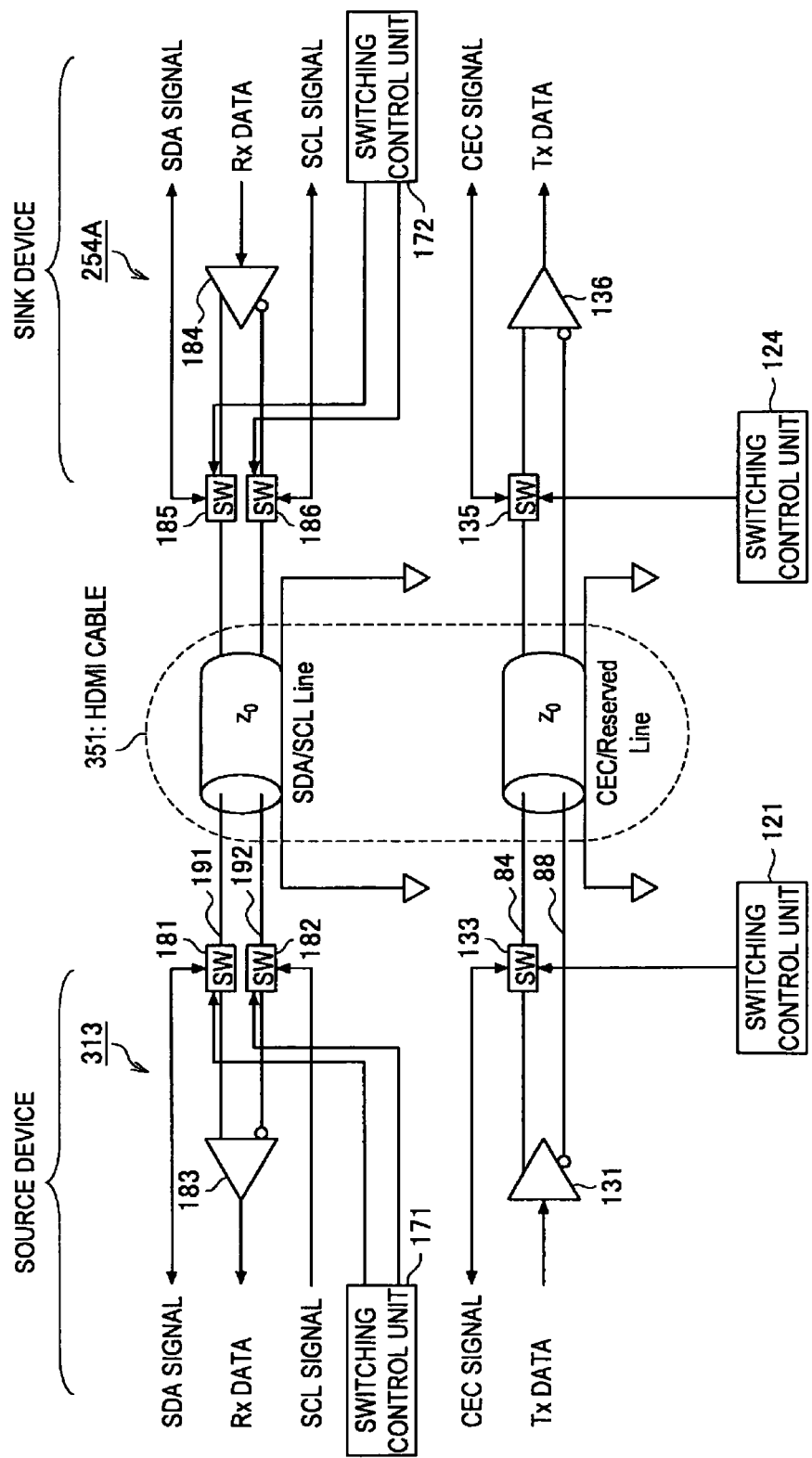
FIG. 14 is a connection diagram showing still another configuration example of a high-speed data line interface between the set top box and TV receiver.

FIG. 14 is an example in which full duplex IP communication is performed by using the CEC line 84, the reserved line 88, a signal line (SDA line) through which an SDA signal is transmitted, and a signal line (SCL line) through which an SCL signal is transmitted. In FIG. 14, the same reference numerals are attached to units that correspond to those in FIG. 13 and a description thereof is omitted when relevant.

The high-speed data line interface 313 of the source device has the conversion unit 131, the switch 133, a switch 181, a switch 182, a decryption unit 183, the switching control unit 121, and a switching control unit 171.

An SDA signal from the control unit (CPU) of the source device is supplied to the switch 181 in the timing when data is transmitted and an SDA signal from the sink device or a partial signal constituting a differential signal corresponding to Rx data from the sink device is supplied to the switch 181 in the timing when data is received. The switch 181 selects and outputs the SDA signal from the control unit (CPU), the SDA signal from the sink device, or the partial signal constituting a differential signal corresponding to Rx data based on control from the switching control unit 171.

That is, the switch 181 receives an SDA signal or a partial signal of a differential signal corresponding to Rx data transmitted from the sink device via the SDA line 191, which is a signal line through which an SDA signal is transmitted, and supplies the received SDA signal or partial signal to the control unit (CPU) or the decryption unit 183 in the timing when the source device receives data transmitted from the sink device.

The switch 181 also transmits an SDA signal supplied from the control unit (CPU) to the sink device via the SDA line 191 or transmits nothing to the sink device in the timing when the source device transmits data to the sink device.

An SCL signal from the control unit (CPU) of the source device is supplied to the switch 182 in the timing when data is transmitted and a partial signal constituting a differential signal corresponding to Rx data from the sink device is supplied to the switch 182 in the timing when data is received. The switch 182 selects and outputs the SCL signal or a partial signal constituting a differential signal corresponding to Rx data based on control from the switching control unit 171.

That is, the switch 182 receives a partial signal of a differential signal corresponding to Rx data transmitted from the sink device via the SCL line 192, which is a signal line through which an SCL signal is transmitted, and supplies the received partial signal to the decryption unit 183 or receives nothing in the timing when the source device receives data transmitted from the sink device.

The switch 182 also transmits an SCL signal supplied from the control unit (CPU) to the sink device via the SCL line 192 or transmits nothing in the timing when the source device transmits data to the sink device.

The decryption unit 183 includes, for example, a differential amplifier and an input terminal thereof is connected to the SDA line 191 and the SCL line 192. The decryption unit 183 receives a differential signal transmitted from the sink device via the SDA line 191 and the SCL line 192, that is, a differential signal including a partial signal on the SDA line 191 and a partial signal on the SCL line 192 and decrypts the differential signal into Rx data, which is original data and is output.

The switching control unit 171 controls the switch 181 and the switch 182 to change the switch 181 and the switch 182 so that one of signals supplied to each of the switch 181 and the switch 182 is selected.

The high-speed data line interface 254A constituting the sink device has a conversion unit 184, the switch 135, a switch 185, a switch 186, the decryption unit 136, a switching control unit 172, and the switching control unit 124.

The conversion unit 184 includes, for example, a differential amplifier and has Rx data supplied thereto. The conversion unit 184 converts the supplied Rx data into a differential signal having two partial signals and transmits the differential signal obtained by conversion to the source device via the SDA line 191 or the SCL line 192. That is, the conversion unit 184 transmits one partial signal constituting a differential signal obtained by conversion to the source device via the switch 185 and the other partial signal constituting the differential signal to the source device via the switch 186.

A partial signal constituting a differential signal corresponding to Rx data from the conversion unit 184 or an SDA signal from the control unit (CPU) of the sink device is supplied to the switch 185 in the timing when data is transmitted and an SDA signal from the source device is supplied to the switch 185 in the timing when data is received. The switch 185 selects and outputs the SDA signal from the control unit (CPU), the SDA signal from the source device, the partial signal constituting a differential signal corresponding to Tx data, or the partial signal constituting a differential signal corresponding to Rx data based on control from the switching control unit 172.

That is, the switch 185 receives an SDA signal transmitted from the source device via the SDA line 191 and supplies the received SDA signal to the control unit (CPU) or receives nothing in the timing when the sink device receives data transmitted from the source device.

The switch 185 also transmits an SDA signal supplied from the control unit (CPU) or a partial signal supplied by the conversion unit 184 to the source device via the SDA line 191 in the timing when the sink device transmits data to the source device.

A partial signal constituting a differential signal corresponding to Rx data from the conversion unit 184 is supplied to the switch 186 in the timing when data is transmitted and an SCL signal from the source device is supplied to the switch 186 in the timing when data is received. The switch 186 selects and outputs the partial signal constituting a differential signal corresponding to Rx data or the SCL signal based on control from the switching control unit 172.

That is, the switch 186 receives an SCL signal transmitted from the source device via the SCL line 192 and supplies the received SCL signal to the control unit (CPU) or receives nothing in the timing when the sink device receives data transmitted from the source device.

The switch 186 also transmits a partial signal supplied by the conversion unit 184 to the source device via the SCL line 192 or transmits nothing in the timing when the sink device transmits data to the source device.

The switching control unit 172 controls the switch 185 and the switch 186 to change the switch 185 and the switch 186 so that one of signals supplied to each of the switch 185 and the switch 186 is selected.

When a source device and a sink device perform IP communication, whether half duplex communication or full duplex communication can be performed is determined by the configuration of each of the source device and the sink device. Thus, the source device refers to E-EDID received from the sink device to determine whether to perform half duplex communication, full duplex communication, or bi-directional communication by exchange of a CEC signal.

Figure 15:
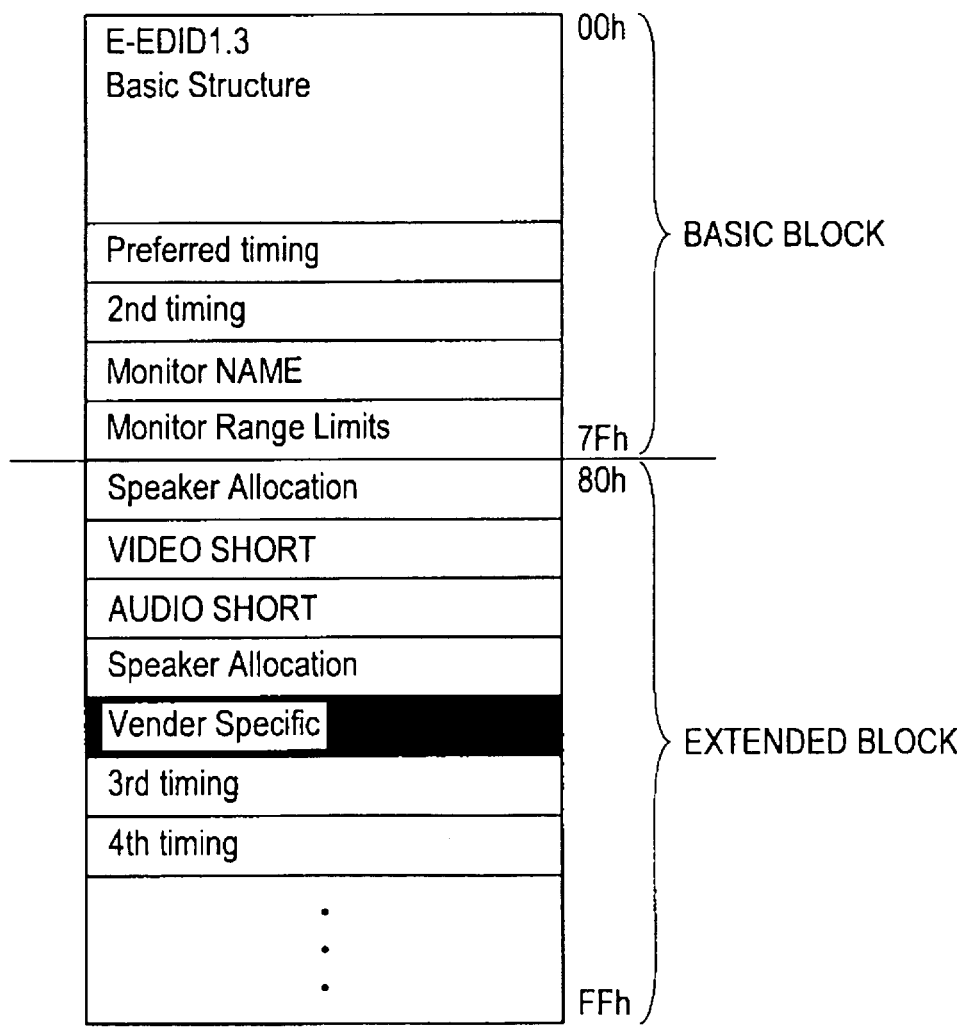
FIG. 15 is a diagram showing the structure of E-EDID received by the source device.

The E-EDID received by the source device has, as shown, for example, in FIG. 15, a basic block and an extended block.

Data as denoted by "E-EDID 1.3 Basic Structure" and specified by the E-EDID 1.3 standard is arranged at the head of the basic block of E-EDID and subsequently, timing information as denoted by "Preferred timing" to maintain compatibility with conventional EDID and timing information as denoted by "2nd timing" that is different from "Preferred timing" to maintain compatibility with conventional EDID are arranged.

Subsequent to "2nd timing" in the basic block, information indicating the name of a display apparatus as denoted by "Monitor NAME" and information indicating the numbers of pixels that can be displayed when the aspect ratio is 4:3 or 16:9 as denoted by "Monitor Range Limits" are arranged in turn.

On the other hand, information about right and left speakers as denoted by "Speaker Allocation" is arranged at the head of the extended block and subsequently, data describing displayable image sizes, frame rates, information indicating whether interlaced or progressive, and information such as the aspect ratio as denoted by "VIDEO SHORT", data describing reproducible audio codec methods, sampling frequencies, cutoff bands, and the number of codec bits as denoted by "AUDIO SHORT", and information about right and left speakers as denoted by "Speaker Allocation" are arranged in turn.

Subsequent to "Speaker Allocation" in the extended block, data specifically defined for each manufacturer as denoted by "Vendor Specific", timing information as denoted by "3rd timing" to maintain compatibility with conventional EDID and timing information as denoted by "4th timing" to maintain compatibility with conventional EDID are arranged.

Further, data as denoted by "Vendor Specific" has a data structure shown in FIG. 16. That is, data as denoted by "Vendor Specific" is provided with 1-byte blocks ranging from the 0-th block to the N-th block.

In the 0-th block arranged at the head of data as denoted by "Vendor Specific", the header indicating a data area of "Vendor Specific" data as denoted by "Vendor-Specific tag code (=3)" and information indicating the length of the "Vendor Specific" data as denoted by "Length (=N)" are arranged.

In the 1st block to the 3rd block, information indicating the number "0x000C03" as denoted by "24 bit IEEE Registration Identifier (0x000C03) LSB first" and registered for HDMI (R) is arranged. Further, in the 4th block and the 5th block, information indicating 24 bit physical addresses of sink devices denoted each as "A", "B", "C", and "D" is arranged.

In the 6th block, a flag indicating functions supported by the sink devices as denoted by "Supports-AI", information specifying the numbers of bits per pixel denoted each as "DC-48 bit", "DC-36 bit", and "DC-30 bit", a flag indicating whether the sink device supports transmission of images of Y:Cb:Cr=4:4:4 as denoted by "DC-Y444", and a flag indicating whether the sink device supports the dual DVI (Digital Visual Interface) as denoted by "DVI-Dual" are arranged.

In the 7th block, information indicating the maximum frequency of the pixel clock of TMDS as denoted by "Max-TMDS-Clock" is arranged. Further, in the 8th block, a flag indicating presence/absence of delay information of video and audio as denoted by "Latency", a full duplex flag indicating whether full duplex communication can be performed as denoted by "Full Duplex", and a half duplex flag indicating whether half duplex communication can be performed as denoted by "Half Duplex" are arranged.

For example, the set full duplex flag (for example, set to "1") indicates that the sink device has a function to perform full duplex communication, that is, has a configuration shown in FIG. 14 and the reset full duplex flag (for example, set to "0") indicates that the sink device has no function to perform full duplex communication.

Similarly, the set half duplex flag (for example, set to "1") indicates that the sink device has a function to perform half duplex communication, that is, has a configuration shown in FIG. 13 and the reset half duplex flag (for example, set to "0") indicates that the sink device has no function to perform half duplex communication.

In the 9th block of data as denoted by "Vendor Specific", delay time data of progressive video as denoted by "Video Latency" is arranged and in the 10th block, delay time data of audio accompanying the progressive video as denoted by "Audio Latency" is arranged. Further, in the 11th block, delay time data of interlaced video as denoted by "Interlaced Video Latency" is arranged and in the 12th block, delay time data of audio accompanying the interlaced video as denoted by "Interlaced Audio Latency" is arranged.

The source device determines whether to perform half duplex communication, full duplex communication, or bi-directional communication by exchange of a CEC signal based on the full duplex flag and half duplex flag contained in E-EDID received from the sink device and performs, based on the determination result thereof, bi-directional communication with the sink device.

If, for example, the source device has a configuration shown in FIG. 13, the source device can perform half duplex communication with the sink device shown in FIG. 13, but it is difficult for the source device to perform half duplex communication with the sink device shown in FIG. 14. Thus, when the source device is turned on, the source device starts communication processing and performs bi-directional communication in accordance with the function held by the sink device connected to the source device.

Figure 17:
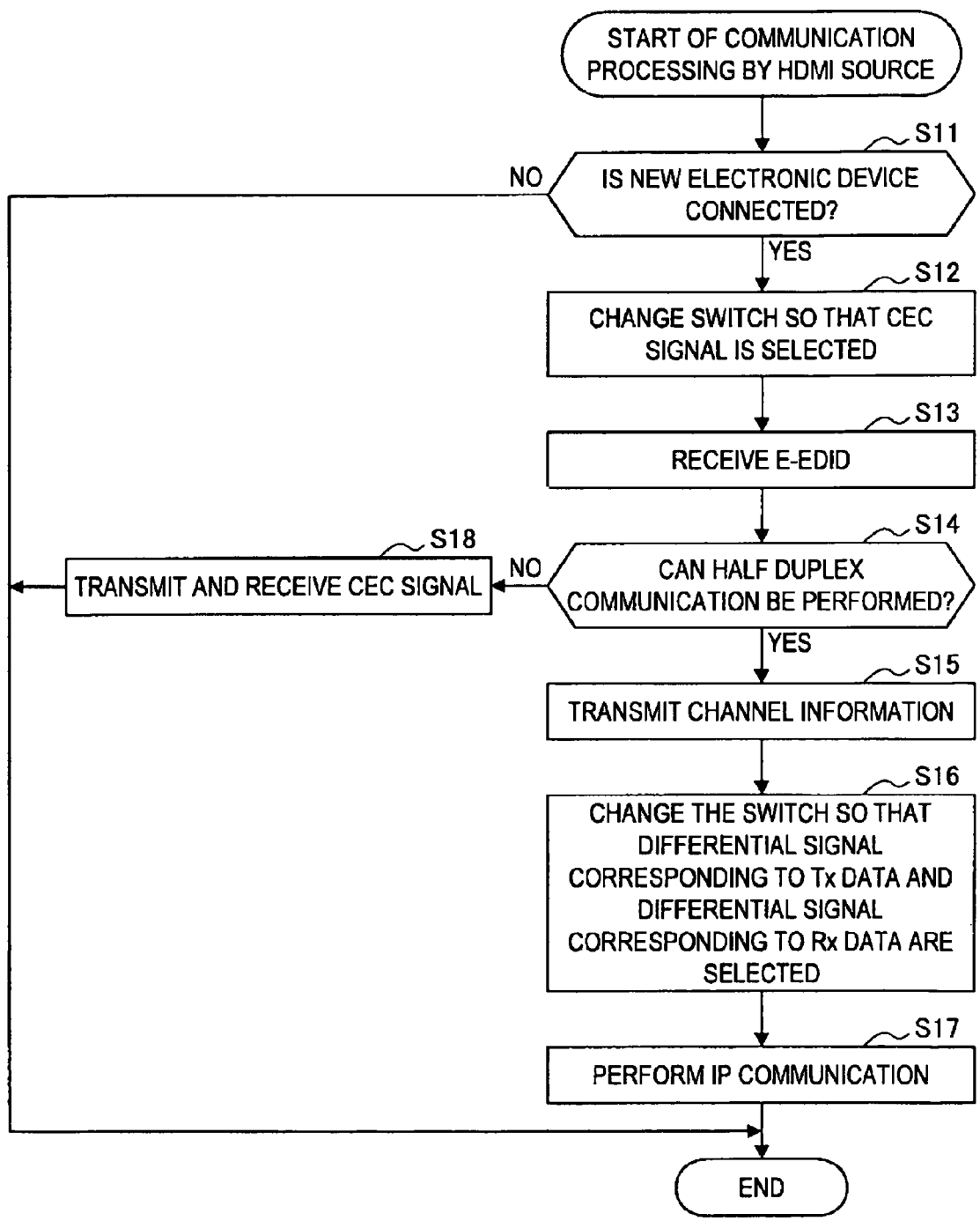
FIG. 17 is a flow chart illustrating communication processing by the source device.

Communication processing by the source device shown in FIG. 13 will be described below with reference to the flow chart in FIG. 17.

At step S11, the source device determines whether a new electronic device has been connected to the source device. For example, the source device determines whether a new electronic device (sink device) has been connected based on the magnitude of voltage applied to a pin called Hot Plug Detect to which the HPD line 86 is connected.

If a determination is made at step S11 that no new electronic device has been connected, no communication will be performed and thus, communication processing terminates. On the other hand, if a determination is made at step S11 that a new electronic device has been connected, the switching control unit 121 controls the switch 133 at step S12 to change the switch 133 so that a CEC signal from the control unit (CPU) of the source device is selected during transmission of data and a CEC signal from the sink device is selected during reception of data.

At step S13, the source device receives E-EDID transmitted from the sink device via the DDC 83. That is, if the sink device detects connection with the source device, the sink device reads E-EDID from the EDID ROM 85 and transmits the read E-EDID to the source device via the DDC 83 and thus, the source device receives the E-EDID transmitted from the sink device.

At step S14, the source device determines whether half duplex communication can be performed with the sink device. That is, the source device refers to the E-EDID received from the sink device to determine whether the half duplex flag "Half Duplex" flag in FIG. 16 is set. If, for example, the half duplex flag is set, the source device determines that half duplex bi-directional IP communication, that is, half duplex communication can be performed.

If a determination is made at step S14 that half duplex communication can be performed, at step S15, the source device transmits, as channel information indicating the channel used for bi-directional communication, a signal indicating that half duplex IP communication using the CEC line 84 and the reserved line 88 will be performed to the sink device via the switch 133 and the CEC line 84.

That is, if the half duplex flag is set, the source device knows that the sink device has the configuration shown in FIG. 13 and half duplex communication using the CEC line 84 and the reserved line 88 can be performed and therefore, the source device makes a notification that half duplex communication will be performed by transmitting the channel information to the sink device.

At step S16, the switching control unit 121 controls the switch 133 to change the switch 133 so that a differential signal corresponding to Tx data from the conversion unit 131 is selected during transmission of data and a differential signal corresponding to Rx data from the sink device is selected during reception of data.

At step S17, each unit of the source device performs half duplex bi-directional IP communication with the sink device before terminating communication processing. That is, when data is transmitted, the conversion unit 131 converts Tx data supplied from the control unit (CPU) into a differential signal to supply one partial signal constituting the differential signal obtained by conversion to the switch 133 and to transmit the other partial signal to the sink device via the reserved line 88. The switch 133 transmits the partial signal supplied from the conversion unit 131 to the sink device via the CEC line 84. Accordingly, the differential signal corresponding to the Tx data is transmitted from the source device to the sink device.

When data is received, the decryption unit 132 receives a differential signal corresponding to Rx data transmitted from the sink device. That is, the switch 133 receives a partial signal of a differential signal corresponding to the Rx data transmitted from the sink device via the CEC line 84 and supplies the received partial signal to the decryption unit 132. The decryption unit 132 decrypts the differential signal constituted by the partial signal supplied from the switch 133 and the differential signal supplied from the sink device via the reserved line 88 based on control of the timing control unit 122 into Rx data, which is original data and is output to the control unit (CPU).

Accordingly, the source device exchanges various kinds of data such as control data, pixel data, and audio data with the sink device.

If a determination is made at step S14 that it is difficult to perform half duplex communication, at step S18, the source device performs bi-directional communication with the sink device by transmitting/receiving a CEC signal before terminating communication processing.

That is, control data is exchanged with the sink device by transmitting a CEC signal from the source device to the sink device via the switch 133 and the CEC line 84 when data is transmitted and by receiving a CEC signal transmitted to the source device from the sink device via the switch 133 and the CEC line 84 when data is received.

In this manner, the source device refers to the half duplex flag and then performs half duplex communication with a sink device capable of performing half duplex communication by using the CEC line 84 and the reserved line 88.

Thus, high-speed bi-directional communication can be performed while maintaining compatibility with conventional HDMI by selecting data to be transmitted and data to be received by changing the switch 133 and performing half duplex communication, that is, half duplex IP communication with the sink device by using the CEC line 84 and the reserved line.

Like the source device, the sink device also starts communication processing when turned on to perform bi-directional communication with the source device.

Figure 18:
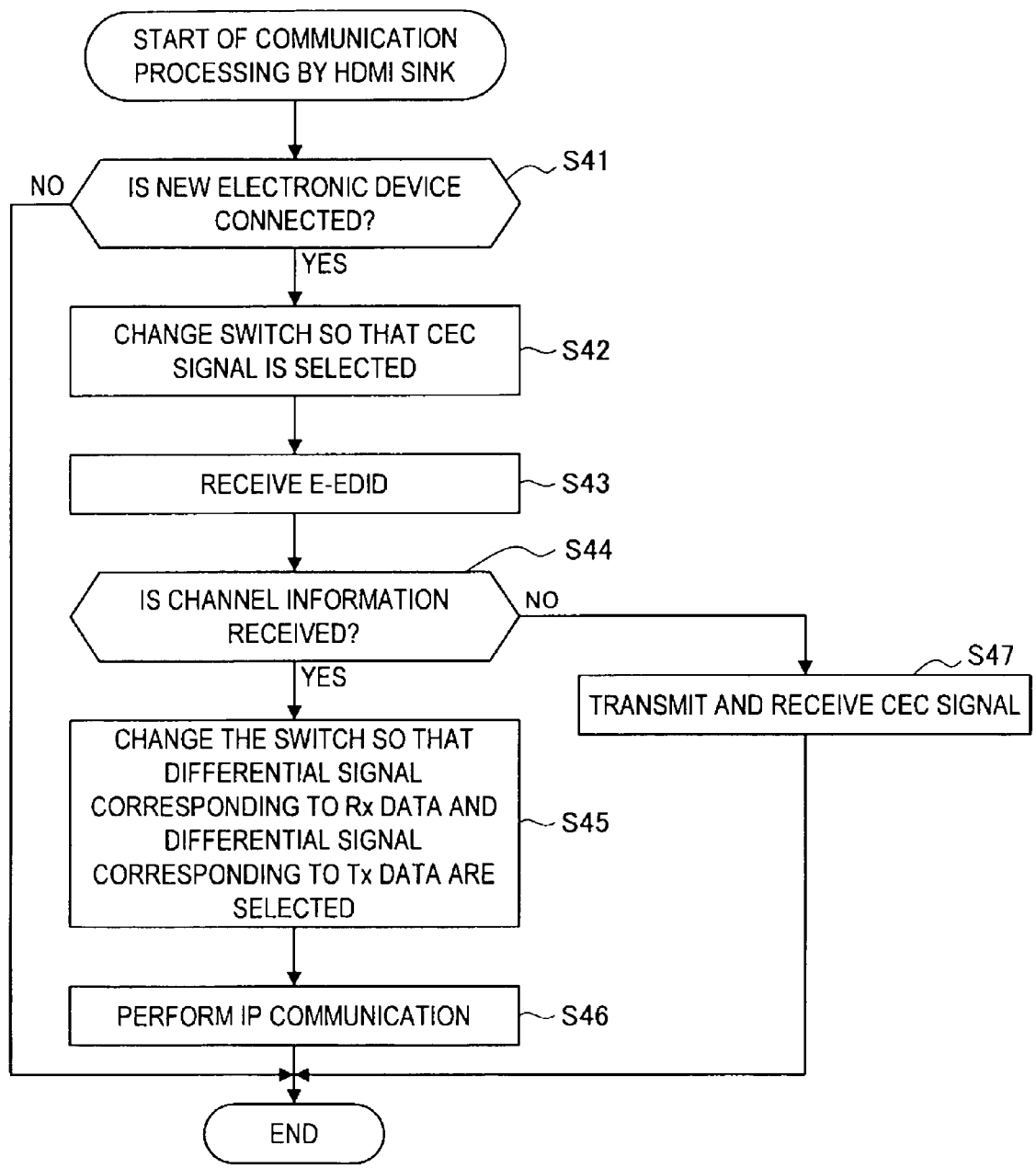
FIG. 18 is a flow chart illustrating communication processing by the sink device.

Communication processing by the sink device shown in FIG. 13 will be described below with reference to the flow chart in FIG. 18.

At step S41, the sink device determines whether a new electronic device (source device) has been connected to the sink device. For example, the sink device determines whether a new electronic device has been connected based on the magnitude of voltage applied to the pin called Hot Plug Detect to which the HPD line 86 is connected.

If a determination is made at step S41 that no new electronic device has been connected, no communication will be performed and thus, communication processing terminates. On the other hand, if a determination is made at step S41 that a new electronic device has been connected, the switching control unit 124 controls the switch 135 at step S42 to change the switch 135 so that a CEC signal from the control unit (CPU) of the sink device is selected during transmission of data and a CEC signal from the source device is selected during reception of data.

At step S43, the sink device reads E-EDID from the EDID ROM 85 and transmits the read E-EDID to the source device via the DDC 83.

At step S44, the sink device determines whether channel information transmitted from the source device has been received.

That is, channel information indicating the channel for bi-directional communication in accordance with functions held by the source device and the sink device is transmitted from the source device. If, for example, the source device has a configuration as shown in FIG. 13, the source device and the sink device can perform half duplex communication using the CEC line 84 and the reserved line 88. Thus, channel information indicating that IP communication using the CEC line 84 and the reserved line 88 will be performed is transmitted from the source device to the sink device. The sink device receives the channel information transmitted from the source device via the switch 135 and the CEC line 84 and determines that the channel information has been received.

On the other hand, if the source device does not have a function to perform half duplex communication, no channel information is transmitted from the source device to the sink device and thus, the sink device determines that no channel information has been received.

If a determination is made at step S44 that channel information has been received, processing advances to step S45 and the switching control unit 124 controls the switch 135 to change the switch 135 so that a differential signal corresponding to Rx data from the conversion unit 134 is selected during transmission of data and a differential signal corresponding to Tx data from the source device is selected during reception of data.

At step S46, the sink device performs half duplex bi-directional IP communication with the source device before terminating communication processing. That is, when data is transmitted, the conversion unit 134 converts Rx data supplied from the control unit (CPU) of the sink device into a differential signal to supply one partial signal constituting the differential signal obtained by conversion to the switch 135 and to transmit the other partial signal to the source device via the reserved line 88 based on control of the timing control unit 123. The switch 135 transmits the partial signal supplied from the conversion unit 134 to the source device via the CEC line 84. Accordingly, the differential signal corresponding to the Rx data is transmitted from the sink device to the source device.

When data is received, the decryption unit 136 receives a differential signal transmitted from the source device and corresponding to Tx data. That is, the switch 135 receives a partial signal of a differential signal corresponding to the Tx data transmitted from the source device via the CEC line 84 and supplies the received partial signal to the decryption unit 136. The decryption unit 136 decrypts the differential signal constituted by the partial signal supplied from the switch 135 and the partial signal supplied from the source device via the reserved line 88 into Tx data, which is original data and is output to the control unit (CPU).

Accordingly, the sink device exchanges various kinds of data such as control data, pixel data, and audio data with the source device.

If a determination is made at step S44 that no channel information has been received, at step S47, the sink device performs bi-directional communication with the source device by transmitting/receiving a CEC signal before terminating communication processing.

That is, control data is exchanged with the source device by transmitting a CEC signal from the sink device to the source device via the switch 135 and the CEC line 84 when data is transmitted and by receiving a CEC signal transmitted to the sink device from the source device via the switch 135 and the CEC line 84 when data is received.

When the sink device receives channel information in this manner, the sink device performs half duplex communication with the source device by using the CEC line 84 and the reserved line 88.

Thus, high-speed bi-directional communication can be performed while maintaining compatibility with conventional HDMI by data to be transmitted and data to be received being selected by the sink device by changing the switch 135 and half duplex communication using the CEC line 84 and the reserved line 88 being performed with the source device.

If the source device has a configuration shown in FIG. 14, the source device determines whether the sink device has a function to perform full duplex communication based on the full duplex flag contained E-EDID in communication processing and performs bi-directional communication in accordance with the determination result thereof.

Figure 19:
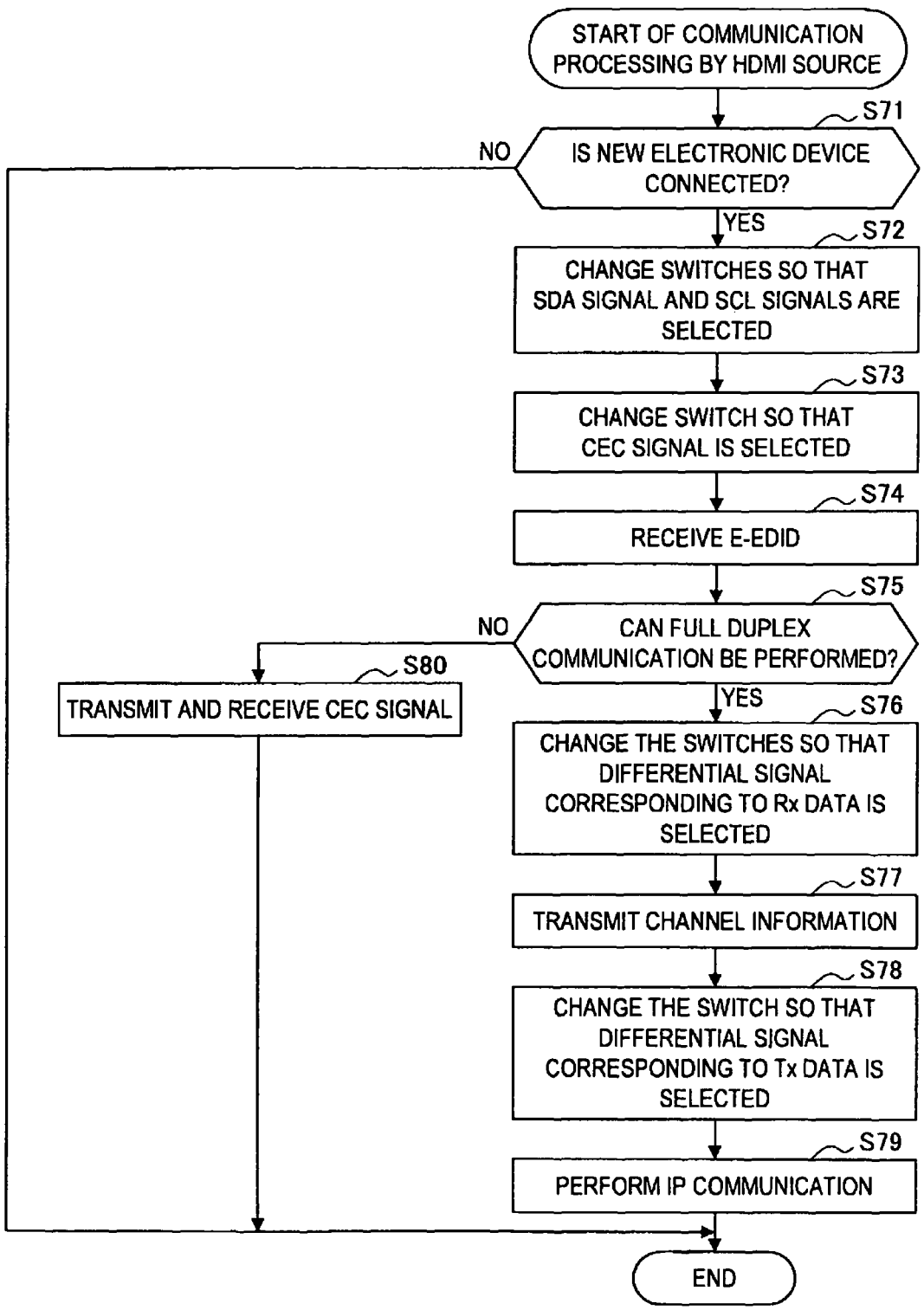
FIG. 19 is a flow chart illustrating communication processing by the source device.

Communication processing by the source device shown in FIG. 14 will be described below with reference to the flow chart in FIG. 19.

At step S71, the source device determines whether a new electronic device has been connected to the source device. If a determination is made at step S71 that no new electronic device has been connected, no communication will be performed and thus, communication processing terminates.

On the other hand, if a determination is made at step S71 that a new electronic device has been connected, the switching control unit 171 controls the switch 181 and the switch 182 at step S72 to change the switch 181 and the switch 182 so that an SDA signal from the control unit (CPU) of the source device is selected by the switch 181 and an SCL signal from the control unit (CPU) of the source device is selected by the switch 182 during transmission of data and further, an SDA signal from the sink device is selected by the switch 181 during reception of data.

At step S73, the switching control unit 121 controls the switch 133 to change the switch 133 so that a CEC signal from the control unit (CPU) of the source device is selected during transmission of data and a CEC signal from the sink device is selected during reception of data.

At step S74, the source device receives E-EDID transmitted from the sink device via the SDA line 191 of the DDC 83. That is, if the sink device detects connection with the source device, the sink device reads E-EDID from the EDID ROM 85 and transmits the read E-EDID to the source device via the SDA line 191 of the DDC 83 and thus, the source device receives the E-EDID transmitted from the sink device.

At step S75, the source device determines whether full duplex communication can be performed with the sink device. That is, the source device refers to the E-EDID received from the sink device to determine whether the full duplex flag "Full Duplex" flag in FIG. 16 is set. If, for example, the full duplex flag is set, the source device determines that full duplex bi-directional IP communication, that is, full duplex communication can be performed.

If a determination is made at step S75 that full duplex communication can be performed, the switching control unit 171 controls the switch 181 and the switch 182 at step S76 to change the switch 181 and the switch 182 so that a differential signal corresponding to Rx data from the sink device is selected when data is received.

That is, the switching control unit 171 changes the switch 181 and the switch 182 so that, of partial signals constituting a differential signal corresponding to Rx data transmitted from the sink device during reception of data, a partial signal transmitted via the SDA line 191 is selected by the switch 181 and a partial signal transmitted via the SCL line 192 is selected by the switch 182.

Since the SDA line 191 and the SCL line 192 constituting the DDC 83 will not be used, that is, an SDA signal or SCL signal will not be transmitted/received via the SDA line 191 or the SCL line 192 after E-EDID is transmitted from the sink device to the source device, the switch 181 and the switch 182 can be changed to use the SDA line 191 and the SCL line 192 as transmission paths of Rx data for full duplex communication.

At step S77, the source device transmits, as channel information indicating the channel used for bi-directional communication, a signal indicating that full duplex IP communication using the CEC line 84, the reserved line 88, the SDA line 191, and the SCL line 192 will be performed to the sink device via the switch 133 and the CEC line 84.

That is, if the full duplex flag is set, the source device knows that the sink device has the configuration shown in FIG. 14 and full duplex communication using the CEC line 84, the reserved line 88, the SDA line 191, and the SCL line 192 can be performed and therefore, the source device makes a notification that full duplex communication will be performed by transmitting the channel information to the sink device.

At step S78, the switching control unit 121 controls the switch 133 to change the switch 133 so that a differential signal corresponding to Tx data from the conversion unit 131 is selected during transmission of data. That is, the switching control unit 121 changes the switch 133 so that a partial signal of a differential signal corresponding to Tx data and supplied from the conversion unit 131 to the switch 133 is selected.

At step S79, the source device performs full duplex bi-directional IP communication with the sink device before terminating communication processing. That is, when data is transmitted, the conversion unit 131 converts Tx data supplied from the control unit (CPU) of the source device into a differential signal to supply one partial signal constituting the differential signal obtained by conversion to the switch 133 and to transmit the other partial signal to the sink device via the reserved line 88. The switch 133 transmits the partial signal supplied from the conversion unit 131 to the sink device via the CEC line 84. Accordingly, the differential signal corresponding to the Tx data is transmitted from the source device to the sink device.

When data is received, the decryption unit 183 receives a differential signal corresponding to Rx data transmitted from the sink device. That is, the switch 181 receives a partial signal of a differential signal corresponding to the Rx data transmitted from the sink device via the SDA line 191 and supplies the received partial signal to the decryption unit 183. The switch 182 receives the other partial signal of the differential signal corresponding to the Rx data transmitted from the sink device via the SCL line 192 and supplies the received partial signal to the decryption unit 183. The decryption unit 183 decrypts the differential signal constituted by the partial signals supplied from the switch 181 and the switch 182 into Rx data, which is original data and is output to the control unit (CPU).

Accordingly, the source device exchanges various kinds of data such as control data, pixel data, and audio data with the sink device.

If a determination is made at step S75 that it is difficult to perform full duplex communication, at step S80, the source device performs bi-directional communication with the sink device by transmitting/receiving a CEC signal before terminating communication processing.

That is, control data is exchanged with the sink device by transmitting a CEC signal from the source device to the sink device via the switch 133 and the CEC line 84 when data is transmitted and by receiving a CEC signal transmitted to the source device from the sink device via the switch 133 and the CEC line 84 when data is received.

In this manner, the source device refers to the full duplex flag and then performs full duplex communication with a sink device capable of performing full duplex communication by using the CEC line 84, the reserved line 88, the SDA line 191, and the SCL line 192.

Thus, high-speed bi-directional communication can be performed while maintaining compatibility with conventional HDMI by selecting data to be transmitted and data to be received by changing the switch 133, the switch 181, and the switch 182 and performing full duplex communication with the sink device by using the CEC line 84, the reserved line 88, the SDA line 191, and the SCL line 192.

When the sink device has the configuration shown in FIG. 14, like the sink device shown in FIG. 13, the sink device performs communication processing to perform bi-directional communication with the source device.

Figure 20:
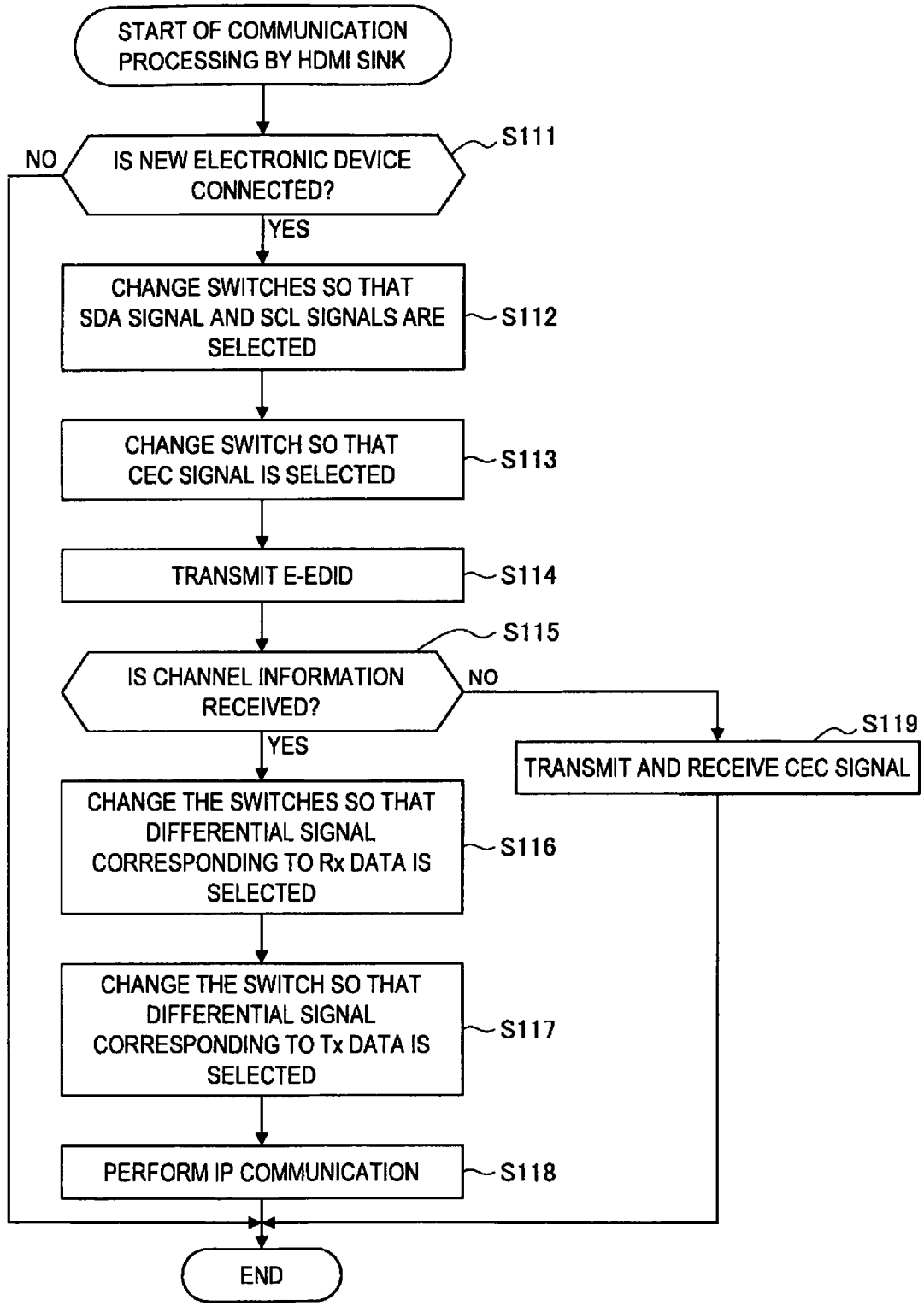
FIG. 20 is a flow chart illustrating communication processing by the sink device.

Communication processing by the sink device shown in FIG. 14 will be described below with reference to the flow chart in FIG. 20.

At step S111, the sink device determines whether a new electronic device (source device) has been connected to the sink device. If a determination is made at step S111 that no new electronic device has been connected, no communication will be performed and thus, communication processing terminates.

On the other hand, if a determination is made at step S111 that a new electronic device has been connected, the switching control unit 172 controls the switch 185 and the switch 186 at step S112 to change the switch 185 and the switch 186 so that an SDA signal from the control unit (CPU) of the sink device is selected by the switch 185 during transmission of data and further, an SDA signal from the source device is selected by the switch 185 and an SCL signal from the source device is selected by the switch 186 during reception of data.

At step S113, the switching control unit 124 controls the switch 135 to change the switch 135 so that a CEC signal from the control unit (CPU) of the sink device is selected during transmission of data and a CEC signal from the source device is selected during reception of data.

At step S114, the sink device reads E-EDID from the EDID ROM 85 and transmits the read E-EDID to the source device via the switch 185 and the SDA line 191 of the DDC 83.

At step S115, the sink device determines whether channel information transmitted from the source device has been received.

That is, channel information indicating the channel for bi-directional communication in accordance with functions held by the source device and the sink device is transmitted from the source device. If, for example, the source device has a configuration as shown in FIG. 14, the source device and the sink device can perform full duplex communication and thus, channel information indicating that full duplex IP communication using the CEC line 84, the reserved line 88, the SDA line 191, and the SCL line 192 will be performed is transmitted from the source device to the sink device. Therefore, the sink device receives the channel information transmitted from the source device via the switch 135 and the CEC line 84 and determines that the channel information has been received.

On the other hand, if the source device does not have a function to perform full duplex communication, no channel information is transmitted from the source device to the sink device and thus, the sink device determines that no channel information has been received.

If a determination is made at step S115 that channel information has been received, processing advances to step S116 and the switching control unit 172 controls the switch 185 and the switch 186 to change the switch 185 and the switch 186 so that a differential signal corresponding to Rx data from the conversion unit 184 is selected during transmission of data.

At step S117, the switching control unit 124 controls the switch 135 to change the switch 135 so that a differential signal corresponding to Tx data from the source device is selected during reception of data.

At step S118, the sink device performs full duplex bi-directional IP communication with the source device before terminating communication processing. That is, when data is transmitted, the conversion unit 184 converts Rx data supplied from the control unit (CPU) of the sink device into a differential signal to supply one partial signal constituting the differential signal obtained by conversion to the switch 185 and to supply the other partial signal to the switch 186. The switch 185 and the switch 186 transmit the partial signals supplied from the conversion unit 184 to the source device via the SDA line 191 and the SCL line 192 respectively. Accordingly, the differential signal corresponding to the Rx data is transmitted from the sink device to the source device.

When data is received, the decryption unit 136 receives a differential signal transmitted from the source device and corresponding to Tx data. That is, the switch 135 receives a partial signal of a differential signal corresponding to the Tx data transmitted from the source device via the CEC line 84 and supplies the received partial signal to the decryption unit 136. The decryption unit 136 decrypts the differential signal constituted by the partial signal supplied from the switch 135 and the partial signal supplied from the source device via the reserved line 88 into Tx data, which is original data and is output to the control unit (CPU).

Accordingly, the sink device exchanges various kinds of data such as control data, pixel data, and audio data with the source device.

If a determination is made at step S115 that no channel information has been received, at step S119, the sink device performs bi-directional communication with the source device by transmitting/receiving a CEC signal before terminating communication processing.

When the sink device receives channel information in this manner, the sink device performs full duplex communication with the source device by using the CEC line 84, the reserved line 88, the SDA line 191, and the SCL line 192.

Thus, high-speed bi-directional communication can be performed while maintaining compatibility with conventional HDMI by data to be transmitted and data to be received being selected by the sink device by changing the switch 135, the switch 185, and the switch 186 and full duplex communication using the CEC line 84, the reserved line 88, the SDA line 191, and the SCL line 192 being performed with the source device.

The example in FIG. 14 shows a configuration in which the conversion unit 131 is connected to the CEC line 84 and the reserved line 88 and the decryption unit 183 is connected to the SDA line 191 and the SCL line 192 in the source device, but a configuration in which the decryption unit 183 is connected to the CEC line 84 and the reserved line 88 and the conversion unit 131 is connected to the SDA line 191 and the SCL line 192 may also be adopted.

In such a case, the switch 181 and the switch 182 are connected to the CEC line 84 and the reserved line 88 and also connected to the decryption unit 183 and the switch 133 is connected to the SDA line 191 and also connected to the conversion unit 131.

Similarly for the sink device in FIG. 14, a configuration in which the conversion unit 184 is connected to the CEC line 84 and the reserved line 88 and the decryption unit 136 is connected to the SDA line 191 and the SCL line 192 may be adopted. In such a case, the switch 185 and the switch 186 are connected to the CEC line 84 and the reserved line 88 and also connected to the conversion unit 184 and the switch 135 is connected to the SDA line 191 and also connected to the decryption unit 136.

Further in FIG. 13, the CEC line 84 and the reserved line 88 may be the SDA line 191 and the SCL line 192. That is, the conversion unit 131 and the decryption unit 132 of the source device and the conversion unit 134 and the decryption unit 136 of the sink device may be connected to the SDA line 191 and the SCL line 192 to allow the source device and sink device to perform half duplex IP communication. Further, in this case, the reserved line 88 may be used to detect connection of an electronic device.

Further, each of the source device and the sink device may have both functions to perform half duplex communication and full duplex communication. In such a case, the source device and the sink device can perform half duplex or full duplex IP communication in accordance with the function held by the connected electronic device.

Figure 21:
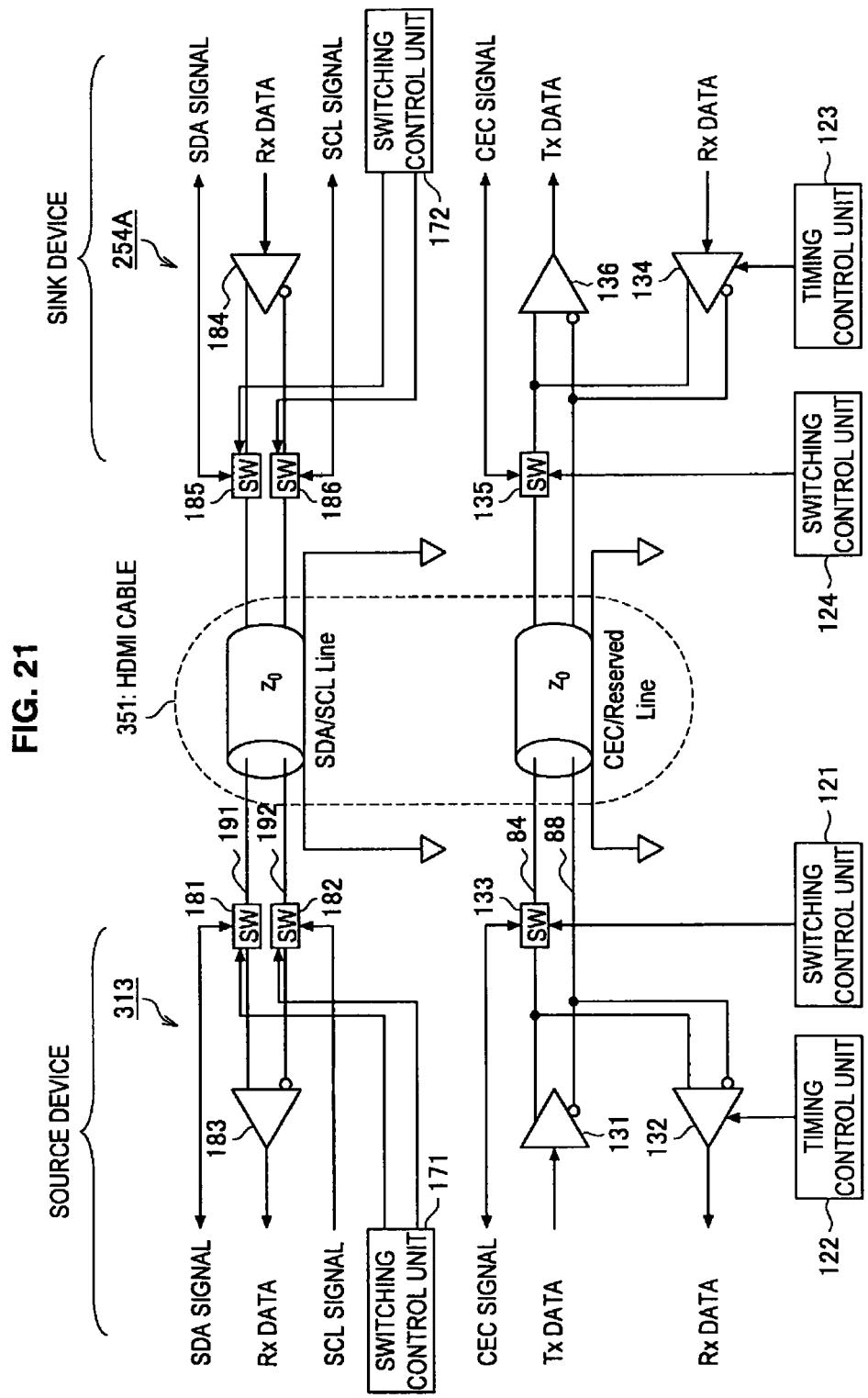
FIG. 21 is a connection diagram showing another configuration example of a high-speed data line interface between the set top box and TV receiver.

If each of the source device and the sink device has both functions to perform half duplex communication and full duplex communication, the source device and the sink device are configured as shown, for example, in FIG. 21. In FIG. 21, the same reference numerals are attached to units that correspond to those in FIG. 13 or FIG. 14 and a description thereof is omitted when relevant.

The high-speed data line interface 313 of the source device shown in FIG. 21 has the conversion unit 131, the decryption unit 132, the switch 133, the switch 181, the switch 182, the decryption unit 183, the switching control unit 121, the timing control unit 122, and the switching control unit 171. That is, the high-speed data line interface 313 of the source device shown in FIG. 21 has a configuration of the high-speed data line interface 313 of the source device shown in FIG. 14 further provided with the timing control unit 122 and the decryption unit 132 in FIG. 13.

The high-speed data line interface 254A of the sink device shown in FIG. 21 has the conversion unit 134, the switch 135, the decryption unit 136, the conversion unit 184, the switch 185, the switch 186, the timing control unit 123, the switching control unit 124, and the switching control unit 172. That is, the sink device in FIG. 21 has a configuration of the sink device in FIG. 14 further provided with the timing control unit 123 and the conversion unit 134 in FIG. 13.

Next, communication processing by the source device and the sink device in FIG. 21 will be described.

Figure 22:
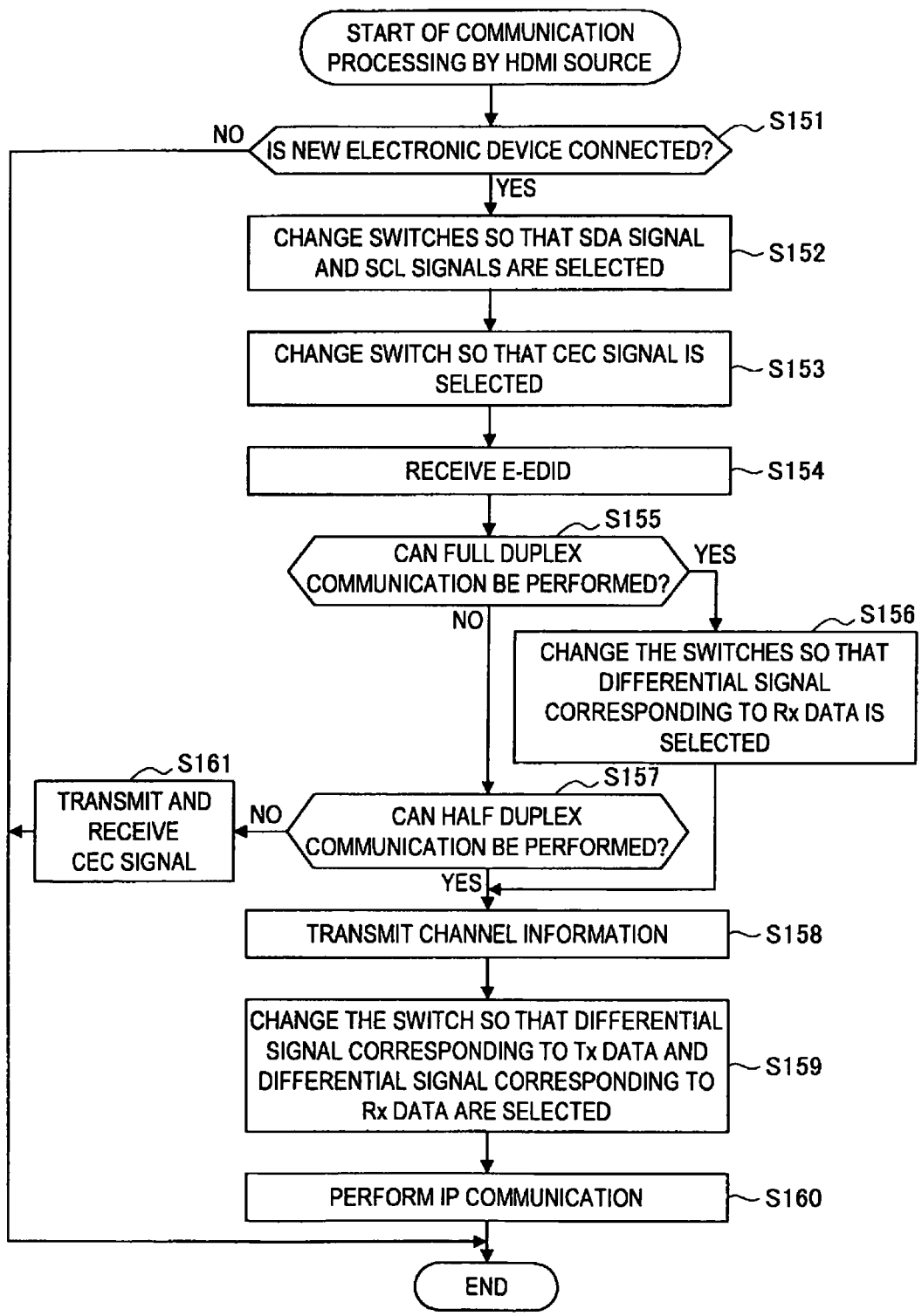
FIG. 22 is a flow chart illustrating communication processing by the source device.

First, communication processing by the source device in FIG. 21 will be described with reference to the flow chart in FIG. 22. Processing at step S151 to step S154 is the same as that at step S71 to step S74 in FIG. 19 respectively and thus, a description thereof is omitted.

At step S155, the source device determines whether full duplex communication can be performed with the sink device. That is, the source device refers to E-EDID received from the sink device to determine whether the full duplex flag "Full Duplex" flag in FIG. 16 is set.

If a determination is made at step S155 that full duplex communication can be performed, that is, a sink device shown in FIG. 21 or FIG. 14 is connected to the source device, at step S156, the switching control unit 171 controls the switch 181 and the switch 182 to change the switch 181 and the switch 182 so that a differential signal corresponding to Rx data from the sink device is selected when data is received.

On the other hand, if a determination is made at step S155 that it is difficult to perform full duplex communication, at step S157, the source device determines whether half duplex communication can be performed with the sink device. That is, the source device refers to the received E-EDID to determine whether the half duplex flag "Half Duplex" flag in FIG. 16 is set. In other words, the source device determines whether a sink device shown in FIG. 13 is connected to the source device.

If a determination is made at step S157 that half duplex communication can be performed or the switch 181 and the switch 182 are changed at step S156, at step S158, the source device transmits channel information to the sink device via the switch 133 and the CEC line 84.

If a determination is made at step S155 that full duplex communication can be performed, the sink device has a function to perform full duplex communication and thus, the source device transmits as channel information a signal indicating that IP communication using the CEC line 84, the reserved line 88, the SDA line 191, and the SCL line 192 will be performed to the sink device via the switch 133 and the CEC line 84.

If a determination is made at step S157 that half duplex communication can be performed, the sink device has a function to perform half duplex communication, though not a function to perform full duplex communication, and thus, the source device transmits as channel information a signal indicating that IP communication using the CEC line 84 and the reserved line 88 will be performed to the sink device via the switch 133 and the CEC line 84.

At step S159, the switching control unit 121 controls the switch 133 to change the switch 133 so that a differential signal corresponding to Tx data from the conversion unit 131 is selected during transmission of data and a differential signal corresponding to Rx data transmitted from the sink device is selected during reception of data. When the source device and the sink device perform full duplex communication, no differential signal corresponding to Rx data is transmitted from the sink device via the CEC line 84 and the reserved line 88 during reception of data by the source device and thus, no differential signal corresponding to Rx data is supplied to the decryption unit 132.

At step S160, the source device performs bi-directional IP communication with the sink device before terminating communication processing. That is, when the source device performs full duplex communication or half duplex communication with the sink device, the conversion unit 131 converts Tx data supplied from the control unit (CPU) of the source device into a differential signal and transmits one partial signal constituting the differential signal obtained by conversion to the sink device via the switch 133 and the CEC line 84 and transmits the other partial signal to the sink device via the reserved line 88 during transmission of data.

When the source device performs full duplex communication with the sink device, the decryption unit 183 receives a differential signal corresponding to Rx data transmitted from the sink device and decrypts the received differential signal into Rx data, which is original data and is output to the control unit (CPU) during reception of data.

On the other hand, when the source device performs half duplex communication with the sink device, the decryption unit 132 receives a differential signal corresponding to Rx data transmitted from the sink device based on control of the timing control unit 122 and decrypts the received differential signal into Rx data, which is original data and is output to the control unit (CPU) during reception of data.

Accordingly, the source device exchanges various kinds of data such as control data, pixel data, and audio data with the sink device.

If a determination is made at step S157 that it is difficult to perform half duplex communication, at step S161, the source device performs bi-directional communication with the sink device by transmitting/receiving a CEC signal via the CEC line 84 before terminating communication processing.

In this manner, the source device refers to the full duplex flag and the half duplex flag and then performs full duplex communication or half duplex communication in accordance with the function held by the sink device, which is a communication partner.

Thus, a more suitable communication method can be selected to perform high-speed bi-directional communication while maintaining compatibility with conventional HDMI by selecting data to be transmitted and data to be received by changing the switch 133, the switch 181, and the switch 182 and performing full duplex communication or half duplex communication in accordance with the function held by the sink device, which is a communication partner.

Figure 23:
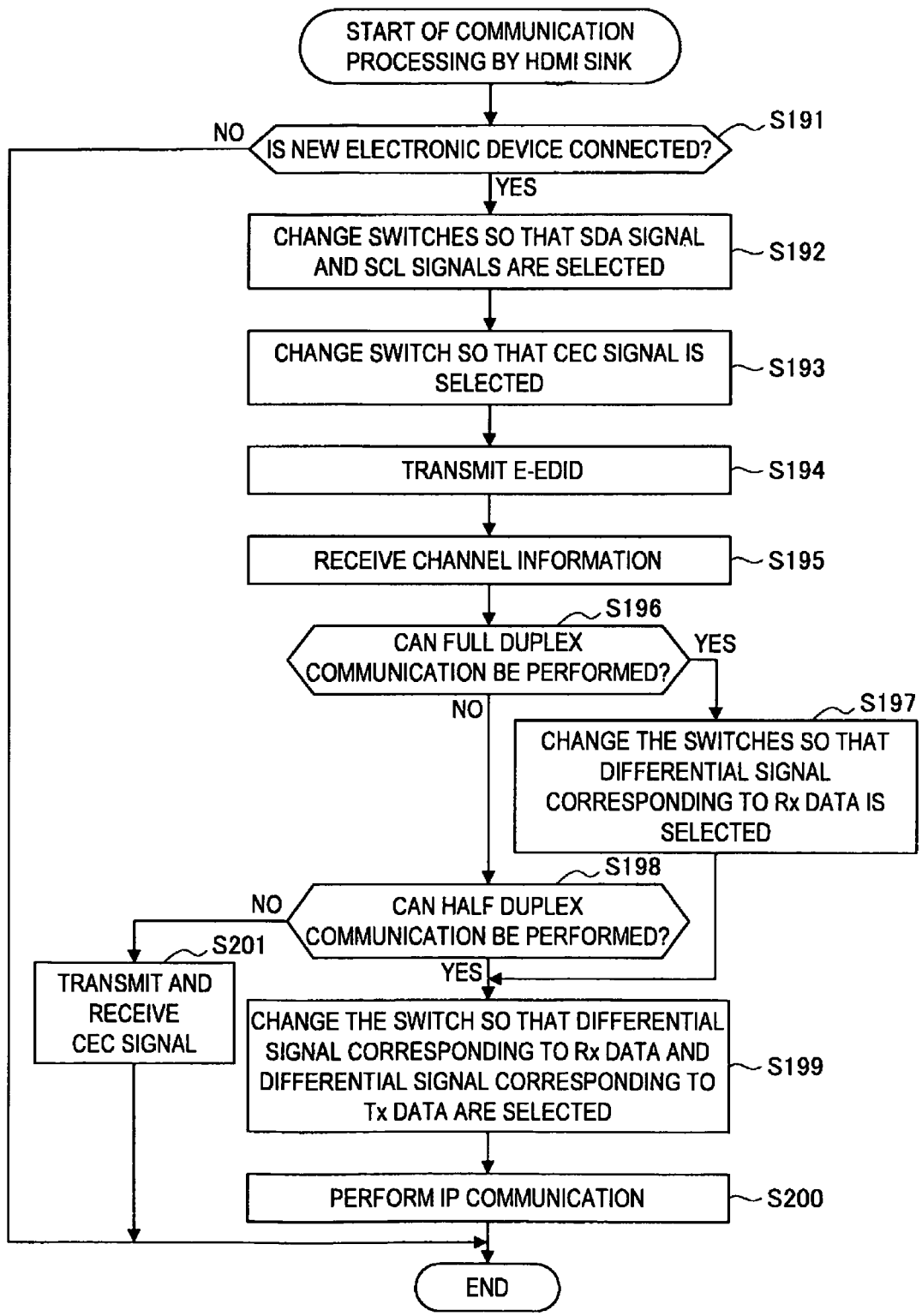
FIG. 23 is a flow chart illustrating communication processing by the sink device.

Next, communication processing by the sink device in FIG. 21 will be described with reference to the flow chart in FIG. 23. Processing at step S191 to step S194 is the same as processing at step S111 to step S114 in FIG. 20 respectively and thus, a description thereof is omitted.

At step S195, the sink device receives channel information transmitted from the source device via the switch 135 and the CEC line 84. If the source device connected to the sink device has neither a function to perform full duplex communication nor a function to perform half duplex communication, no channel information is transmitted from the source device to the sink device and thus, the sink device receives no channel information.

At step S196, the sink device determines whether to perform full duplex communication based on the received channel information. If, for example, the sink device receives channel information indicating that IP communication using the CEC line 84, the reserved line 88, the SDA line 191, and the SCL line 192 will be performed, the sink device determines to perform full duplex communication.

If a determination is made at step S196 to perform full duplex communication, at step S197, the switching control unit 172 controls the switch 185 and the switch 186 to change the switch 185 and the switch 186 so that a differential signal corresponding to Rx data from the conversion unit 184 is selected during transmission of data.

If a determination is made at step S196 not to perform full duplex communication, at step S198, the sink device determines whether to perform half duplex communication based on the received channel information. If, for example, the sink device receives channel information indicating that IP communication using the CEC line 84 and the reserved line 88 will be performed, the sink device determines to perform half duplex communication.

If a determination is made at step S198 to perform half duplex communication or the switch 185 or the switch 186 is changed at step S197, at step S199, the switching control unit 124 controls the switch 135 to change the switch 135 so that a differential signal corresponding to Rx data from the conversion unit 134 is selected during transmission of data and a differential signal corresponding to Tx data from the source device is selected during reception of data.

When the source device and the sink device perform full duplex communication, no differential signal corresponding to Rx data is transmitted from the conversion unit 134 to the transmitter 81 during transmission of data by the sink device ad thus, no differential signal corresponding to Rx data is supplied to the switch 135.

At step S200, the sink device performs bi-directional IP communication with the source device before terminating communication processing.

That is, when the sink device performs full duplex communication with the source device, the conversion unit 184 converts Rx data supplied from the control unit (CPU) of the sink device into a differential signal and transmits one partial signal constituting the differential signal obtained by conversion to the source device via the switch 185 and the SDA line 191 and the other partial signal to the source device via the switch 186 and the SCL line 192 during transmission of data.

When the sink device performs half duplex communication with the source device, the conversion unit 134 converts Rx data supplied from the control unit (CPU) of the sink device into a differential signal and transmits one partial signal constituting the differential signal obtained by conversion to the transmitter 81 via the switch 135 and the CEC line 84 and the other partial signal to the source device via the reserved line 88 during transmission of data.

Further, when the sink device performs full duplex communication or half duplex communication with the source device, the decryption unit 136 receives a differential signal corresponding to Tx data transmitted from the source device and decrypts the received differential signal into Tx data, which is original data and is output to the control unit (CPU), during reception of data.

If a determination is made at step S198 not to perform half duplex communication, that is, for example, no channel information is transmitted, at step S201, the sink device performs bi-directional communication with the source device by transmitting/receiving a CEC signal before terminating communication processing.

In this manner, the sink device performs full duplex communication or half duplex communication in accordance with the received channel information, that is, the function held by the source device, which is a communication partner.

Thus, a more suitable communication method can be selected to perform high-speed bi-directional communication while maintaining compatibility with conventional HDMI (R) by selecting data to be transmitted and data to be received by changing the switch 135, the switch 185, and the switch 186 and performing full duplex communication or half duplex communication in accordance with the function held by the source device, which is a communication partner.

Half duplex or full duplex high-speed bi-directional IP communication can be performed while maintaining compatibility with a conventional HDMI cable by connecting the source device and sink device via the HDMI cable 351 containing the CEC line 84 and the reserved line 88 that are mutually connected by a differential twisted pair, shielded, and connected to a ground line and the SDA line 191 and the SCL line 192 that are mutually connected by a differential twisted pair, shielded, and connected to a ground line.

Next, a sequence of processing described above can be performed by dedicated hardware or software. If a sequence of processing is performed by software, a program constituting the software is installed into, for example, a microcomputer controlling the source device and sink device.

Figure 24:
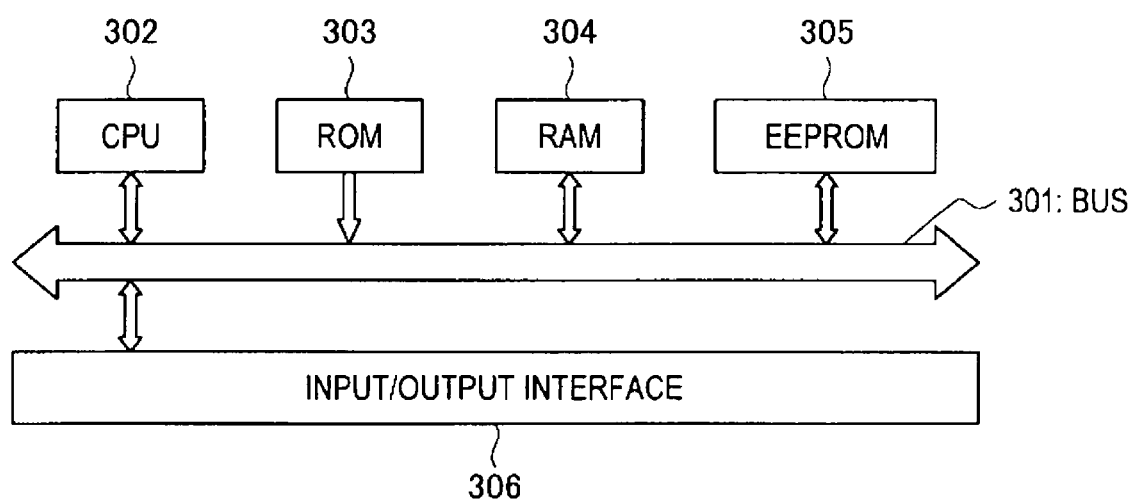
FIG. 24 is a block diagram showing a configuration example of a computer to which the present invention is applied.

FIG. 24 shows a configuration example in an embodiment of a computer into which a program to perform a sequence of processing described above is installed.

The program can be pre-recorded in an EEPROM (Electrically Erasable Programmable Read-only Memory) 305 or a ROM (Read Only Memory) 303 as a recording medium contained in the computer.

Alternatively, the program can temporarily or permanently be stored (recorded) in a removable recording medium such as a flexible disk, CD-ROM (Compact Disc Read Only Memory), MO (Magneto Optical) disk, DVD (Digital Versatile Disc), magnetic disk, and semiconductor memory. Such a removable recording medium can be provided as so-called packaged software.

In addition to installation into a computer from a removable recording medium as described above, the program may be transferred by radio to the computer from a download site via an artificial satellite for digital satellite broadcasting or by wire to the computer via a network such as a LAN and the Internet. In the computer, the program transferred as described above is received by an input/output interface 306 before being installed into an EEPROM 305 contained therein.

The computer contains a CPU (Central Processing Unit) 302. The input/output interface 306 is connected to the CPU 302 via a bus 301 and the CPU 302 executes a program stored in the ROM 303 or the EEPROM 305 by loading the program into a RAM (Random Access Memory) 304. The CPU 302 thereby performs processing according to the above flow charts or processing performed by configurations in the above block diagrams.

Herein, processing steps describing a program to cause a computer to perform various kinds of processing may not necessarily be executed in time sequence in the order described as a flow chart and contain processing performed in parallel or individually (for example, parallel processing or processing by an object). A program may be executed by a single computer or by a plurality of computers in a distributed manner.

Figure 25:
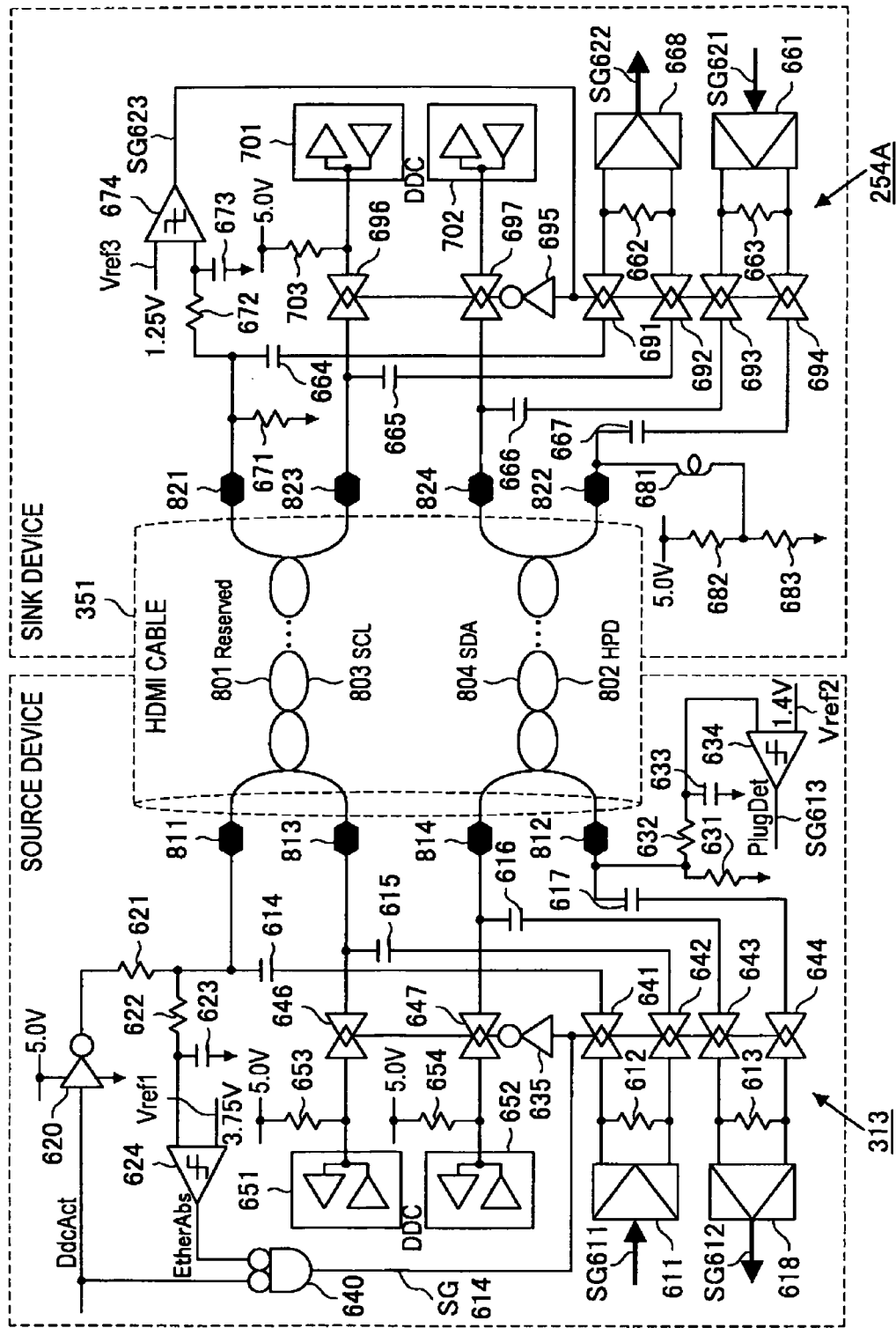
FIG. 25 is a connection diagram showing still another configuration example of the high-speed data line interface between the set top box and TV receiver.

While the configuration example in FIG. 9 described above can form a circuit for LAN communication regardless of electrical specifications specified for DDC, FIG. 25 shows another configuration example having the same effect.

This example is characterized in that LAN communication is performed by one-way communication via two pairs of differential transmission paths, the connection state of the interface is notified by the DC bias potential of at least one of the transmission paths and further, at least two transmission paths are used for exchange and authentication of connected device information in a time division fashion with LAN communication in an interface that performs data transmission of video and audio by a single cable, exchange and authentication of connected device information, communication of device control data, and LAN communication.

The source device has a LAN signal transmitting circuit 611, terminating resistors 612 and 613, AC connecting capacitors 614 to 617, a LAN signal receiving circuit 618, an inverter 620, a resistor 621, a resistor 622 and a capacitor 623 configuring a low-pass filter, a comparator 624, a pull-down resistor 631, a resistor 632 and a capacitor 633 configuring a low-pass filter, a comparator 634, a NOR gate 640, analog switches 641 to 644, an inverter 645, analog switches 646 and 647, DDC transceivers 651 and 652, and pull-up resistors 653 and 654.

A sink device 602 has a LAN signal transmitting circuit 661, terminating resistors 662 and 663, AC connecting capacitors 664 to 667, a LAN signal receiving circuit 668, a pull-down resistor 671, a resistor 672 and a capacitor 673 configuring a low-pass filter, a comparator 674, a choke coil 681, resistors 682 and 683 connected in series between a power supply potential and a reference potential, analog switches 691 to 694, an inverter 695, analog switches 696 and 697, DDC transceivers 701 and 702, and pull-up resistors 703 and 704.

The HDMI cable 351 contains a differential transmission path including a reserved line 801 and an SCL line 803 and a differential transmission path including an SDA line 804 and an HPD line 802 and their source-side terminals 811 to 814 and sink-side terminals 821 to 824 are formed.

The reserved line 801 and the SCL line 803, and the SDA line 804 and the HPD line 802 are connected as differential twisted pairs.

In the source device, the terminals 811 and 813 are connected to the transmitting circuit 611 that transmits a LAN transmission signal SG611 to the sink device via the AC connecting capacitors 614 and 615 and the analog switches 641 and 642 and the terminating resistor 612. The terminals 814 and 812 are connected to the receiving circuit 618 that receives a LAN signal from the sink device via the AC connecting capacitors 616 and 617 and the analog switches 643 and 644 and the terminating resistor 613.

In the sink device, the terminals 821 to 824 are connected to the transmitting circuit 661, the receiving circuit 668, and the terminating resistors 662 and 663 via the AC connecting capacitors 664, 665, 666, and 667 and the analog switches 691 to 694. The analog switches 641 to 644 and 691 to 694 are connected when LAN communication is performed and disconnected when DDC communication is performed.

The source device connects the terminal 813 and the terminal 814 to the DDC transceivers 651 and 652 and the pull-up resistors 653 and 654 via the other analog switches 646 and 647.

The sink device connects the terminal 823 and the terminal 824 to the DDC transceivers 701 and 702 and the pull-up resistor 703 via the analog switches 696 and 697. The analog switches 646 and 647 are connected when DDC communication is performed and disconnected when LAN communication is performed.

The recognition mechanism of e-HDMI compatible devices based on the potential of the reserved line 801 is basically the same as the example shown in FIG. 9 except that the resistor 621 of a source device 601 is driven by the inverter 620.

When input of the inverter 620 is HIGH, the resistor 621 becomes a pull-down resistor and thus when viewed from the sink device, the voltage thereof becomes 0 V, which is the same state as when an e-HDMI incompatible device is connected. As a result, a signal SG623 that indicates an e-HDMI compatibility recognition result becomes LOW, the analog switches 691 to 694 controlled by the signal SG623 are disconnected, and analog switches 696 and 697 controlled by a signal obtained by inverting the signal SG623 by the inverter 695 are connected. As a result, the sink device 602 is in a state in which the SCL line 803 and the SDA line 804 are disconnected from a LAN transmitter-receiver and connected to a DDC transmitter-receiver.

In the source device, on the other hand, input of the inverter 620 is also input to the NOR gate 640 and an output SG614 thereof becomes LOW. The analog switches 641 to 644 controlled by the output signal SG614 of the NOR gate 640 are disconnected and the analog switches 646 and 647 controlled by a signal obtained by inverting the signal SG614 by the inverter 645 are connected. As a result, also the source device 601 is in a state in which the SCL line 803 and the SDA line 804 are disconnected from the LAN transmitter-receiver and connected to the DDC transmitter-receiver.

Inversely, when input of the inverter 620 is LOW, both the source device and the sink device are in a state in which the SCL line 803 and the SDA line 804 are disconnected from the DDC transmitter-receiver and connected to the LAN transmitter-receiver.

The circuits 631 to 634 and 681 to 683 for connection confirmation by the DC bias potential of the HPD line 802 have a function similar to that of the example shown in FIG. 9. That is, the HPD line 802 notifies the source device that, in addition to the above LAN communication, the cable 351 is connected to the sink device at a DC bias level. When the cable 351 is connected to the sink device, the resistors 682 and 683 and the choke coil 681 in the sink device bias the HPD line 802 to about 4 V via the terminal 822.

The source device extracts the DC bias of the HPD line 802 by means of a low-pass filter configured by the resistor 623 and the capacitor 633 and compares the DC bias with the reference potential Vref2 (for example, 1.4 V) by the comparator 634. If the cable 351 is not connected to the sink device, the potential of the terminal 812 is lower than the reference potential Vref2 due to the pull-down resistor 631 and if the cable 351 is connected, the potential of the terminal 812 is higher than the reference potential Vref2. Therefore, HIGH of an output signal SG613 of the comparator 634 indicates that the cable 351 and the sink device are connected. On the other hand, LOW of the output signal SG613 of the comparator 634 indicates that the cable 351 and the sink device are not connected.

Thus, according to the configuration example shown in FIG. 25, LAN communication is performed by one-way communication via two pairs of differential transmission paths, the connection state of the interface is notified by the DC bias potential of at least one of the transmission paths and further, at least two transmission paths are used for exchange and authentication of connected device information in a time division fashion with LAN communication in an interface that performs data transmission of video and audio by a single cable, exchange and authentication of connected device information, communication of device control data, and LAN communication and thus, a time can be divided into a time zone in which the SCL line and the SDA line are connected to a LAN communication circuit and a time zone in which the SCL line and the SDA line are connected to a DDC circuit by switches and a circuit for LAN communication can be formed regardless of electrical specifications specified for DDC due to the division so that stable and reliable LAN communication can be realized at low cost.

The resistor 621 shown in FIG. 25 may be provided, instead of inside the source device, inside the HDMI cable 351. In such a case, terminals of the resistor 621 are each connected to the reserved line 801 and the line (signal line) connected to the power supply (power supply potential) of lines provided inside the HDMI cable 351.

Further, the pull-down resistor 671 and the resistor 683 shown in FIG. 25 may be provided, instead of inside the sink device, inside the HDMI cable 351. In such a case, terminals of the pull-down resistor 671 are each connected to the reserved line 801 and the line (ground line) connected to the ground (reference potential) of lines provided inside the HDMI cable 351. Terminals of the resistor 683 are each connected to the HPD line 802 and the line (ground line) connected to the ground (reference potential) of lines provided inside the HDMI cable 351.

SDA and SCL are used for pull-down communication whose H is 1.5 KΩ pull-up and whose L is low impedance. Also, CEC is used for pull-down communication whose H is 27 KΩ pull-up and whose L is low impedance. Holding these functions to maintain compatibility with the existing HDMI may make it difficult to share the function of LAN that performs high-speed data communication that makes it necessary to provide matching termination to ends of a transmission path.

Configuration examples in FIGS. 9 and 25 can avoid such a problem. That is, in the configuration example in FIG. 9, full duplex communication by one-pair bi-directional communication is performed by using the reserved line and HPD line as a pair of differential while avoiding using the SDA, SCL, and CEC lines. In the configuration example in FIG. 25, two-pair full duplex communication is performed in which one-way communication is performed by each of two differential pairs formed by the HPD line and SDA line, and the SCL line and reserved line.

FIG. 26 shows bi-directional communication waveforms in the configuration example in FIG. 9 or FIG. 25.

A in FIG. 26 shows a signal waveform transmitted from a source device, B in FIG. 26 a signal waveform received by a sink device, C in FIG. 26 a signal waveform passing through a cable, D in FIG. 26 a signal waveform received by the source device, and E in FIG. 26 a signal waveform transmitted from the source device. As is evident from A in FIG. 26 to E in FIG. 26, according to the configuration example in FIG. 9 or FIG. 25, satisfactory bi-directional communication can be realized.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

In the above embodiment, for example, when streaming data (compressed video and audio signal) is transmitted from the TV receiver 250 to the disk recorder 210, a case when a bi-directional communication path (high-speed data line) configured by predetermined lines (for example, the reserved line and HPD line) of the HDMI cable 352 is used is shown, but the streaming data may be transmitted via a network by using the network terminals 275 and 225 of the TV receiver 250 and the disk recorder 210 respectively.

Also in the above embodiment, a case when remote control code of recording instructions is transmitted from the TV receiver 250 to the set top box 310 and the disk recorder 210 via the high-speed data line (bi-directional communication path) is shown, but a similar control signal may be transmitted by using the command pass-through function of HDMICEC.

Also in the above embodiment, the interface of the HDMI standard is assumed as a transmission path to connect each device, but the present invention can also be applied to other similar transmission standards. An example in which a set top box and a disk recorder are used as source devices and a TV receiver as a sink device is taken in the above embodiment, but the present invention can similarly be applied also when electronic devices having other similar functions are used.

Also in the above embodiment, a case when electronic devices are connected by an HDMI cable is shown, but the present invention can similarly be applied also when electronic devices are connected by radio.

INDUSTRIAL APPLICABILITY

The present invention enables recording of a video signal corresponding to a display image without causing prices of a transmitting apparatus of the video signal and a display apparatus to rise and can be applied to, for example, an AV system in which a set top box is connected to a TV receiver via an HDMI cable.

The invention claimed is:
1. A display apparatus, comprising:
a first signal receiving unit that receives a first signal from an external device via a bidirectional first transmission path through a plurality of channels by means of a differential signal;
a communication unit that performs communication with the external device via two pairs of differential transmission paths contained in the first transmission path and receives a notification of a connection state from the external device by means of at least one DC bias potential of the two pairs of differential transmission paths;
an image display unit that displays images by processing a video signal received by the first signal receiving unit;
a second signal receiving unit that receives a second signal of a same video source as the first signal via the first transmission path, the second signal being received by the second signal receiving unit via the first transmission path based on whether recording is instructed by a user;
a signal transmitting unit that transmits a signal corresponding to the second signal received by the second signal receiving unit to another external device different from the external device; and
wherein the two pairs of differential transmission paths are a reserved line and a Hot Plug Detect (HPD) line constituting a High Definition Multimedia Interface (HDMI) cable.

2. The display apparatus according to claim 1, comprising a user's operation unit operated by a user, wherein
when recording is instructed by the user's operation unit, the signal transmitting unit transmits the signal corresponding to the second signal received by the second signal receiving unit to the other external device.

3. The display apparatus according to claim 1, comprising a third signal receiving unit that receives another signal from the other external device via a second transmission path through the plurality of channels by means of the differential signal, wherein
the signal transmitting unit transmits the second signal received by the second signal receiving unit via at least one of two pairs of differential transmission paths contained in the second transmission path.

4. The display apparatus according to claim 3, comprising a path changeover switch that supplies the second signal received by the second signal receiving unit to the signal transmitting unit as a transmission signal.

5. The display apparatus according to claim 1, wherein the first signal is a non-compressed video signal, the second signal is a compressed video signal and the signal corresponding to the second signal received by the second signal receiving unit is a compressed video signal.

6. A signal transmitting method for a display apparatus including:
signal receiving unit that receives a first signal from an external device via a bidirectional transmission path through a plurality of channels by means of a differential signal;
a communication unit that performs communication with the external device via two pairs of differential transmission paths contained in the transmission path and receives a notification of a connection state from the external device by means of at least one DC bias potential of the two pairs of differential transmission paths; and
an image display unit that displays images by
processing a video signal received by the signal receiving unit, the method comprising the steps of:
receiving a second signal of a same video source as the first signal via the transmission path, the second signal being received via the transmission path based on whether recording is instructed by a user;
transmitting a signal corresponding to the second signal received by the receiving step to another external device different from the external device; and
wherein the two pairs of differential transmission paths are a reserved line and a Hot Plug Detect (HPD) line constituting a High Definition Multimedia Interface (HDMI) cable.

7. The signal transmitting method for a display apparatus according to claim 6, wherein the first signal is a non-compressed video signal, the second signal is a compressed video signal and the signal corresponding to the second signal received by the second signal receiving unit is a compressed video signal.

8. A transmitting apparatus, comprising:
a first signal transmitting unit that transmits a first signal to an external device via a bidirectional transmission path through a plurality of channels by means of a differential signal; and
a second signal transmitting unit that transmits a second signal of a same video source as the first signal to the external device via two pairs of differential transmission paths contained in the transmission path, the second signal being transmitted via the two pairs of differential transmission paths contained in the transmission path based on whether data indicating recording is instructed by a user is received via the transmission path, and notifies the external device of a connection state of the second signal transmitting unit by means of at least one DC bias potential of the two pairs of differential transmission paths;
wherein the two pairs of differential transmission paths are a reserved line and a Hot Plug Detect (HPD) line constituting a High Definition Multimedia Interface (HDMI) cable.

9. The transmitting apparatus according to claim 8, wherein when a transmission request is transmitted from the external device via a control data line configuring the transmission path or the two pairs of differential transmission paths, the second signal transmitting unit transmits the second signal.

* * * * *